(12) United States Patent
Hwang et al.

(10) Patent No.: US 11,553,432 B2
(45) Date of Patent: Jan. 10, 2023

(54) METHOD AND DEVICE FOR COMMUNICATION DEVICE TO SENSE OR TRANSMIT WUS SIGNAL IN WIRELESS COMMUNICATION SYSTEM

(71) Applicant: LG ELECTRONICS INC., Seoul (KR)

(72) Inventors: Seunggye Hwang, Seoul (KR); Changhwan Park, Seoul (KR); Joonkui Ahn, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/265,276

(22) PCT Filed: Aug. 9, 2019

(86) PCT No.: PCT/KR2019/010138
§ 371 (c)(1),
(2) Date: Feb. 2, 2021

(87) PCT Pub. No.: WO2020/032726
PCT Pub. Date: Feb. 13, 2020

(65) Prior Publication Data
US 2021/0306951 A1    Sep. 30, 2021

(30) Foreign Application Priority Data

Aug. 9, 2018   (KR) .................. 10-2018-0093427
Sep. 21, 2018  (KR) .................. 10-2018-0114484
(Continued)

(51) Int. Cl.
*H04W 52/02*   (2009.01)
(52) U.S. Cl.
CPC ... *H04W 52/0235* (2013.01); *H04W 52/0219* (2013.01)

(58) Field of Classification Search
CPC ......... H04W 52/0235; H04W 52/0219; H04W 68/02; Y02D 30/70
See application file for complete search history.

(56) References Cited

U.S. PATENT DOCUMENTS

2018/0110000 A1    4/2018   Shellhammer et al.
2018/0270756 A1*   9/2018   Bhattad ................. H04W 76/27
(Continued)

FOREIGN PATENT DOCUMENTS

KR     20170132163         12/2017
WO     WO-2018169649 A1 *   9/2018  ........... H04L 5/0053
(Continued)

OTHER PUBLICATIONS

PCT International Application No. PCT/KR2019/010138, International Search Report dated Dec. 3, 2019, 10 pages.
(Continued)

*Primary Examiner* — Chi H Pham
*Assistant Examiner* — Vladislav Y Agureyev
(74) *Attorney, Agent, or Firm* — Lee Hong Degerman Kang Waimey

(57) ABSTRACT

The present invention discloses various embodiments of a method and a device by which a terminal senses a wake up signal (WUS) in a wireless communication system. Disclosed are a method and a device by which a terminal senses a WUS signal in a wireless communication system, the method including: a step for receiving, from a base station, WUS setting information related to a first WUS resource and a second WUS resource; a step for specifying the first WUS resource on the basis of the WUS setting information; and a step for sensing a WUS signal from the specified first WUS resource, wherein, when the WUS signal is a group WUS signal, the first WUS resource is specified to be continuous with the second WUS resource in a time domain.

11 Claims, 29 Drawing Sheets

(30) Foreign Application Priority Data

| Nov. 9, 2018 | (KR) | 10-2018-0137664 |
| Feb. 14, 2019 | (KR) | 10-2019-0017253 |
| May 2, 2019 | (KR) | 10-2019-0051394 |

(56) References Cited

U.S. PATENT DOCUMENTS

| 2019/0159128 A1* | 5/2019 | Lin | H04W 76/28 |
| 2019/0200296 A1* | 6/2019 | Liu | H04W 52/0235 |
| 2019/0320490 A1* | 10/2019 | Liu | H04W 72/1289 |
| 2019/0349856 A1* | 11/2019 | Liu | H04W 72/0453 |
| 2020/0029302 A1* | 1/2020 | Cox | H04W 76/27 |
| 2020/0229095 A1* | 7/2020 | Shrestha | H04W 76/11 |

FOREIGN PATENT DOCUMENTS

| WO | WO-2018172375 A1 * | 9/2018 | H04J 13/0048 |
| WO | WO-2018202693 A1 * | 11/2018 | H04W 24/10 |

OTHER PUBLICATIONS

Intel Corporation, "Configurations of wake-up signal for feNB-IoT," 3GPP TSG RAN WG1 Meeting #90, R1-1717344, Oct. 2017, 4 pages.

Qualcomm Incorporated, "Wake-up signal configurations and procedures," 3GPP TSG RAN WG1 Meeting #90bis, R1-1718141, Oct. 2017, 7 pages.

Samsung, "Discussion on Wake up signal configuration," 3GPP TSG RAN WG1 Meeting #90bis, R1-1717568, Oct. 2017, 4 pages.

* cited by examiner

[FIG. 1]
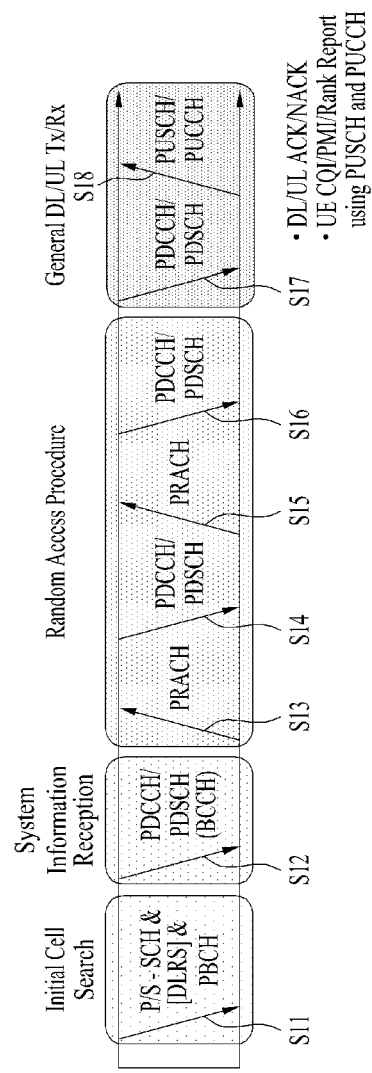

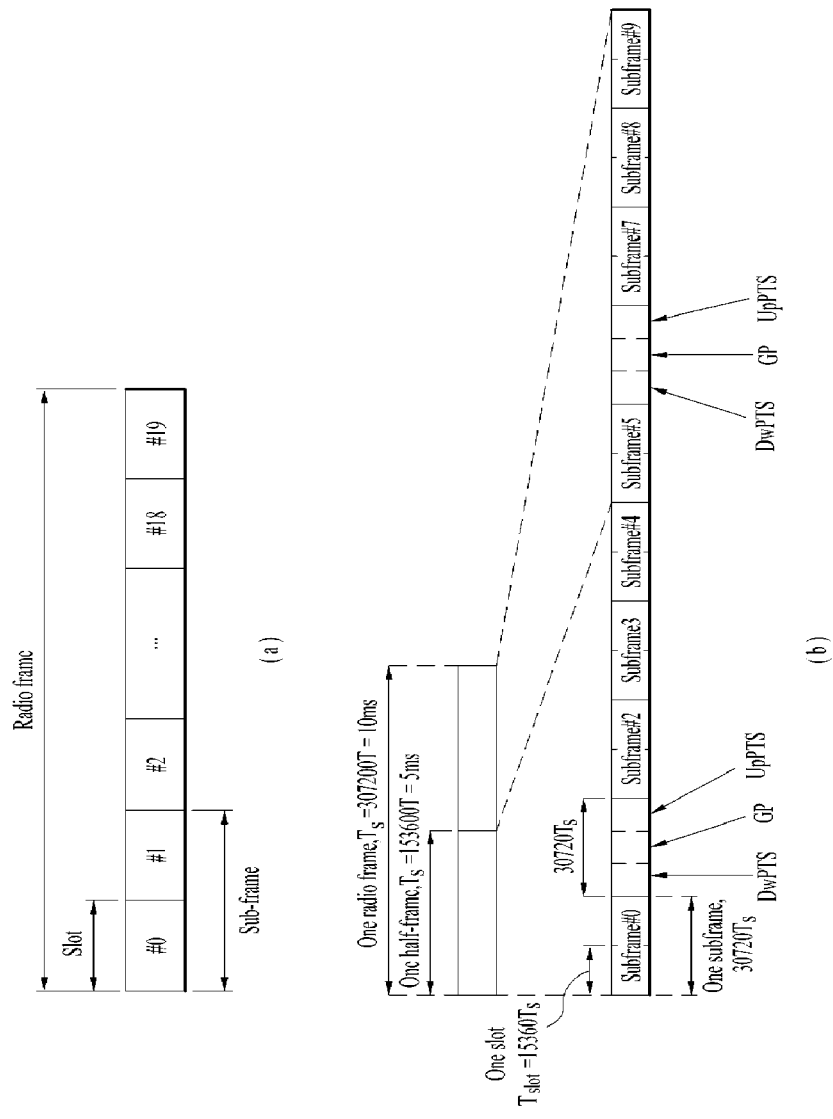
[FIG. 2]

[FIG. 3]
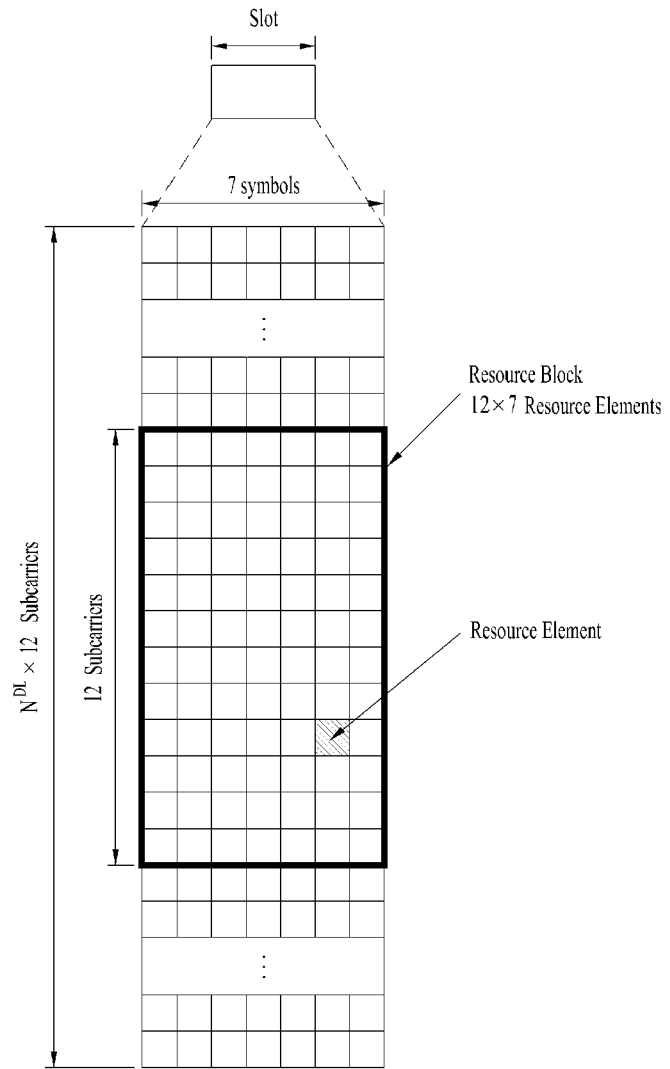

[FIG. 4]
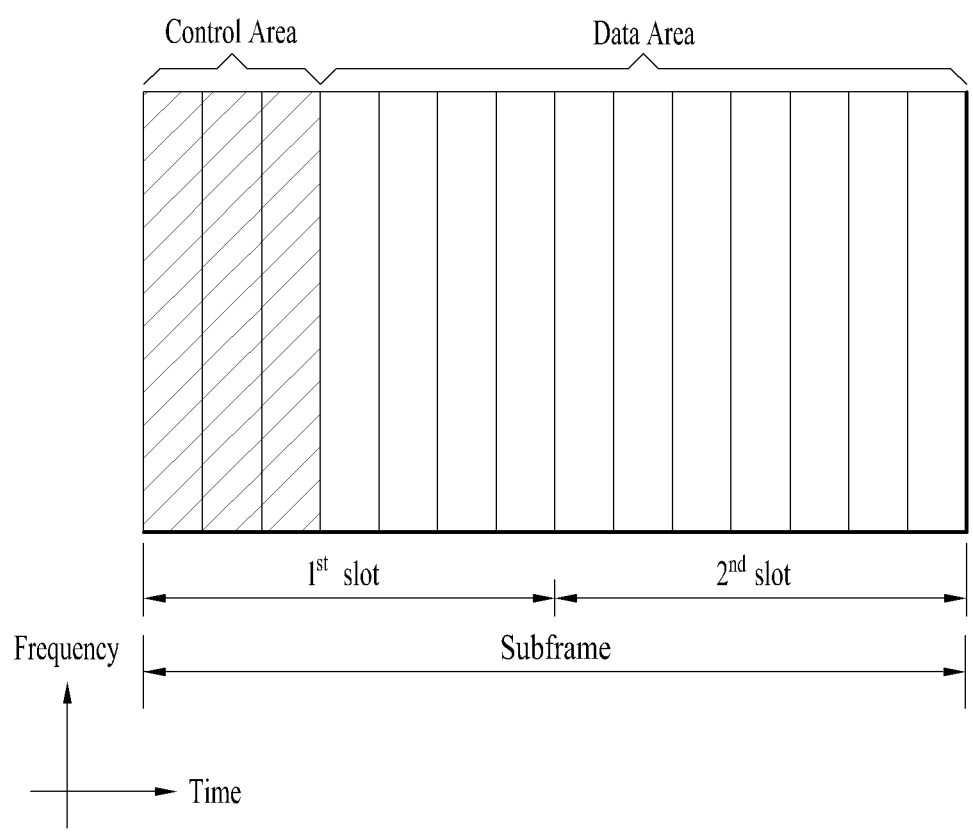

[FIG. 5]
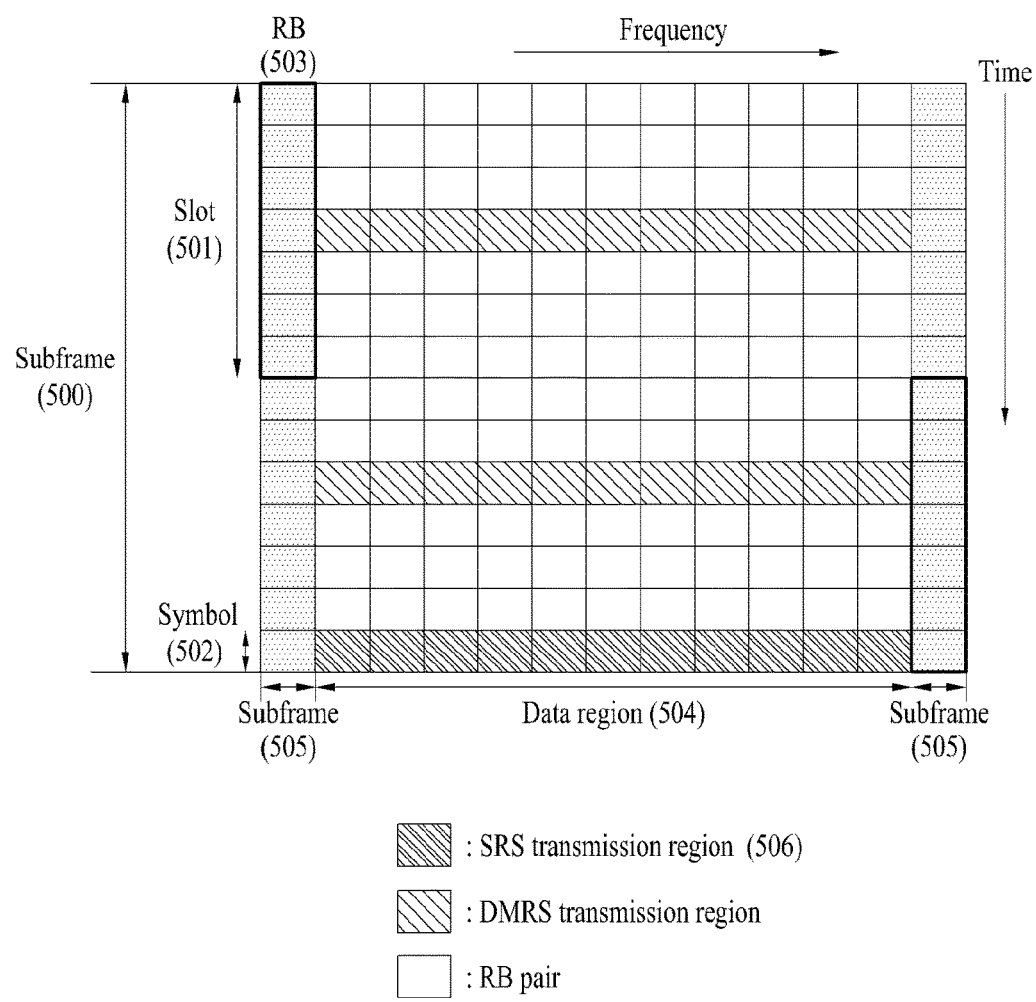

[FIG. 6]
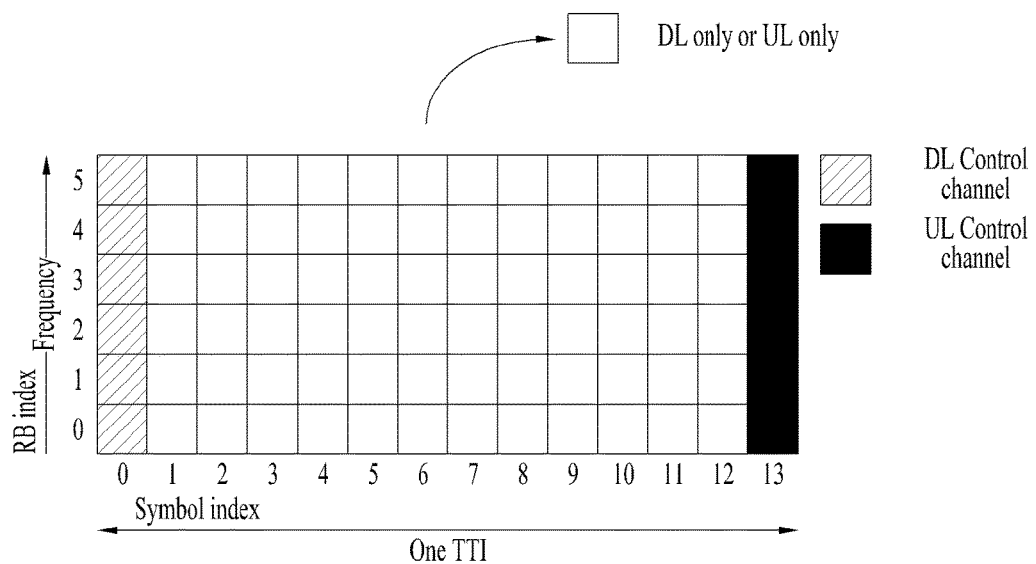

[FIG. 7]
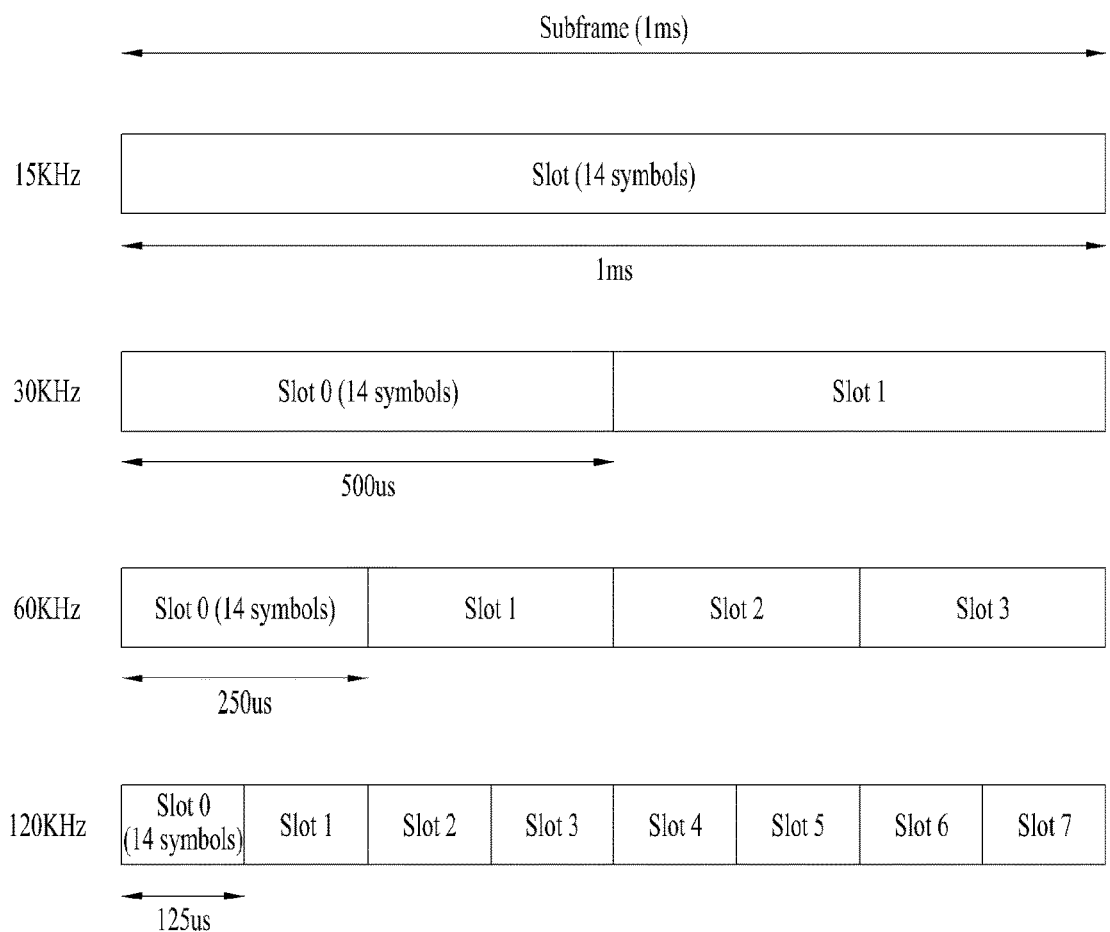
[FIG. 8]
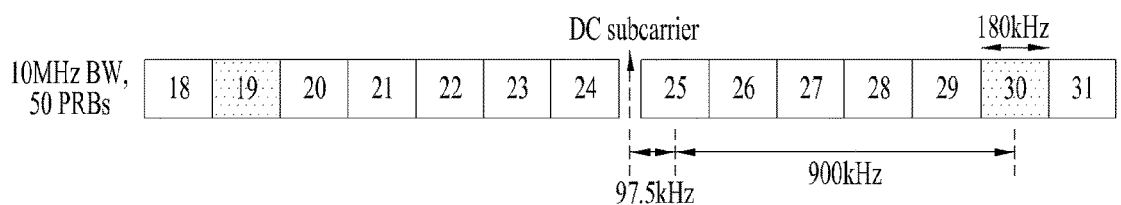

[FIG. 9]
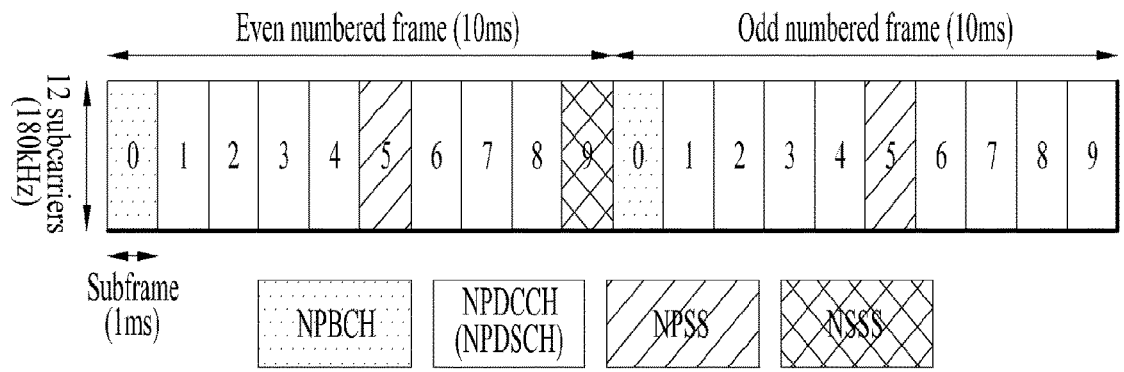
[FIG. 10]
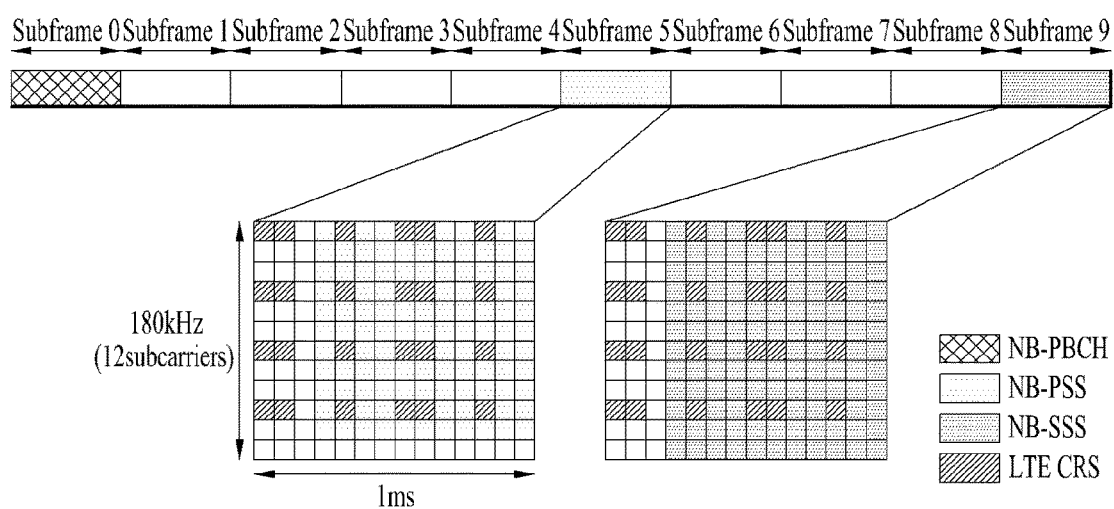

[FIG. 11]
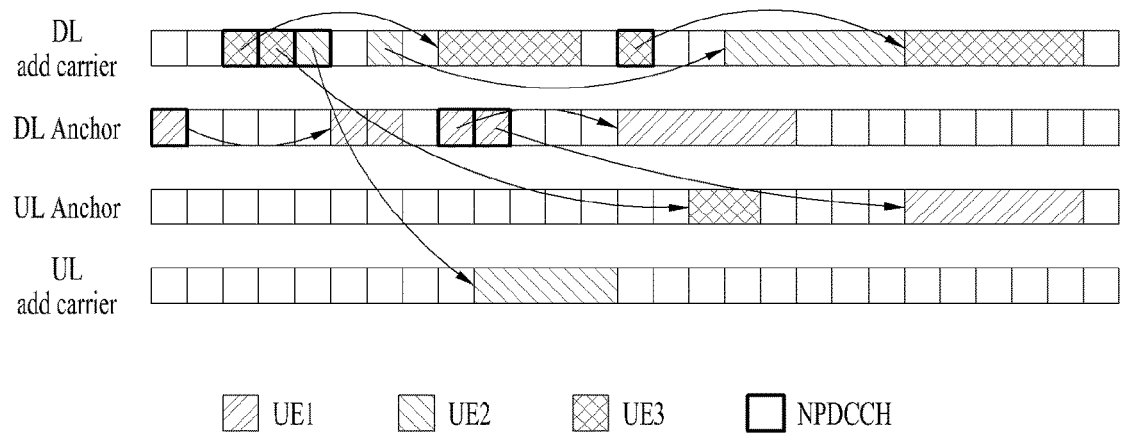

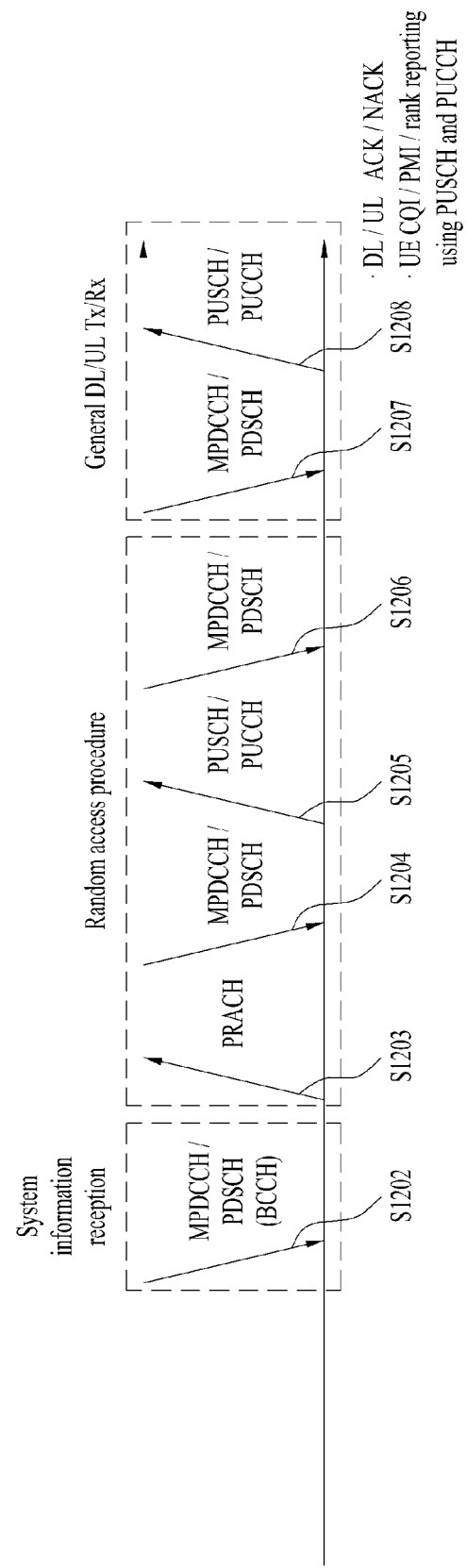
[FIG. 12]

[FIG. 13]
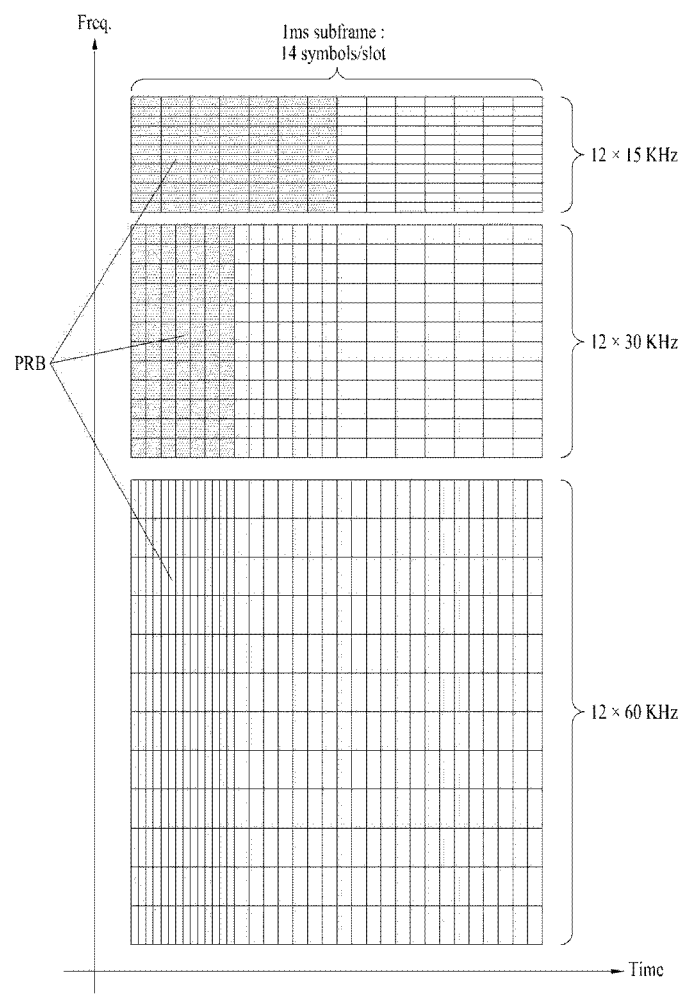

[FIG. 14]
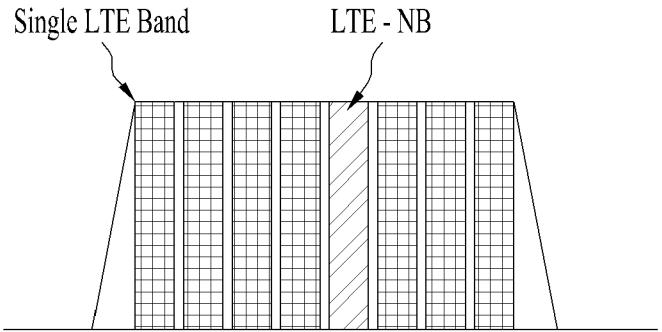
(a) In-band system
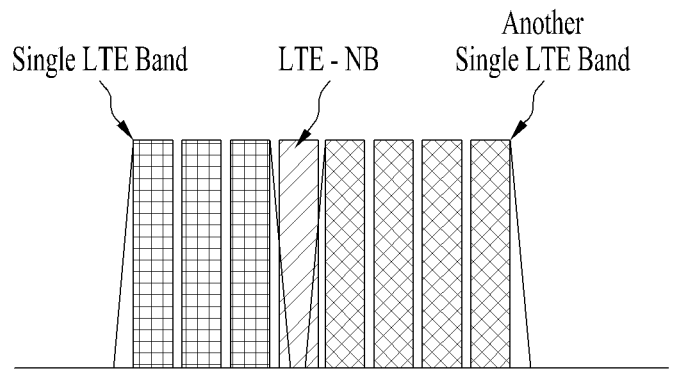
(b) Guard-band system
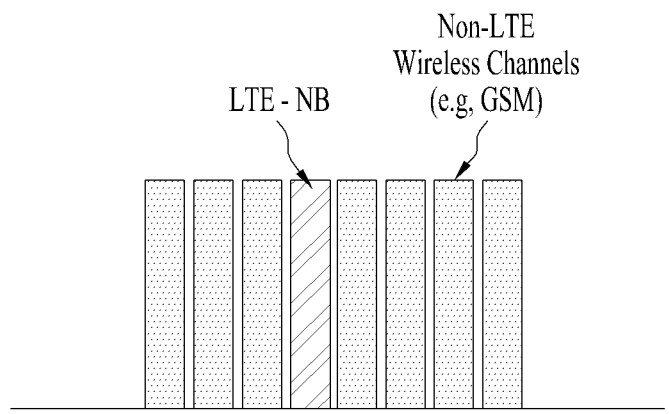
(c) Stand-alone system

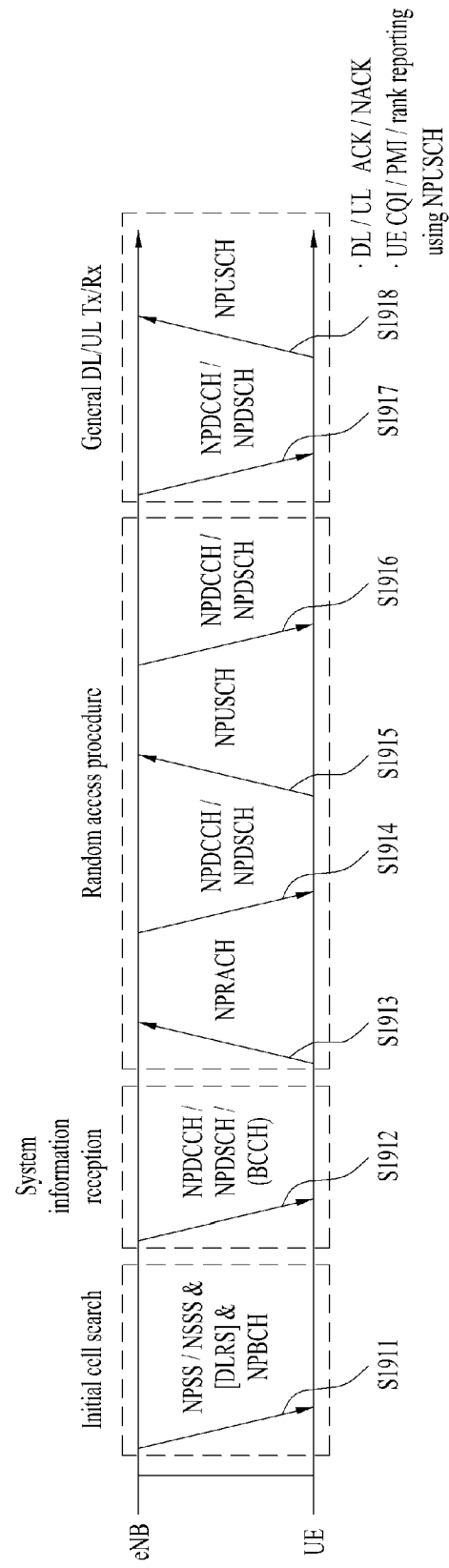
[FIG. 15]

[FIG. 16]
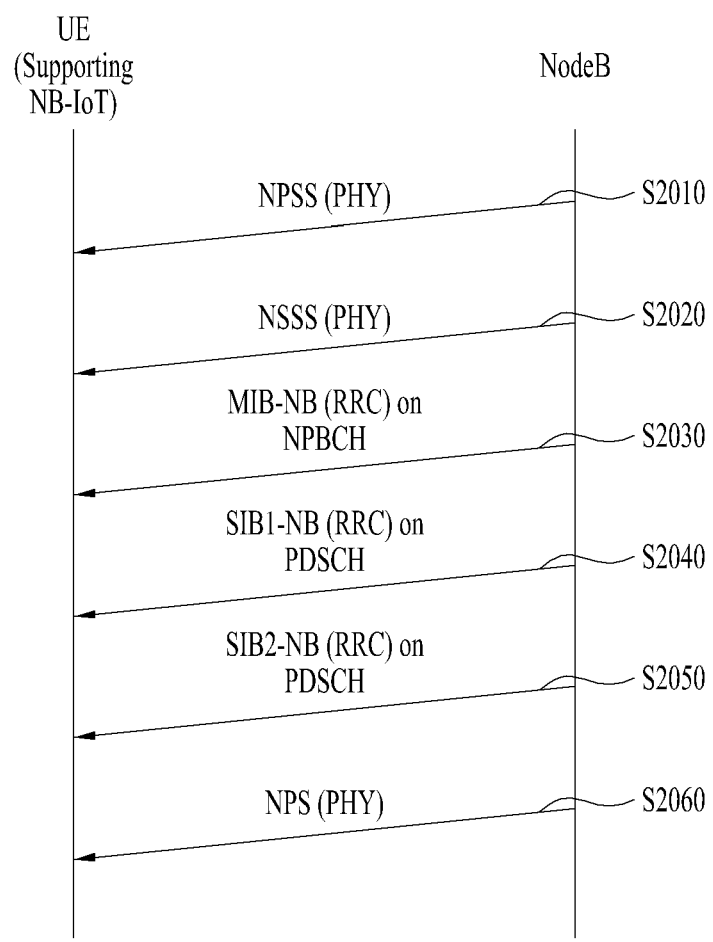

[FIG. 17]
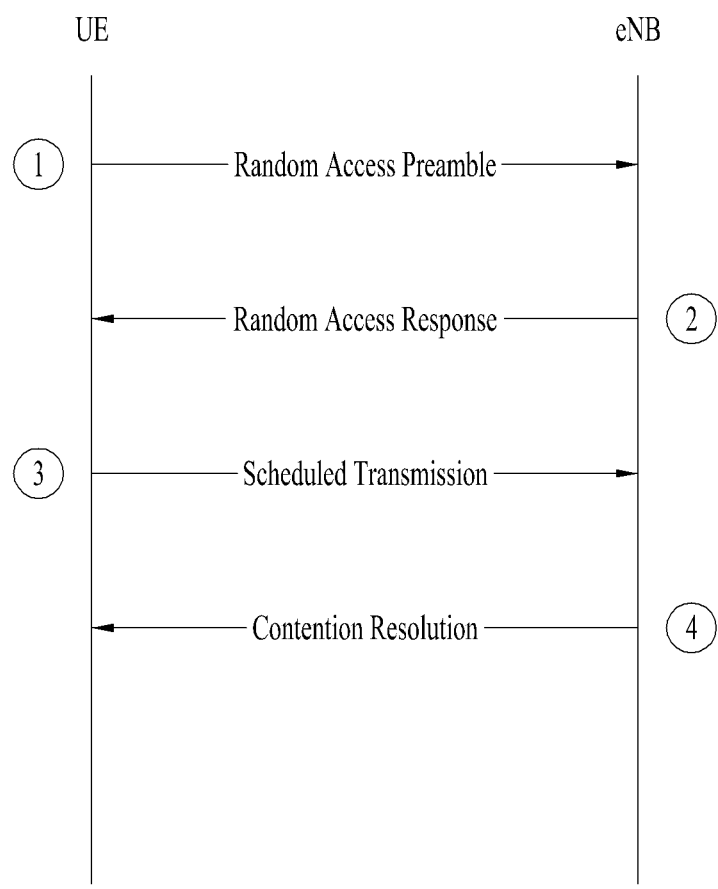

[FIG. 18]
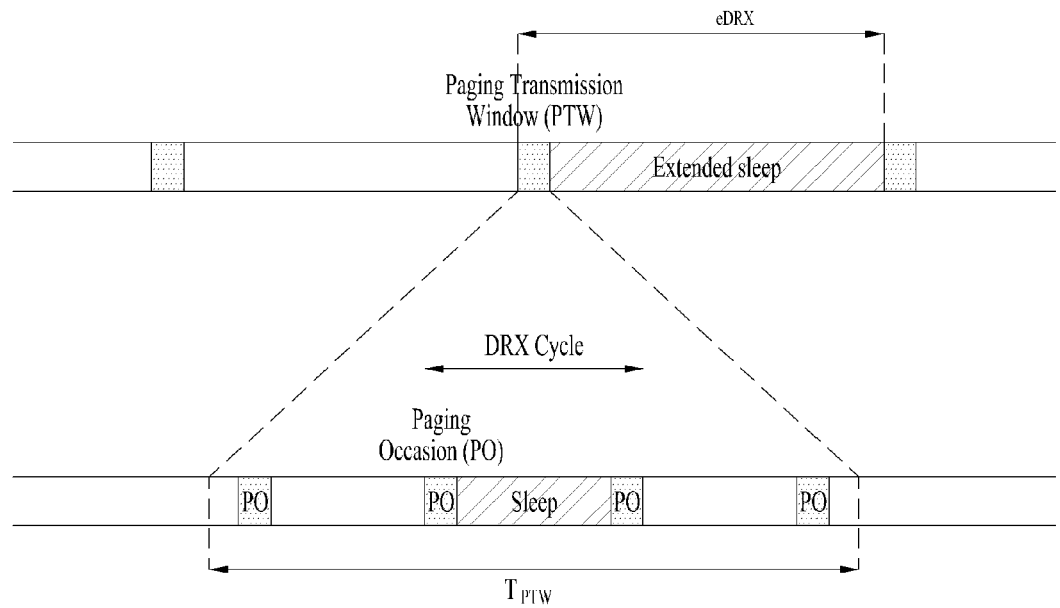
[FIG. 19]
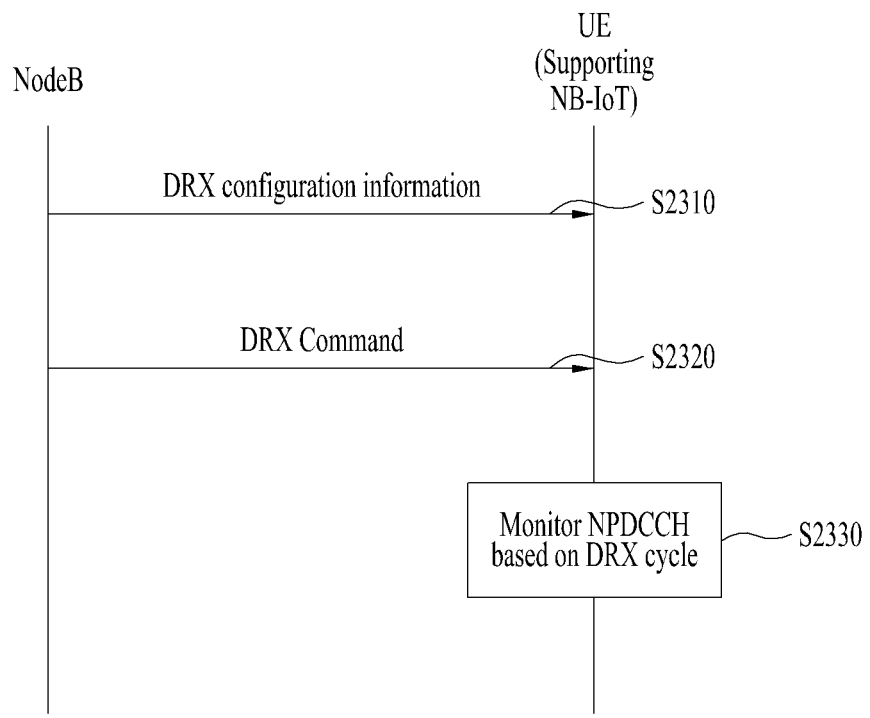

[FIG. 20]
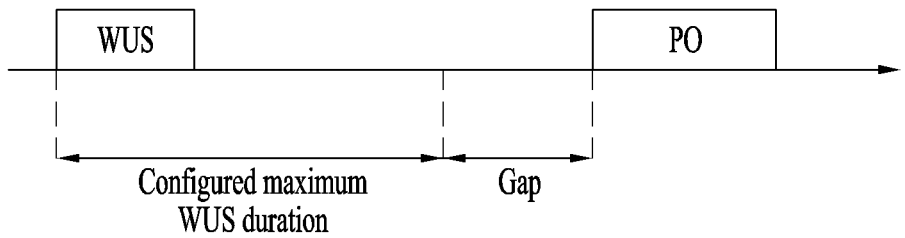
[FIG. 21]
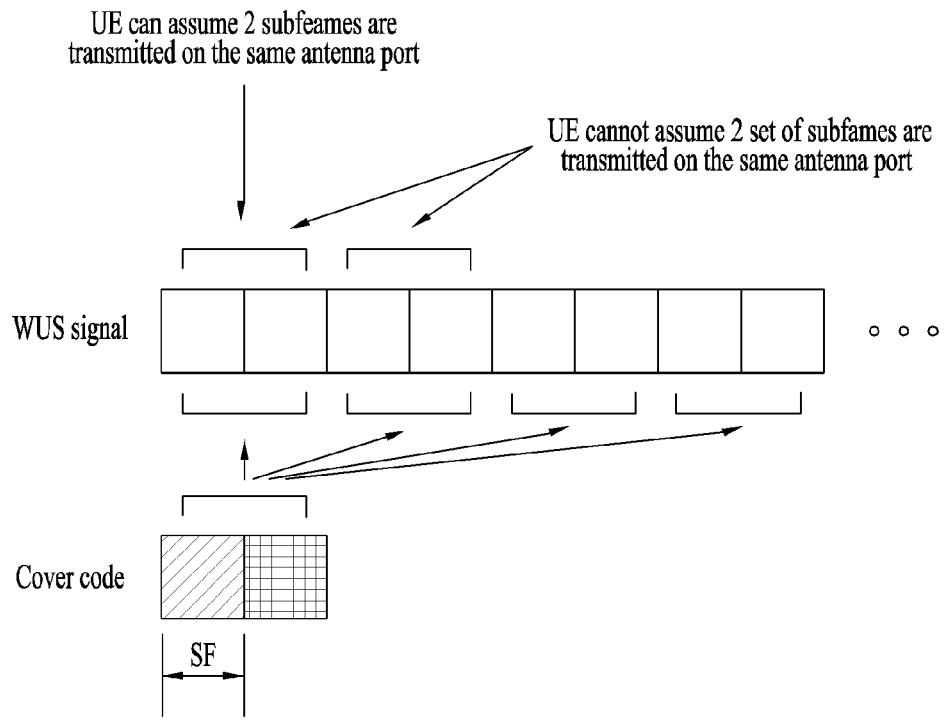

[FIG. 22]
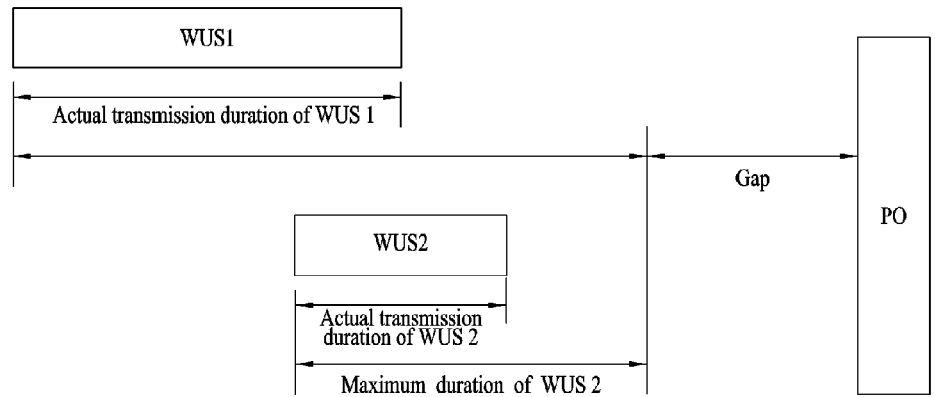
[FIG. 23]
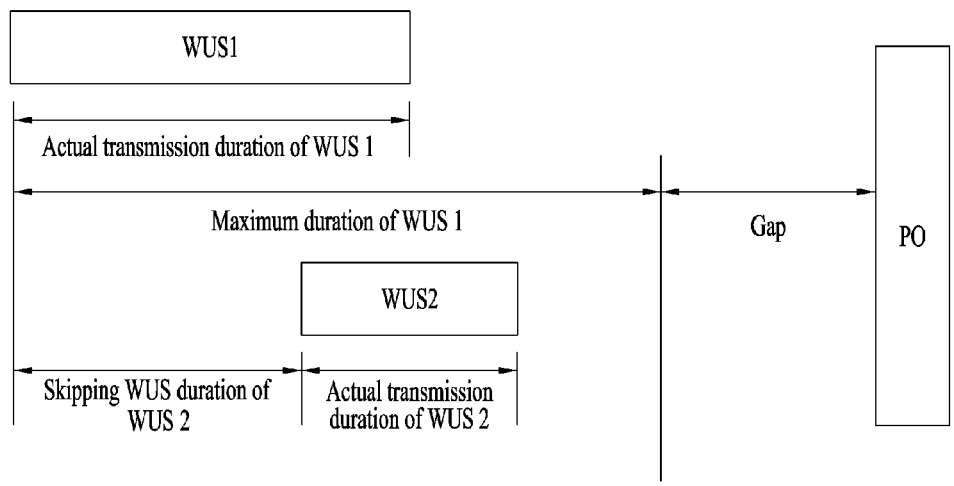

[FIG. 24]
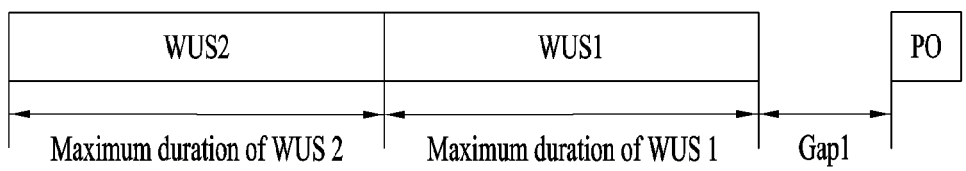
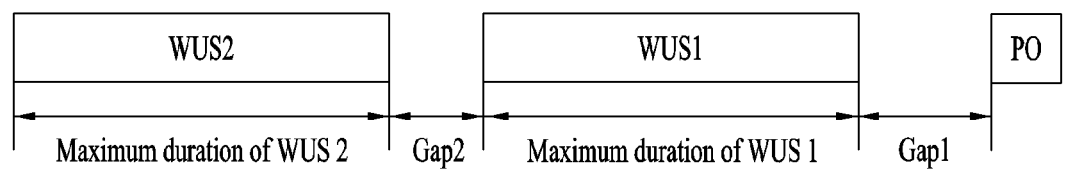
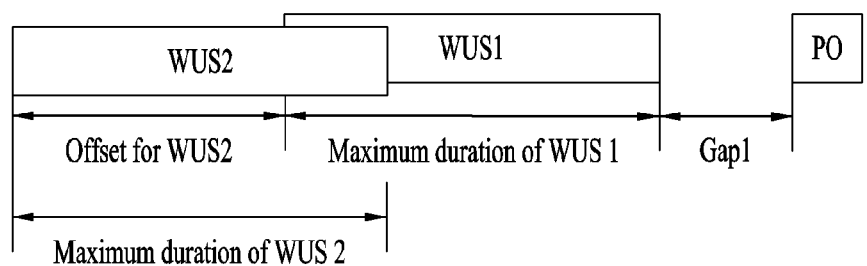

[FIG. 25]
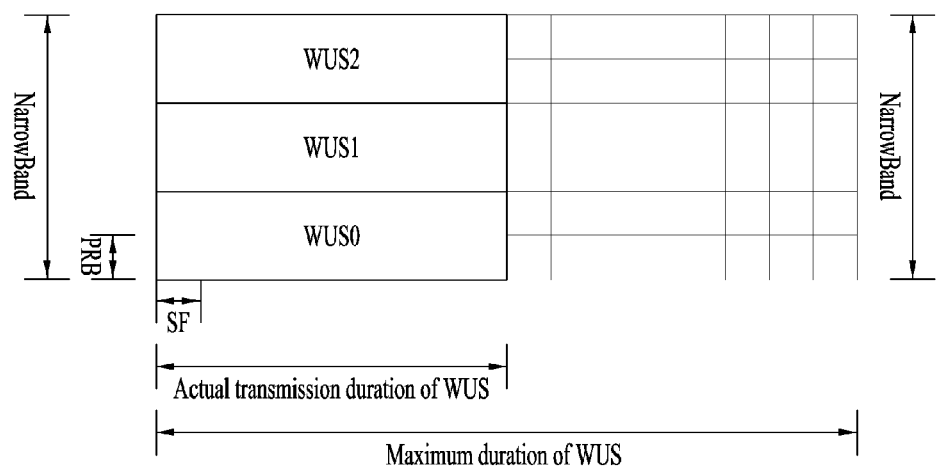

[FIG. 26]
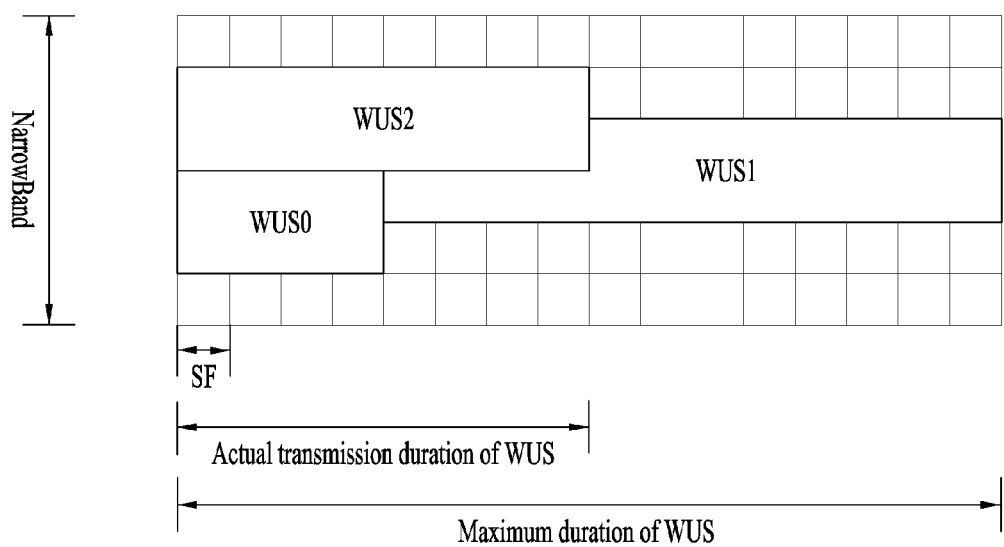

[FIG. 27]
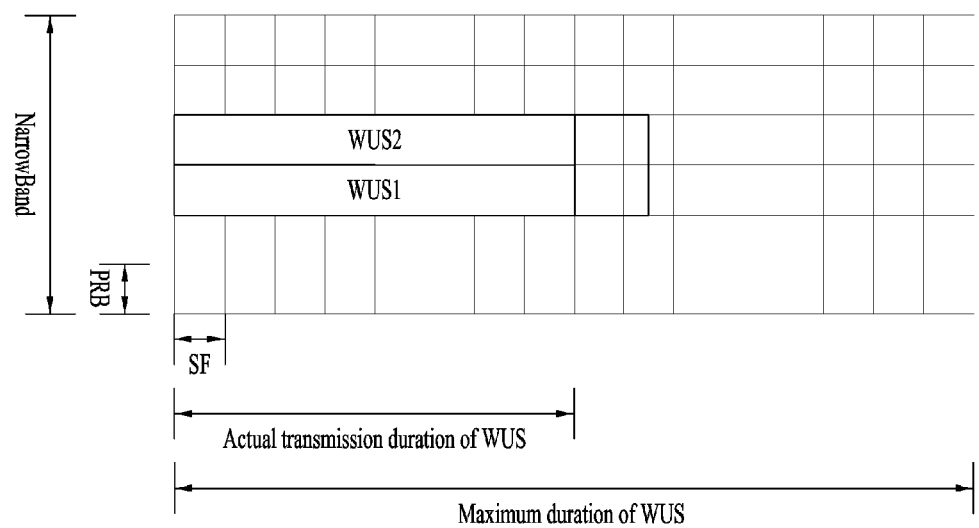

[FIG. 28]
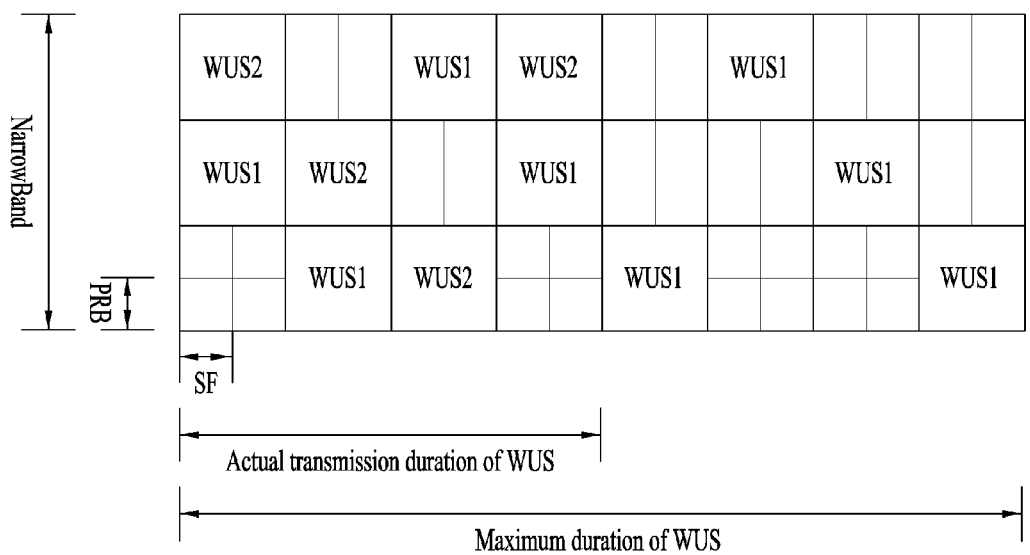

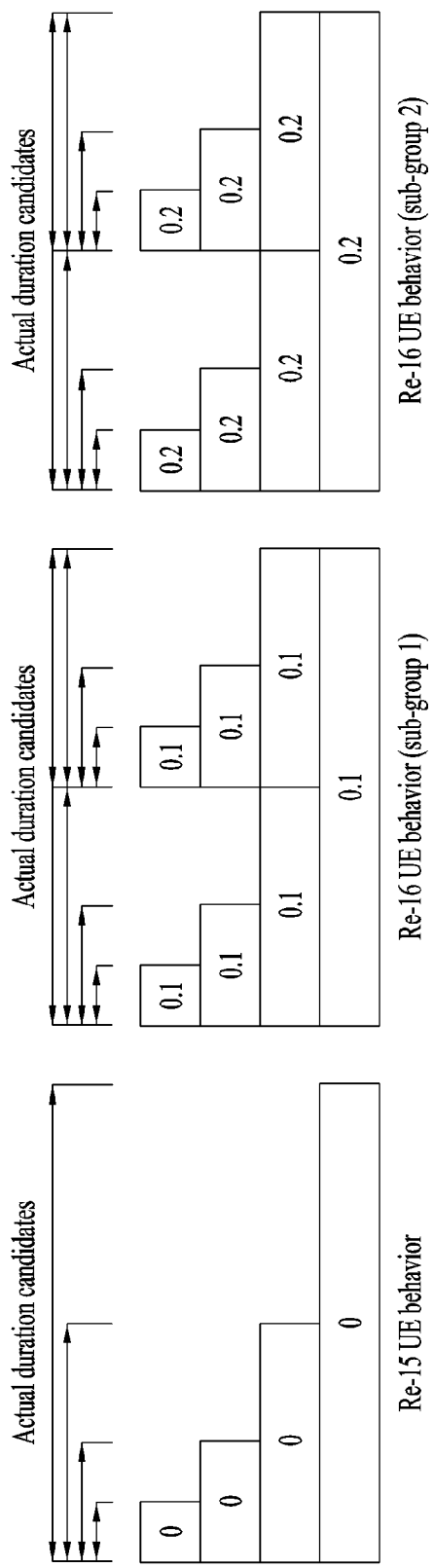
[FIG. 29]

[FIG. 30]
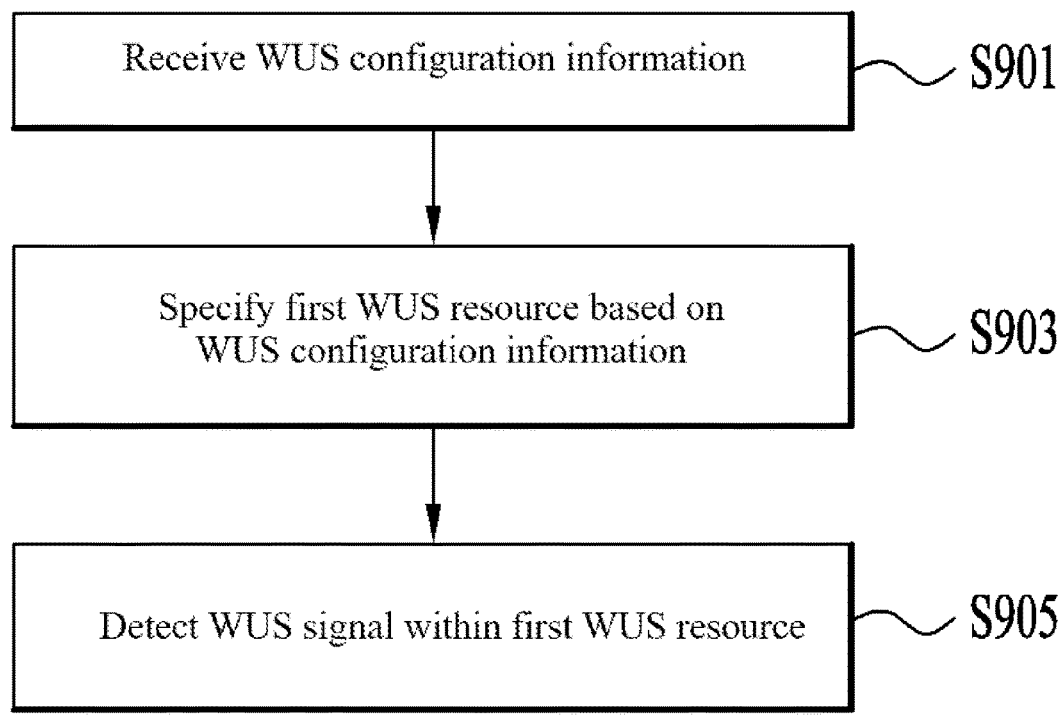

[FIG. 31]
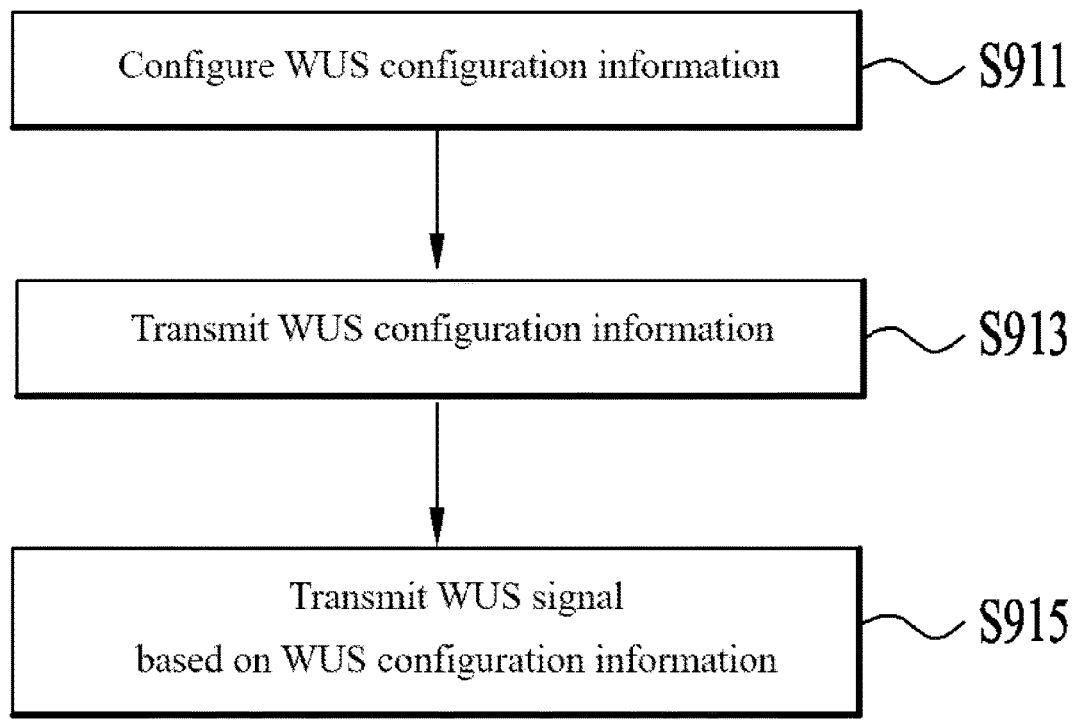

[FIG. 32]
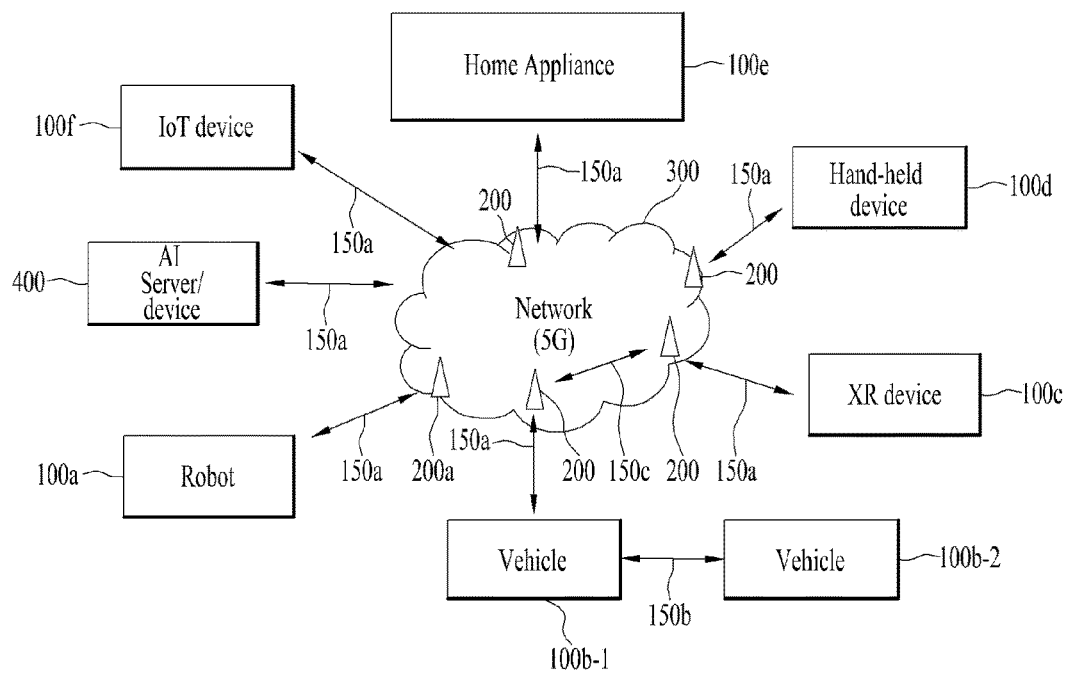
[FIG. 33]
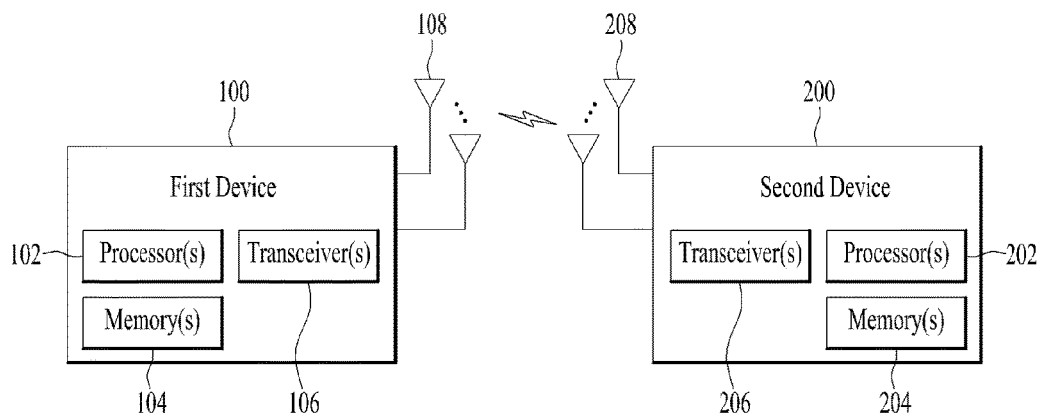

[FIG. 34]
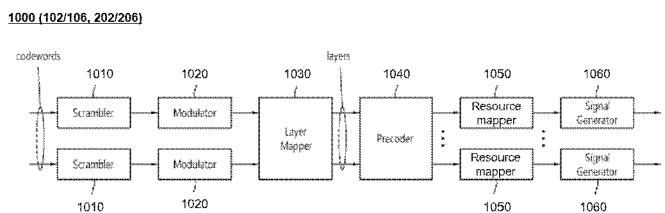
[FIG. 35]
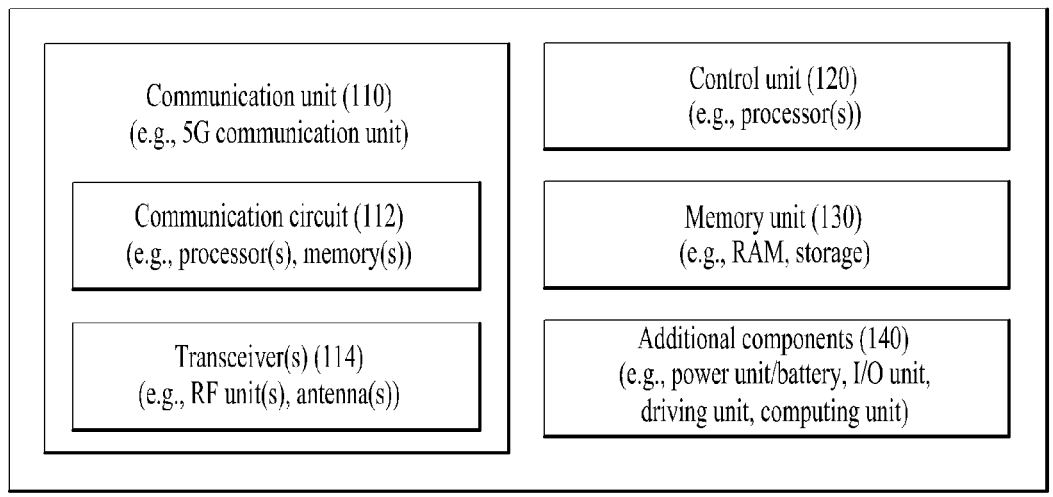

[FIG. 36]
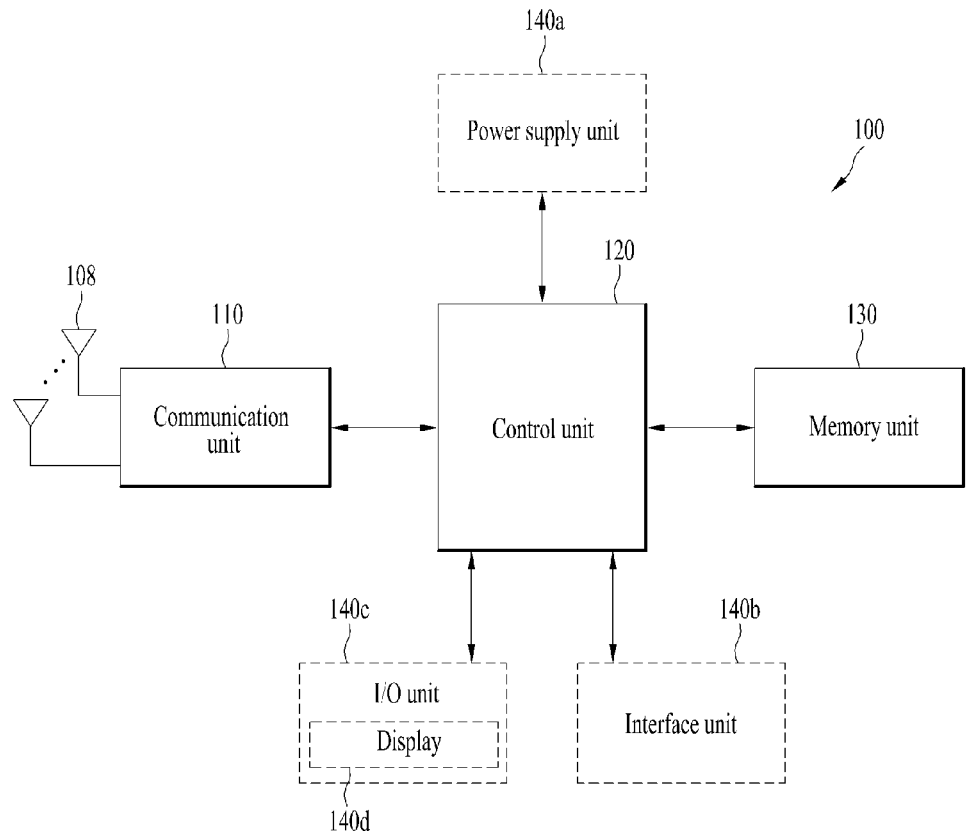
[FIG. 37]
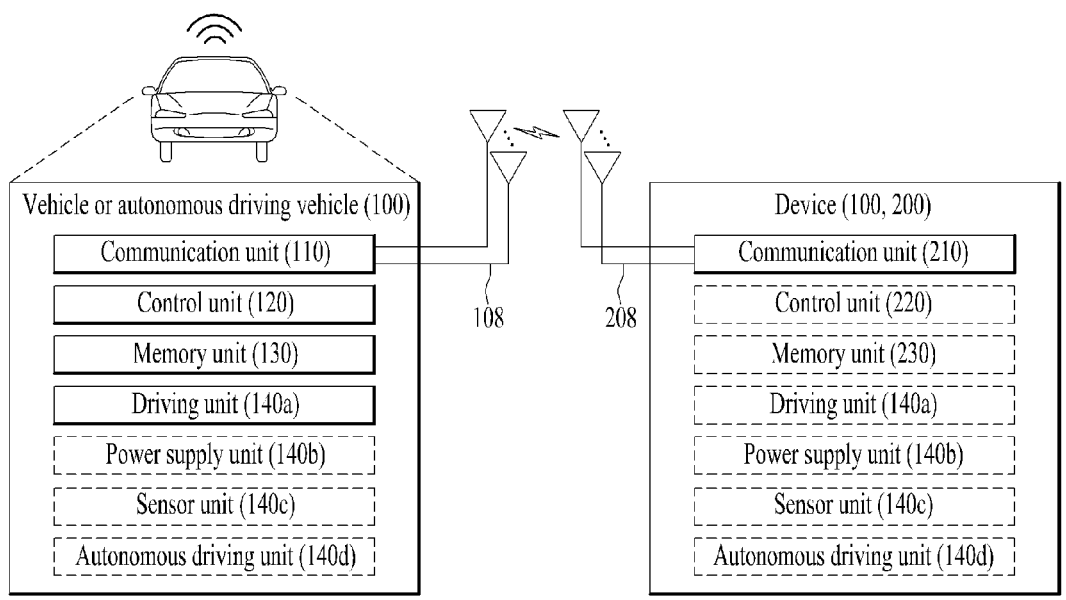

METHOD AND DEVICE FOR COMMUNICATION DEVICE TO SENSE OR TRANSMIT WUS SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2019/010138, filed on Aug. 9, 2019, which claims the benefit of earlier filing date and right of priority to Korean Application Nos. 10-2018-0093427 filed on Aug. 9, 2018, 10-2018-0114484 filed on Sep. 21, 2018, 10-2018-0137664 filed on Nov. 9, 2018, 10-2019-0017253 filed on Feb. 14, 2019 and 10-2019-0051394 filed on May 2, 2019, the contents of which are all hereby incorporated by reference herein in their entirety.

TECHNICAL FIELD

The present disclosure relates to a wireless communication system, and more particularly, to a method for detecting or transmitting a WUS signal by a communication device and apparatus therefor.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DETAILED DESCRIPTION OF DISCLOSURE

Technical Task

One technical task of the present disclosure is to provide a method and apparatus for minimizing power consumption according to unnecessary wakeup due to allocation of a WUS resource per UE group to efficiently perform monitoring of a WUS signal in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In one technical aspect of the present disclosure, provided herein is a method for detecting a Wake Up Signal (WUS) signal by a user equipment in a wireless communication system, the method including receiving WUS configuration information related to a first WUS resource and a second WUS resource from a base station, specifying the first WUS resource based on the WUS configuration information, and detecting the WUS signal from the specified WUS resource, wherein if the WUS signal is a group WUS signal, the first WUS resource may be specified to be continuous with the second WUS resource in a time domain.

The WUS configuration information may include an offset value for the second WUS resource only, from among the first WUS resource and the second WUS resource and the offset value may include information regarding a time gap between a Paging Occasion (PO) and the second WUS resource.

For the first WUS resource, a size of the time gap between the PO and the first WUS resource may be determined based on a maximum duration of the second WUS resource and the offset value of the second WUS.

The first WUS resource may be specified to have an ending point of a time resource unit related to a starting point of a time resource unit of the second WUS resource.

The second WUS resource may be a WUS resource for reception of the WUS signal common for user equipments or another group WUS resource for detecting the group WUS signal.

The WUS configuration information may include an offset value for each of the first WUS resource and the second WUS resource and the offset value may be information regarding a time gap between a Paging Occasion (PO) and a WUS resource.

The offset value may be configured differently for each of the first WUS resource and the second WUS resource to prevent the first WUS resource and the second WUS resource from overlapping each other.

The offset value configured for the first WUS signal may be configured as a value related to a sum of the offset value configured for the second WUS signal and a maximum duration of the second WUS signal.

The WUS configuration information may include information on a skipping WUS duration in which monitoring of the WUS signal is not performed within the first WUS resource.

The WUS configuration information may include information on a maximum duration for the second WUS resource and information on a scaling factor and a maximum duration for the first WUS resource may be determined as a multiplication of the maximum duration for the second WUS resource and the scaling vector.

The WUS configuration information may include a scaling factor for each of the first WUS signal and the second WUS signal and an Rmax value to determine a repetition level of a paging and a maximum duration of the first WUS signal may be determined based on a multiplication of the scaling factor related to the first WUS resource and the Rmax.

If a size of the time gap between the first WUS resource and the PO is smaller than a preset threshold, the first WUS resource is specified to be continuous with the second WUS resource in a time domain.

In another technical aspect of the present disclosure, provided herein is method of transmitting a Wake Up Signal (WUS) by a base station in a wireless communication system, the method including configuring WUS configuration information specifying each of a plurality of WUS resources having the WUS signal monitored therein, transmitting the configured WUS configuration information, and transmitting the WUS signal related to each of a plurality of the WUS resources based on the WUS configuration information, wherein if the WUS signal includes a group WUS signal, the WUS configuration information may include configuration information of performing Time Division Multiplexing (TDM) on a plurality of the WUS resources to be continuous with each other in a time domain.

In another technical aspect of the present disclosure, provided herein is an apparatus for monitoring a Wake Up Signal (WUS) signal in a wireless communication system, the apparatus including a memory storing a program and a processor operating based on the program stored in the memory, wherein the processor may be configured to specify a first WUS resource based on WUS configuration information related to a first WUS resource and a second WUS resource received from a base station based on the program and wherein if the WUS signal includes a group WUS signal, the first WUS resource may be specified to be continuous with the second WUS resource in a time domain.

The processor may receive an input of a user and then switch a drive mode of a vehicle related to the apparatus to a manual drive mode from an autonomous drive mode, and vice versa.

In further technical aspect of the present disclosure, provided herein is an apparatus for transmitting a Wake Up Signal (WUS) signal in a wireless communication system, the apparatus including a memory storing a program and a processor operating based on the program stored in the memory, wherein the processor may be configured to configure WUS configuration information specifying each of a plurality of WUS resources having the WUS signal monitored therein based on the program, transmit the configured WUS configuration information to another device, and transmit the WUS signal related to each of a plurality of the WUS resources based on the WUS configuration information and wherein if the WUS signal incudes a group WUS signal, the WUS configuration information may include configuration information of performing Time Division Multiplexing (TDM) on a plurality of the WUS resources to be continuous with each other in a time domain.

Advantageous Effects

According to various embodiments, power consumption according to unnecessary wakeup can be minimized by allocation of a WUS resource per UE group to efficiently perform monitoring of a WUS signal in a wireless communication system.

The effects that can be achieved with the present disclosure are not limited to what has been particularly described hereinabove and other advantages not described herein will be more clearly understood by persons skilled in the art from the following detailed description of the present disclosure.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

FIG. 1 illustrates physical channels used in a 3GPP LTE(-A)) system and a signal transmission method using the same.

FIG. 2 illustrates a radio frame structure.

FIG. 3 illustrates a resource grid of a downlink slot.

FIG. 4 illustrates a downlink subframe structure.

FIG. 5 illustrates the structure of an uplink subframe used in LTE(-A).

FIG. 6 illustrates an exemplary structure of a self-contained subframe.

FIG. 7 illustrates frame structures defined in 3GPP NR.

FIG. 8 illustrates arrangement of an in-band anchor carrier in an LTE bandwidth of 10 MHz.

FIG. 9 illustrates positions at which NB-IoT downlink physical channels/signals are transmitted in an FDD LTE system.

FIG. 10 illustrates resource allocation for an NB-IoT signal and an LTE signal in an in-band mode.

FIG. 11 illustrates multi-carrier scheduling.

FIG. 12 illustrates an example of a resource grid in NR.

FIG. 13 illustrates an example of a physical resource block in NR.

FIG. 14 illustrates an example of operation modes supported in the NB-IoT system.

FIG. 15 illustrates an example of physical channels available in the NB-IoT and a general signal transmission method using the same.

FIG. 16 illustrates an example of an initial access procedure of NB-IoT.

FIG. 17 illustrates an example of a random access procedure of NB-IoT.

FIG. 18 illustrates an example of DRX mode in an idle state and/or an inactive state.

FIG. 19 illustrates an example of a DRX configuration and indication procedure for the NB-IoT UE.

FIG. 20 illustrates Wake-Up Signal (WUS) transmission.

FIG. 21 is a diagram to describe a structure to which a fifth CDM scheme is applied.

FIG. 22 is a diagram to describe a method of configuring a maximum WUS duration different per UE subgroup.

FIG. 23 is a diagram to describe UE subgrouping according to a sixth TDM scheme.

FIG. 24 is a diagram to describe a method of performing UE subgrouping according to a seventh TDM scheme.

FIG. 25 and FIG. 26 are diagrams to describe a UE subgrouping method using a position of a frequency resource used for mapping of WUS.

FIG. 27 is a diagram to describe a method of performing UE subgrouping according to a second FDM scheme.

FIG. 28 is a diagram to describe a method of performing UE subgrouping according to a third FDM scheme.

FIG. 29 is a diagram to describe a method of performing UE subgrouping according to a first C/TDM scheme.

FIG. 30 is a flowchart to describe a method for a User Equipment (UE) to monitor a WUS signal according to one embodiment of the present disclosure.

FIG. 31 is a flowchart to describe a method for a Base Station (BS) to transmit a WUS signal according to one embodiment of the present disclosure.

FIG. 32 illustrates a communication system applied to the present disclosure.

FIG. 33 illustrates a wireless device applicable to the present disclosure.

FIG. 34 illustrates a signal process circuit for a transmission signal.

FIG. 35 illustrates another example of a wireless device applied to the present disclosure.

FIG. 36 illustrates a hand-held device applied to the present disclosure.

FIG. 37 illustrates a vehicle or an autonomous driving vehicle applied to the present disclosure.

BEST MODE FOR DISCLOSURE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink (DL) and SC-FDMA for uplink (UL). LTE-Advanced (LTE-A) evolves from 3GPP LTE. While the following description is given, centering on 3GPP LTE/LTE-A for clarity, this is purely exemplary and thus should not be construed as limiting the present disclosure.

In a wireless communication system, a user equipment (UE) receives information through DL from a base station (BS) and transmit information to the BS through UL. The information transmitted and received by the BS and the UE includes data and various control information and includes various physical channels according to type/usage of the information transmitted and received by the UE and the BS.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a DL channel status by receiving a DL reference signal (RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general DL/UL signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

FIG. 2 illustrates a radio frame structure. UL/DL data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(a) illustrates a type-1 radio frame structure. A DL subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since DL uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for UL or DL according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE 1-continued

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and UL transmission synchronization in a UE. The GP eliminates UL interference caused by multi-path delay of a DL signal between a UL and a DL. The radio frame structure is merely exemplary and the number of subframes included in the radio frame, the number of slots included in a subframe, and the number of symbols included in a slot can be vary.

FIG. 3 illustrates a resource grid of a DL slot.

Referring to FIG. 3, a DL slot includes a plurality of OFDM symbols in the time domain. While one DL slot may include 7 OFDM symbols and one resource block (RB) may include 12 subcarriers in the frequency domain in the figure, the present disclosure is not limited thereto. Each element on the resource grid is referred to as a resource element (RE). One RB includes 12×7 REs. The number NRB of RBs included in the DL slot depends on a DL transmit bandwidth. The structure of a UL slot may be same as that of the DL slot.

FIG. 4 illustrates a DL subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical DL shared chancel (PDSCH) is allocated. A basic resource unit of the data region is an RB. Examples of DL control channels used in LTE include a physical control format indicator channel (PCFICH), a physical DL control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/negative-acknowledgment (NACK) signal. Control information transmitted through the PDCCH is referred to as DL control information (DCI). The DCI includes UL or DL scheduling information or a UL transmit power control command for an arbitrary UE group.

Control information transmitted through the PDCCH is referred to as DL control information (DCI). Formats 0, 3, 3A and 4 for UL and formats 1, 1A, 1B, 1C, 1D, 2, 2A, 2B and 2C for DL are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a DL shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other DL control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality DL channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
| --- | --- | --- | --- |
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Transmission mode (TM)
 Transmission mode 1: Transmission from a single base station antenna port
 Transmission mode 2: Transmit diversity
 Transmission mode 3: Open-loop spatial multiplexing
 Transmission mode 4: Closed-loop spatial multiplexing
 Transmission mode 5: Multi-user MIMO (Multiple Input Multiple Output)
 Transmission mode 6: Closed-loop rank-1 precoding
 Transmission mode 7: Single-antenna port (port5) transmission
 Transmission mode 8: Double layer transmission (ports 7 and 8) or single-antenna port (port 7 or 8) transmission
 Transmission mode 9: Transmission through up to 8 layers (ports 7 to 14) or single-antenna port (port 7 or 8) transmission DCI Format
 Format 0: Resource grants for PUSCH transmission
 Format 1: Resource assignments for single codeword PDSCH transmission (transmission modes 1, 2 and 7)
 Format 1A: Compact signaling of resource assignments for single codeword PDSCH (all modes)
 Format 1B: Compact resource assignments for PDSCH using rank-1 closed loop precoding (mod 6)
 Format 1C: Very compact resource assignments for PDSCH (e.g. paging/broadcast system information)
 Format 1D: Compact resource assignments for PDSCH using multi-user MIMO (mode 5)
 Format 2: Resource assignments for PDSCH for closed-loop MIMO operation (mode 4)
 Format 2A: Resource assignments for PDSCH for open-loop MIMO operation (mode 3)
 Format 3/3A: Power control commands for PUCCH and PUSCH with 2-bit/1-bit power adjustments FIG. 5 is a diagram illustrating a UL subframe structure in LTE(-A).

Referring to FIG. 5, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the UL subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of a UL control signal, for example, DL channel quality report from each UE, reception ACK/NACK for a DL signal, UL scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit a UL channel state to an eNB and is periodically transmitted according to a subframe period/offset set by a higher layer (e.g., RRC layer) or aperiodically transmitted at the request of the eNB.

To minimize data transmission latency, a self-contained subframe is considered in the next-generation radio access technology (RAT). FIG. 6 illustrates an exemplary self-contained subframe structure. In FIG. 6, the hatched area represents a DL control region, and the black area represents a UL control region. The area having no marks may be used for either DL data transmission or UL data transmission. In this structure, DL transmission and UL transmission are sequentially performed in one subframe to transmit DL data and receive a UL ACK/NACK for the DL data in the subframe. As a result, the resulting reduction of a time taken to retransmit data when a data transmission error occurs may lead to minimization of the latency of a final data transmission.

At least the following four subframe types may be considered as exemplary constructible/configurable self-contained subframe types. Periods are enumerated in time order.

DL control period+DL data period+guard period (GP)+ UL control period

DL control period+DL data period

DL control period+GP+UL data period+UL control period

DL control period+GP+UL data period

A PDFICH, a PHICH, and a PDCCH may be transmitted in the DL control period, and a PDSCH may be transmitted in the DL data period. A PUCCH may be transmitted in the UL control period, and a PUSCH may be transmitted in the UL data period. The GP provides a time gap for switching from a transmission mode to a reception mode or from the reception mode to the transmission mode at an eNB and a UE. Some OFDM symbol(s) at a DL-to-UL switching time may be configured as the GP.

In the environment of the 3GPP NR system, different OFDM numerologies, for example, different subcarrier spacings (SCSs) and hence different OFDM symbol (OS) durations may be configured between a plurality of cells aggregated for one UE. Accordingly, the (absolute time) duration of a time resource (e.g., SF, slot or TTI) (referred to as a time unit (TU) for convenience) including the same number of symbols may be set differently for the aggregated cells. Herein, the term symbol may cover OFDM symbol and SC-FDMA symbol.

FIG. 7 illustrates frame structures defined in 3GPP NR. In 3GPP NR, one radio frame includes 10 subframes each being 1 ms in duration, like a radio frame in LTE/LTE-A (see FIG. 2). One subframe includes one or more slots and the length of a slot varies with an SCS. 3GPP NR supports SCSs of 15 KHz, 30 KHz, 60 KHz, 120 KHz, and 240 KHz. A slot corresponds to a TTI in FIG. 6.

As noted from Table 4, the number of symbols per slot, the number of slots per frame, and the number of slots per subframe vary according to SCSs.

TABLE 4

| SCS (15*2^u) | Number of symbols per slot | Number of slots per frame | Number of slots persubframe |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

A description will be given of narrowband Internet of things (NB-IoT). While NB-IoT is described based on the 3GPP LTE standards for convenience, the following description is also applicable to the 3GPP NR standards. For this purpose, some technical configurations may be replaced with other ones in interpretation (e.g., LTE band→NR band and subframe→slot). NB-IoT supports three operation modes: in-band mode, guard-band mode, and stand-alone mode. The same requirements apply to each mode.

(1) In-band mode: a part of the resources of the LTE band are allocated to NB-IoT.

(2) Guard-band mode: a guard frequency band of the LTE band is used, and an NB-IoT carrier is arranged as close as possible to an edge subcarrier of the LTE band.

(3) Stand-alone mode: some carriers in the GSM band are allocated to NB-IoT.

An NB-IoT UE searches for an anchor carrier in units of 100 kHz, for initial synchronization, and the center frequency of the anchor carrier should be located within ±7.5 kHz from a 100-kHz channel raster in the in-band and guard-band. Further, the center 6 physical resource blocks (PRBs) of the LTE PRBs are not allocated to NB-IoT. Therefore, the anchor carrier may be located only in a specific PRB.

FIG. 8 is a diagram illustrating arrangement of an in-band anchor carrier in an LTE bandwidth of 10 MHz.

Referring to FIG. 8, a direct current (DC) subcarrier is located on a channel raster. Since the center frequency spacing between adjacent PRBs is 180 kHz, the center frequencies of PRBs 4, 9, 14, 19, 30, 35, 40 and 45 are located at ±2.5 kHz from the channel raster. Similarly, when the bandwidth is 20 MHz, the center frequency of a PRB suitable as the anchor carrier is located at ±2.5 kHz from the channel raster, and when the bandwidth is 3 MHz, 5 MHz, or 15 MHz, the center frequency of a PRB suitable as the anchor carrier is located at ±7.5 kHz from the channel raster.

In the guard-band mode, given bandwidths of 10 MHz and 20 MHz, the center frequency of a PRB immediately adjacent to an edge PRB of the LTE system is located at ±2.5 kHz from the channel raster. Further, given bandwidths of 3 MHz, 5 MHz, and 15 MHz, a guard frequency band corresponding to three subcarriers from an edge PRB may be used, and thus the center frequency of the anchor carrier may be located at ±7.5 kHz from the channel raster.

In the stand-alone mode, an anchor carrier is aligned with the 100-kHz channel raster, and all GSM carriers including the DC carrier may be available as the NB-IoT anchor carrier.

Further, NB-IoT may support multiple carriers, and a combination of in-band and in-band, a combination of in-band and guard-band, a combination of guard-band and guard-band, and a combination of stand-alone and stand-alone are available.

NB-IoT DL uses OFDMA with a 15-kHz SCS. OFDMA provides orthogonality between subcarriers, so that the NB-IoT system and the LTE system may coexist smoothly.

For NB-IoT DL, physical channels such as a narrowband physical broadcast channel (NPBCH), a narrowband physical downlink shared channel (NPDSCH), and a narrowband physical downlink control channel (NPDCCH) may be provided, and physical signals such as a narrowband primary synchronization signal (NPSS), a narrowband primary synchronization signal (NSSS), and a narrowband reference signal (NRS) are provided.

The NPBCH delivers minimum system information required for an NB-IoT UE to access the system, a master information block-narrowband (MIB-NB) to the NB-IoT UE. The NPBCH signal may be transmitted repeatedly eight times in total for coverage enhancement. The transport block size (TBS) of the MIB-NB is 34 bits and updated every TTI of 640 ms. The MIB-NB includes information about an operation mode, a system frame number (SFN), a hyper-SFN, the number of cell-specific reference signal (CRS) ports, and a channel raster offset.

The NPSS includes a Zadoff-Chu (ZC) sequence of length 11 and root index 5. The NPSS may be generated by the following equation.

$$d_l(n) = S(l) \cdot e^{-j\frac{\pi u n(n+1)}{11}}, n = 0, 1, \ldots, 10 \quad \text{[Equation 1]}$$

S(l) for symbol index l may be defined as illustrated in Table 5.

TABLE 5

| Cyclic prefix length | S(3), . . . , S(13) |
| --- | --- |
| Normal | 1  1  1  1  −1  −1  1  1  1  −1  1 |

The NSSS includes a combination of a ZC sequence of length 131 and a binary scrambling sequence such as a Hadamard sequence. The NSSS indicates a PCID to NB-IoT UEs within the cell by the combination of sequences. The NSSS may be generated by the following equation.

$$d(n) = b_q(m)e^{-j2\pi\theta_f n}e^{-j\frac{\pi un'(n'+1)}{131}} \quad \text{[Equation 2]}$$

Variables applied to Equation 2 may be defined as follows.

$$n = 0, 1, \ldots, 131 \quad \text{[Equation 3]}$$
$$n' = n\bmod 131$$
$$m = n\bmod 128$$
$$u = N_{ID}^{Ncell}\bmod 126 + 3$$
$$q = \left\lfloor \frac{N_{ID}^{Ncell}}{126} \right\rfloor$$

A binary sequence $b_q(m)$ may be defined as illustrated in Table 6, and $b_0(m)$ to $b_3(m)$ represent columns 1, 32, 64, and 128 of a Hadamard matrix of order 128. A cyclic shift $\theta_f$ for a frame number $n_f$ may be defined by Equation 4 below.

TABLE 6 q  b_q (0), . . . b_q (127)

0 [1 1 1 1 1 1 1 1 1 1 1 1 1 1 1 1 1 1 1 1 1 1 1 1 1 1 1 1 1 1 1 1
  1 1 1 1 1 1 1 1 1 1 1 1 1 1 1 1 1 1 1 1 1 1 1 1 1 1 1 1 1 1 1 1
  1 1 1 1 1 1 1 1 1 1 1 1 1 1 1 1 1 1 1 1 1 1 1 1 1 1 1 1 1 1 1 1]
1 [1 −1 −1 1 −1 1 1 −1 −1 1 1 −1 1 −1 1 −1 1 1 −1 1 −1 1 1 −1 1
  −1 1 1 −1 1 −1 1 −1 1 1 −1 −1 1 1 1 −1 1 −1 −1 1 1 −1 1 1 −1 1 −1 1 1 1
  −1 −1 1 1 −1 1 1 −1 −1 1 1 −1 1 −1 −1 1 1 −1 1 1 −1 1 −1 1 1 1 −1 1 1
  −1 −1 1 1 −1 −1 1 −1 1 −1 1 1 1 −1 1 −1 1 1 1 −1 −1 1 1 −1 1 −1 −1 1 1
  1 −1 1 −1 −1 1 1 1 −1 −1 1 1 −1 1 1 −1]
2 [1 −1 −1 1 −1 1 1 1 −1 −1 1 1 1 −1 1 −1 −1 1 −1 1 1 1 −1 1 −1 −1 1 1 1 −1 1 1
  −1 1 1 −1 −1 1 1 1 −1 1 −1 1 1 −1 −1 1 1 1 −1 −1 1 −1 1 1 1 −1 1 −1 −1 1 −1 −1
  1 1 −1 1 −1 1 1 −1 −1 1 1 −1 1 1 1 −1 1 −1 −1 1 1 −1 1 −1 −1 1 1 1 −1
  −1 1 1 −1 −1 1 −1 1 1 −1 1 −1 1 −1 1 −1 1 −1 1 −1 −1 1 −1 1 1 1 −1 1
  1 −1 1 −1 −1 1 1 −1 −1 1 1 1 −1 1]
3 [1 −1 −1 1 −1 1 1 1 −1 −1 1 1 1 −1 1 −1 −1 1 −1 1 1 1 −1 1 −1 −1 1 1 1 −1 1 1
  −1 1 1 −1 −1 1 1 1 −1 1 −1 1 1 −1 −1 1 1 1 −1 −1 1 −1 1 1 1 −1 1 −1 −1 1 −1 −1
  1 1 −1 1 −1 1 1 −1 −1 1 1 −1 1 1 1 −1 1 −1 −1 1 1 −1 1 −1 −1 1 1 1 −1 −1 1 1
  1 −1 1 1 −1 1 −1 −1 1 1 −1 −1 1 −1 1 −1 1 −1 1 −1 −1 1 −1 1 1 1 −1 1 1 1
  −1 1 −1 −1 1 1 1 −1 1 1 −1 1 1 1 −1]

$$\theta_f = \frac{33}{132}(n_f/2)\bmod 4 \quad \text{[Equation 4]}$$

In Equation 4, of represents a radio frame number and mod represents a modulo function.

The NRS, which is a reference signal for channel estimation required for demodulation of a DL physical channel, is generated in the same manner as in LTE. However, the NRS uses a narrowband-physical cell ID (NB-PCID) (or NCell ID or NB-IoT BS ID) as an initial value for initialization. The NRS is transmitted through one or two antenna ports (p=2000 and 2001).

The NPDCCH has the same transmission antenna configuration as the NPBCH, and delivers DCI. The NPDCCH supports three types of DCI formats. DCI format N0 includes scheduling information about a narrowband physical uplink shared channel (NPUSCH), and DCI formats N1 and N2 include NPDSCH scheduling information. The NPDCCH may be transmitted repeatedly up to 2048 times, for coverage enhancement.

The NPDSCH is used to transmit data (e.g., a TB) of a transport channel such as a DL-SCH or a paging channel (PCH). The NPDSCH has a maximum TBS of 680 bits and may be transmitted repeatedly up to 2048 times, for coverage enhancement.

FIG. 9 is a diagram illustrating positions at which NB-IoT DL physical channels/signals are transmitted in an FDD LTE system.

Referring to FIG. 9, the NPBCH is transmitted in the first subframe of each radio frame, the NPSS is transmitted in the sixth subframe of each radio frame, and the NSSS is transmitted in the last subframe (e.g., tenth subframe) of each even-numbered frame. An NB-IoT UE acquires frequency synchronization, symbol synchronization, and frame synchronization and searches 504 PCIDs (i.e., BS IDs) by synchronization signals (the NPSS and the NSSS). The LTS synchronization signals are transmitted in 6 PRBs, whereas the NB-IoT synchronization signals are transmitted in one PRB.

In NB-IoT, UL physical channels include a narrowband physical random access channel (NPRACH) and an NPUSCH, and support single-tone transmission and multi-tone transmission. Multi-tone transmission is supported only for an SCS of 15 kHz, and single-tone transmission is supported for SCSs of 3.5 kHz and 15 kHz. On UL, when the SCS is 15 kHz, orthogonality with the LTE system is maintained, thereby providing optimum performance. However, the 3.75-kHz SCS may destroy the orthogonality, resulting in performance degradation due to interference.

An NPRACH preamble includes four symbol groups, each including a CP and five (SC-FDMA) symbols. The NPRACH supports only single-tone transmission with the 3.75-kHz SCS and provides CPs of 66.7 us and 266.67 us in length to support different cell radiuses. Each symbol group is subjected to frequency hopping in the following hopping pattern. Subcarriers carrying the first symbol group are determined pseudo-randomly. The second symbol group hops by one subcarrier, the third symbol group hops by six subcarriers, and the fourth symbol group hops by one subcarrier. In the case of repeated transmissions, the frequency hopping procedure is repeatedly applied. To enhance coverage, the NPRACH preamble may be repeatedly transmitted up to 128 times.

The NPUSCH supports two formats. NPUSCH format 1 is used for UL-SCH transmission and has a maximum TBS of 1000 bits. NPUSCH format 2 is used for UCI transmission such as HARQ-ACK signaling. NPUSCH format 1 supports single-tone transmission and multi-tone transmission, whereas NPUSCH format 2 supports only single-tone transmission. In single-tone transmission, p/2-binary phase shift keying (BPSK) and p/4-quadrature phase shift keying (QPSK) may be used to reduce a peak-to-average power ratio (PAPR).

In the stand-alone and guard-band modes, all resources of one PRB may be allocated to NB-IoT. However, there is a constraint on resource mapping in the in-band mode, for co-existence with a legacy LTE signal. For example, resources (OFDM symbols 0 to 2 in each subframe) classified as a region allocated for LTE control channels may not be allocated to the NPSS and NSSS, and NPSS and NSSS symbols mapped to LTE CRS REs are punctured.

FIG. 10 is a diagram illustrating resource allocation to an NB-IoT signal and an LTE signal in the in-band mode. Referring to FIG. 10, for ease of implementation, the NPSS and NSSS are not transmitted in OFDM symbols corresponding to the control region of the legacy LTE system (the first three OFDM symbols of a subframe) regardless of an operation mode. NPSS/NSS REs colliding with LTE CRS REs in physical resources are punctured, for mapping without affecting the legacy LTE system.

After the cell search, the NB-IoT UE demodulates the NPBCH without system information except for a PCID. Therefore, NPBCH symbols may not be mapped to the LTE control channel allocation region. Moreover, since the NB-IoT UE assumes four LTE antenna ports (e.g., p=0, 1, 2, and 3) and two NB-IoT antenna ports (e.g., p=2000 and 2001) in the situation without system information, the NB-IoT UE may not allocate the NPBCH to CRS REs and NRS REs. Therefore, the NPBCH is rate-matched according to available resources.

After demodulating the NPBCH, the NB-IoT UE may acquire information about the number of CRS antenna ports. However, the NB-IoT UE still may not acquire information about the LTE control channel allocation region. Therefore, the NPDSCH carrying system information block type 1 (SIB1) data is not mapped to resources classified as the LTE control channel allocation region.

However, unlike the NPBCH, REs which are not allocated to the LTE CRS may be allocated to the NPDSCH. Since the NB-IoT UE has acquired all information related to resource mapping after receiving SIB1, an eNB may map the NPDSCH (except for the case where SIB1 is transmitted) and the NPDCCH to available resources based on LTE control channel information and the number of CRS antenna ports.

FIG. 11 is a diagram illustrating an exemplary operation when multiple carriers are configured in FDD NB-IoT. In FDD NB-IoT, a DL/UL anchor carrier is basically configured, and a DL (and UL) non-anchor carrier may be additionally configured. RRCConnectionReconfiguration may include information about the non-anchor carrier. When the DL non-anchor carrier is configured, a UE receives data only in the DL non-anchor carrier. In contrast, synchronization signals (NPSS and NSSS), a broadcast signal (MIB and SIB), and a paging signal are provided only in the anchor carrier. When the DL non-anchor carrier is configured, the UE listens to only the DL non-anchor carrier while the UE is in an RRC_CONNECTED state. Similarly, when the UL non-anchor carrier is configured, the UE transmits data only in the UL non-anchor carrier, not being allowed to transmit data simultaneously in the UL non-anchor carrier and the UL anchor carrier. When the UE transitions to an RRC_IDLE state, the UE returns to the anchor carrier.

In the illustrated case of FIG. 11, UE1 is configured only with anchor carriers, UE2 is configured additionally with a DL/UL non-anchor carrier, and UE3 is configured additionally with a DL non-anchor carrier. Accordingly, each UE transmits and receives data in the following carriers.

UE1: data reception (DL anchor carrier) and data transmission (UL anchor carrier)
UE2: data reception (DL non-anchor carrier) and data transmission (UL non-anchor carrier)
UE3: data reception (DL non-anchor carrier) and data transmission (UL anchor carrier)

The NB-IoT UE is not capable of simultaneous transmission and reception, and a transmission/reception operation is limited to one band. Therefore, even though multiple carriers are configured, the UE requires only one transmission/reception chain in a 180-kHz band.

Table 7 lists system information defined in NB-IoT. A system information acquisition/changing process is performed only in the RRC_IDLE state. The UE does not expect to receive an SIB in the RRC_CONNECTED state. When system information has been changed, the system information change may be indicated to the UE by paging or a direct indication. For the purpose of providing the changed system information, the eNB may transition the UE to the RRC_IDLE state.

TABLE 7

| System Information Block | Content |
| --- | --- |
| MIB-NB | Essential information required to receive further system information |
| SIB1-NB | Cell access and selection, other SIB scheduling |
| SIB2-NB | Radio resource configuration information |
| SIB3-NB | Cell re-selection information for intra-frequency, interfrequency |
| SIB4-NB | Neighboring cell related information relevant for intrafrequency cell re-selection |
| SIB5-NB | Neighboring cell related information relevant for interfrequency cell re-selection |
| SIB14-NB | Access Barring parameters |
| SIB16-NB | Information related to GPS time and Coordinated Universal Time (UTC) |

The MIB-NB is transmitted on the NPBCH and updated every 640 ms. The first transmission of the MIB-NB takes place in subframe #0 of a radio frame satisfying SFN mod 0, and the MIB-NB is transmitted in subframe #0 of every radio frame. The MIB-NB is transmitted in 8 independently decodable blocks, each block being transmitted repeatedly 8 times. Table 8 describes the configuration of fields of the MIB-NB.

```
MasterInformationBlock-NB ::= SEQUENCE {
    systemFrameNumber-MSB-r13      BIT STRING (SIZE (4)),
    hyperSFN-LSB-r13               BIT STRING (SIZE (2))
    schedulingInfoSIB1-r13         INTEGER (0..15),
    systemInfoValueTag-r13         INTEGER (0...31),
```

```
ab-Enabled-r13                    BOOLEAN,
operationModeInfo-r13             CHOICE {
   inband-SamePCI-r13                Inband-Same-PCI-NB-r13,
   inband-DifferentPCI-r13           Inband-DifferentPCI-NB-r13,
   guardband-r13                     Guardband-NB-r13,
   standalone-r13                    Standalone-NB-r13
},
spare                             BIT STRING (SIZE (11))
}
ChannelRasterOffset-NB-r13 ::= ENUMERATED {khz-7dot5, khz-2dot5, khz2dot5, khz7dot5}
Guardband-NB-r13 ::=              SEQUENCE {
   rasterOffset-r13                  ChannelRasterOffset-NB-r13,
   spare                             BIT STRING (SIZE (3))
}
Inband-SamePCI-NB-r13 ::=         SEQUENCE {
   eutra-CRS-SequenceInfo-r13        INTEGER (0..31)
}
Inband-DifferentPCI-NB-r13 ::=    SEQUENCE {
   eutra-NumCRS-Ports-r13            ENUMERATED {same, four},
   rasterOffset-r13                  ChannelRasterOffset-NB-r13,
   spare                             BIT STRING (SIZE (2))
}
Standalone-NB-r13 ::=             SEQUENCE {
   spare                             BIT STRING (SIZE (5))
}
```

The SIB1-NB is transmitted on the NPDSCH, with a periodicity of 2560 ms.

The SIB1-NB is transmitted in subframe #4 of each of the even-numbered radio frames (i.e., 8 radio frames) of 16 consecutive radio frames. The indexes of the first radio frames carrying the SIB1-NB are derived according to an NPDSCH repetition number, Nrep and PCIDs. Specifically, when Nrep is 16 and the PCIDs are 2n and 2n+1, the indexes of the first radio frames are {0, 1}, and when Nrep is 8 and the PCIDs are 2n and 2n+1, the indexes of the first radio frames corresponding to the PCID of even numbers and the PCID of odd numbers are {0, 16}. Further, when Nrep is 4 and the PCIDs are 4n, 4n+1, 4n+2, and 4n+3, the indexes of the first radio frames are {0, 16, 32, 48}. The SIB1-NB is transmitted repeatedly Nrep times during 2560 ms, equally distributed across 2560 nm. The TBS and Nrep of the SIB1-NP are indicated by SystemInformationBlockType1-NB in the MIB-NB.

Table 9 lists NPDSCH repetition numbers according to SystemInformationBlockType1-NB.

TABLE 9

| Value of schedulingInfoSIB1 | Number of NPDSCH repetitions |
|---|---|
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12-15 | Reserved |

An SI message (i.e., information subsequent to the SIB2-NB) is transmitted within a time-domain window that occurs periodically. Scheduling information for the SI message is provided by the SIB1-NB. Each SI message is associated with one SI-window, and SI-windows of different SI messages do not overlap with each other. That is, only corresponding SI is transmitted within one SI-window. The lengths of the SI-windows are equal and configurable.

FIG. 12 illustrates an example of a resource grid in NR. Referring to the resource grid of FIG. 12, there are $N_{RB}^{\mu} N_{sc}^{RB}$ subcarriers in the frequency domain, and there are $14 \cdot 2^{\mu}$ OFDM symbols in one subframe. However, the resource grid is merely exemplary and the present disclosure is not limited thereto. In the NR system, a transmitted signal is described by one or more resource grids, each including $N_{RB}^{\mu} N_{sc}^{RB}$ subcarriers, and $2^{\mu} N_{symb}^{(\mu)}$ OFDM symbols. In this case, $N_{RB}^{\mu} \leq N_{RB}^{max,\mu}$. $N_{RB}^{max,\mu}$ denotes the maximum transmission bandwidth and may change not only between numerologies but also between uplink and downlink. As shown in FIG. 12, one resource grid may be configured for each numerology μ and antenna port p. Each element of the resource grid for the numerology μ and antenna port p is referred to as a resource element, and it is uniquely identified by an index pair (k,ī), where k is an index in the frequency domain (k=0, . . . , $N_{RB}^{\mu} N_{sc}^{RB}-1$) and ī denotes the location of a symbol in the subframe (ī=0, . . . , $2^{\mu} N_{symb}^{(\mu)}-1$). The resource element (k,ī) for the numerology μ and antenna port p corresponds to a complex value $a_{k,\bar{l}}^{(p,\mu)}$. When there is no risk of confusion or when a specific antenna port or numerology is not specified, the indexes p and μ may be dropped, and as a result, the complex value may be $a_{k,\bar{l}}^{(p)}$ or $a_{k,\bar{l}}$. In addition, a resource block (RB) is defined as $N_{sc}^{RB}=12$ consecutive subcarriers in the frequency domain.

Point A serves as a common reference point for resource block grids and may be obtained as follows.

OffsetToPointA for primary cell (PCell) downlink represents a frequency offset between point A and the lowest subcarrier of the lowest resource block in an SS/PBCH block used by the UE for initial cell selection. OffsetToPointA is expressed in the unit of resource block on the assumption of 15 kHz SCS for frequency range 1 (FR1) and 60 kHz SCS for frequency range 2 (FR2).

AbsoluteFrequencyPointA represents the frequency location of point A expressed as in absolute radio-frequency channel number (ARFCN).

Common resource blocks are numbered from 0 upwards in the frequency domain for SCS configuration The center of subcarrier 0 of common resource block 0 for the SCS configuration µ is equivalent to point A.

The relation between a common RB number $n_{CRB}^\mu$ in the frequency domain and a resource element (k,l) for the SCS configuration P is determined as shown in Equation 5.

$$n_{CRB}^\mu = \left\lfloor \frac{k}{N_{sc}^{RB}} \right\rfloor \qquad \text{[Equation 5]}$$

In Equation 5, k is defined relative to point A such that k=0 corresponds to a subcarrier centered on point A.

Physical resource blocks are defined within a bandwidth part (BWP) and numbered from 0 to $N_{BWP,i}^{size}-1$, where i denotes the number of the BWP.

The relationship between a physical resource block $n_{PRB}$ and a common resource block $n_{CRB}$ in BWP i is given by Equation 6.

$$n_{CRB} = n_{PRB} + N_{BWP,i}^{start} \qquad \text{[Equation 6]}$$

In Equation 6, $N_{BWP,i}^{start}$ is a common resource block where the BWP starts relative to common resource block 0.

FIG. 13 illustrates an example of a physical resource block in NR. Here, the time resource unit unit may be a subframe or a slot unit, and at least one symbol may be one time resource unit. Hereinafter, even if expressed as a subframe, the subframe may define a configuration corresponding to a time resource unit including several symbols.

FIG. 14 illustrates an example of operation modes supported in the NB-IoT system.

The NB-IoT system may support three operation modes. FIG. 14 illustrates an examples of operation modes supported in the NB-IoT system. Although the present disclosure describes the NB-IoT operation mode based on the LTE band, this is merely for convenience of description and the present disclosure is also applicable to other system bands (e.g., NR system band).

FIG. 14 (a) illustrates an in-band system, FIG. 14 (b) illustrates a guard-band system, and FIG. 14 (c) illustrates a stand-alone system. The in-band system, guard-band system, and stand-alone system may be referred to as in-band mode, guard-band mode, and stand-alone mode, respectively.

The in-band system may mean a system or mode that uses one specific RB (PRB) in the legacy LTE band for the NB-IoT. To operate the in-band system, some RBs of the LTE system carrier may be allocated.

The guard-band system may mean a system or mode that uses a space reserved for the guard band of the legacy LTE band for the NB-IoT. To operate the guard-band system, the guard band of the LTE carrier which is not used as the RB in the LTE system may be allocated. For example, the legacy LTE band may be configured such that each LTE band has the guard band of minimum 100 kHz at the end thereof. In order to use 200 kHz, two non-contiguous guard bands may be used.

The in-band system and the guard-band system may operate in a structure where the NB-IoT coexists in the legacy LTE band.

Meanwhile, the stand-alone system may mean a system or mode independent from the legacy LTE band. To operate the stand-alone system, a frequency band (e.g., reallocated GSM carrier) used in a GSM EDGE radio access network (GERAN) may be separately allocated.

The above three operation modes may be applied independently, or two or more operation modes may be combined and applied.

General Signal Transmission and Reception Procedure in NB-IoT

FIG. 15 illustrates an example of physical channels available in the NB-IoT and a general signal transmission method using the same.

In a wireless communication system, an NB-IoT UE may receive information from a base station in downlink (DL) and transmit information to the base station in uplink (UL). In other words, the base station may transmit the information to the NB-IoT UE in downlink and receive the information from the NB-IoT UE in uplink in the wireless communication system.

Information transmitted and received between the base station and the NB-IoT UE may include various data and control information, and various physical channels may be used depending on the type/usage of information transmitted and received therebetween. The NB-IoT signal transmission and reception method described with reference to FIG. 20 may be performed by the aforementioned wireless communication apparatuses (e.g., base station and UE).

When the NB-IoT UE is powered on or enters a new cell, the NB-IoT UE may perform initial cell search (S11). The initial cell search involves acquisition of synchronization with the base station. Specifically, the NB-IoT UE may synchronize with the base station by receiving an NPSS and an NSSS from the base station and obtain information such as a cell ID. Thereafter, the NB-IoT UE may acquire information broadcast in the cell by receiving an NPBCH from the base station. During the initial cell search, the NB-IoT UE may monitor the state of a downlink channel by receiving a downlink reference signal (DL RS).

In other words, when the NB-IoT UE enters the new cell, the BS may perform the initial cell search, and more particularly, the base station may synchronize with the UE. Specifically, the base station may synchronize with the NB-IoT UE by transmitting the NPSS and NSSS to the UE and transmit the information such as the cell ID. The base station may transmit the broadcast information in the cell by transmitting (or broadcasting) the NPBCH to the NB-IoT UE. The BS may transmit the DL RS to the NB-IoT UE during the initial cell search to check the downlink channel state.

After completing the initial cell search, the NB-IoT UE may acquire more detailed system information by receiving a NPDCCH and a NPDSCH related to thereto (S12). In other words, after the initial cell search, the base station may transmit the more detailed system information by transmitting the NPDCCH and the NPDSCH related to thereto to the NB-IoT UE.

Thereafter, the NB-IoT UE may perform a random access procedure to complete the access to the base station (S13 to S16).

Specifically, the NB-IoT UE may transmit a preamble on an NPRACH (S13). As described above, the NPRACH may be repeatedly transmitted based on frequency hopping for coverage enhancement. In other words, the base station may (repeatedly) receive the preamble from the NB-IoT UE over the NPRACH.

Then, the NB-IoT UE may receive a random access response (RAR) for the preamble from the base station on the NPDCCH and the NPDSCH related thereto (S14). That is, the base station may transmit the random access response (RAR) for the preamble to the base station on the NPDCCH and the NPDSCH related thereto.

The NB-IoT UE may transmit an NPUSCH using scheduling information in the RAR (S15) and perform a contention resolution procedure based on the NPDCCH and the NPDSCH related thereto (S16). That is, the base station may receive the NPUSCH from the NB-IoT UE based on the scheduling information in the RAR and perform the contention resolution procedure.

After performing the above-described processes, the NB-IoT UE may perform NPDCCH/NPDSCH reception (S17) and NPUSCH transmission (S18) as a normal UL/DL signal transmission procedure. After the above-described processes, the base station may transmit the NPDCCH/NPDSCH to the NB-IoT UE and receive the NPUSCH from the NB-IoT UE during the normal uplink/downlink signal transmission procedure.

In the NB-IoT, the NPBCH, NPDCCH, NPDSCH, etc. may be repeatedly transmitted for the coverage enhancement as described above. In addition, UL-SCH (normal uplink data) and UCI may be transmitted on the NPUSCH. In this case, the UL-SCH and UCI may be configured to be transmitted in different NPUSCH formats (e.g., NPUSCH format 1, NPUSCH format 2, etc.).

As described above, the UCI means control information transmitted from the UE to the base station. The UCI may include the HARQ ACK/NACK, scheduling request (SR), CSI, etc. The CSI may include the CQI, PMI, RI, etc. Generally, the UCI may be transmitted over the NPUSCH in the NB-IoT as described above. In particular, the UE may transmit the UCI on the NPUSCH periodically, aperiodically, or semi-persistently according to the request/indication from the network (e.g., base station).

Initial Access Procedure in NB-IoT

FIG. 16 illustrates an example of an initial access procedure of NB-IoT.

The procedure in which the NB-IoT UE initially accesses the BS is briefly described in the section "General Signal Transmission and Reception Procedure in NB-IoT". Specifically, the above procedure may be subdivided into a procedure in which the NB-IoT UE searches for an initial cell and a procedure in which the NB-IoT UE obtains system information.

FIG. 16 illustrates a particular procedure for signaling between a UE and a BS (e.g., NodeB, eNodeB, eNB, gNB, etc.) for initial access in the NB-IoT. In the following, a normal initial access procedure, an NPSS/NSSS configuration, and acquisition of system information (e.g., MIB, SIB, etc.) in the NB-IoT will be described with reference to FIG. 16.

Each physical channel and/or a name of a physical signal may be differently set or referred to according to a wireless communication system to which NB-IoT is applied. For example, although the NB-IoT based on the LTE system is considered in FIG. 16, this is merely for convenience of description and details thereof are applicable to the NB-IoT based on the NR system. The details of the initial access procedure are also applicable to the MTC.

Referring to FIG. 16, the NB-IoT UE may receive a narrowband synchronization signal (e.g., NPSS, NSSS, etc.) from the base station (S2110 and S2120). The narrowband synchronization signal may be transmitted through physical layer signaling.

The NB-IoT UE may receive a master information block (MIB) (e.g., MIB-NB) from the base station on an NPBCH (S2130). The MIB may be transmitted through higher layer signaling (e.g., RRC signaling).

The NB-IoT UE may receive a system information block (SIB) from the base station on an NPDSH (S2140 and S2150). Specifically, the NB-IoT UE may receive SIB1-NB, SIB2-NB, etc. on the NPDSCH through the higher layer signaling (e.g., RRC signaling). For example, SIB1-NB may refer to system information with high priority among SIBs, and SIB2-NB may refer to system information with lower priority than SIB1-NB.

The NB-IoT may receive an NRS from the BS (S2160), and this operation may be performed through physical layer signaling.

Random Access Procedure in NB-IoT

FIG. 17 illustrates an example of a random access procedure of NB-IoT.

The procedure in which the NB-IoT UE performs random access to the base station is briefly described in the section "General Signal Transmission and Reception Procedure in NB-IoT". Specifically, the above procedure may be subdivided into a procedure in which the NB-IoT UE transmits a preamble to the base station and a procedure in which the NB-IoT receives a response for the preamble.

FIG. 17 illustrates a particular procedure for signaling between a UE and a base station (e.g., NodeB, eNodeB, eNB, gNB, etc.) for random access in the NB-IoT. In the following, detail of the random access procedure in the NB-IoT will be described based on messages (e.g., msg1, msg2, msg3, msg4) used therefor.

FIG. 17 illustrates an example of the random access procedure in the NB-IoT. The name of each physical channel, physical signal, and/or message may vary depending on the wireless communication system to which the NB-IoT is applied. For example, although the NB-IoT based on the LTE system is considered in FIG. 22, this is merely for convenience of description and details thereof are applicable to the NB-IoT based on the NR system. The details of the initial access procedure are also applicable to the MTC.

Referring to FIG. 17, the NB-IoT may be configured to support contention-based random access.

First, the NB-IoT UE may select an NPRACH resource based on the coverage level of the corresponding UE. The NB-IoT UE may transmit a random access preamble (i.e., message 1, msg1) to the base station on the selected NPRACH resource.

The NB-IoT UE may monitor an NPDCCH search space to search for an NPDCCH for DCI scrambled with an RA-RNTI (e.g., DCI format N1). Upon receiving the NPDCCH for the DCI scrambled with the RA-RNTI, the UE may receive an RAR (i.e., message 2, msg2) from the base station on an NPDSCH related to the NPDCCH. The NB-IoT UE may obtain a temporary identifier (e.g., temporary C-RNTI), a timing advance (TA) command, etc. from the RAR. In addition, the RAR may also provide an uplink grant for a scheduled message (i.e., message 3, msg3).

To start a contention resolution procedure, the NB-IoT UE may transmit the scheduled message to the base station. Then, the base station may transmit an associated contention resolution message (i.e., message 4, msg4) to the NB-IoT UE in order to inform that the random access procedure is successfully completed.

By doing the above, the base station and the NB-IoT UE may complete the random access.

Discontinuous Reception (DRX) Procedure of NB-IoT

FIG. 18 illustrates an example of DRX mode in an idle state and/or an inactive state.

First of all, definition of DRX is described as follows.

A UE may perform a DRX operation while performing the procedures and/or methods described/proposed in the present specification. A DRX configured UE may reduce power consumption by receiving a DL signal discontinuously. DRX may be performed in Radio Resource Control_IDLE (RRC_IDLE) state, RRC_INACTIVE STATE, or RRC_CONNECTED state. In RRC_IDLE and RRC_INAC- TIVE states, DRX is used to receive a paging signal discontinuously. Hereinafter, DRX performed in RRC_CONNECTED state will be described (RRC_CONNECTED DRX).

A DRX cycle is configured with On Duration and Opportunity for DRX. The DRX cycle defines a time interval in which the On Duration is repeated periodically. The On Duration refers to a time interval monitored by a UE to receive PDCCH. Once DRX is configured, a UE performs PDCCH monitoring for On Duration. If there is a PDCCH successfully detected for the PDCCH monitoring, the UE activates an inactivity timer and maintains an awake state. On the contrary, if there is no PDCCH successfully detected for the PDCCH monitoring, the UE enters a sleep mode after the end of the On Duration. Hence, in case that DRX is configured, PDCCH monitoring/reception may be performed discontinuously in time domain in performing the procedure and/or method described/proposed in the foregoing description. For example, in case that DRX is configured, a PDCCH reception occasion (e.g., slot having a PDCCH search space) in the present disclosure may be configured discontinuously according to the DRX configuration. On the contrary, if DRX is not configured, PDCCH monitoring/reception may be performed continuously in time domain in performing the procedure and/or method described/proposed in the foregoing description. For example, if DRX is not configured, a PDCCH reception occasion (e.g., a slot having a PDCCH search space) may be configured continuously in the present disclosure. On the other hand, irrespective of a presence or non-presence of DRX configuration, PDCCH monitoring may be restricted in a time interval set as a measurement gap.

Referring to Table 10, DRX configuration information is received through higher layer (e.g., RRC) signaling, and a presence or non-presence of DRX ON/OFF is controlled by a DRX command of a MAC layer. Once DRX is configured, a UE may perform PDCCH monitoring discontinuously in performing the procedure and/or method described/proposed in the present disclosure.

TABLE 10

| | Type of signals | UE procedure |
| --- | --- | --- |
| 1st step | RRC signalling (MAC-CellGroupConfig) | Receive DRX configuration information |
| 2nd step | MAC CE ((Long) DRX command MAC CE) | Receive DRX command |
| 3rd step | | Monitor a PDCCH during an on-duration of a DRX cycle |

Here, MAC-CellGroupConfig includes configuration information necessary for configuring a Medium Access Control (MAC) parameter for a cell group. The MAC-CellGroupConfig may include configuration information on DRX. For example, MAC-CellGroupConfig may include the following information in defining DRX.

Value of drx-OnDurationTimer: Defining a starting section of a DRX cycle

Value of drx-InactivityTimer: Defining a length of a time interval in which a UE is in awake state after a PDCCH occasion in which PDCCH indicating UL or DL data is detected Value of drx-HARQ-RTT-TimerDL: Defining a length of a maximum time interval until DL retransmission n is received after having received DL initial transmission Value of drx-HARQ-RTT-TimerDL: Defining a maximum time interval until receiving a grant for UL retransmission after having received a grant for UL initial transmission drx-LongCycleStartOffset: Defining a time length and a starting timing point of a DRX cycle drx-ShortCycle (optional): Defining a time length of a short DRX cycle Here, if any one of drx-OnDurationTimer, drx-InactivityTimer, drx-HARQ-RTT-TimerDL, and drx-HARQ-RTT-TimerDL is operating, a UE performs PDCCH monitoring in every PDCCH occasion while maintaining an awake state.

In the course of performing the above-described general signal transceiving procedure of NB-IoT, an NB-IoT UE may switch to an idle state (e.g., RRC_IDLE state) and/or an inactive state (e.g., RRC_INACTIVE state) to reduce power consumption. In this case, the NB-IoT UE having switched to the idle state and/or the inactive state may be configured to use a way of DRX. For example, the NB-IoT UE having switched to the idle state and/or the inactive state may be configured to perform monitoring of NPDCCH related to a paging in a specific subframe (or a frame or a slot) according to a DRX cycle configured by a BS or the like. Here, the NPDCCH related to the paging may mean NPDCCH scrambled with Paging Access-RNTI (P-RNTI).

FIG. 19 illustrates an example of a DRX configuration and indication procedure for the NB-IoT UE.

In addition, DRX configuration and indication for an NB-IoT UE may be performed as shown in FIG. 19. FIG. 19 illustrates an example of a DRX configuration and indication procedure for the NB-IoT UE. Moreover, FIG. 19 is provided for convenience of description only but non-limits a method proposed in the present specification.

Referring to FIG. 19, an NB-IoT UE may receive DRX configuration information from a BS (e.g., NodeB, eNodeB, eNB, gNB, etc.) [S2410]. In this case, the UE may receive such information from the BS through higher layer signaling (e.g., RRC signaling). Here, the DRX configuration information may include DRX cycle information, DRX offset, configuration information for DRX related timers, etc.

Thereafter, the NB-IoT UE may receive a DRX command from the BS [S2420]. In this case, the UE may receive the DRX command from the BS through higher layer signaling (e.g., MAC-CE signaling).

Having received the DRX command, the NB-IoT UE may monitor NPDCCH in specific time unit (e.g., subframe, slot) according to a DRX cycle [S2430]. Here, the monitoring the NPDCCH may include decoding the NPDCCH amounting to a specific region according to a DCI format to receive through a corresponding search region, scrambling a corresponding CRC with a prearranged specific RNTI value, and checking whether it matches (i.e., coincides with) a desired value.

In case that the corresponding NB-IoT UE receives information indicating the change of its paging ID and/or system information through NPDCCH, it may be configured to initialize (or reconfigure) a connection (e.g., RRC connection) with a BS [e.g., the cell search procedure of FIG. 15] or receive (or acquire) new system information from the BS [e.g., the system acquisition procedure of FIG. 15].

FIG. 20 illustrates Wake-Up Signal (WUS) transmission.

An NB-IoT UE or a BL/CE (Bandwidth reduced Low complexity/Coverage Enhancement) UE may use a WUS to reduce power consumption related to paging monitoring according to cell configuration. When configuring a WUS, the following operation may be considered in idle mode.

A WUS may instruct a UE to receive a paging in a corresponding cell by monitoring MPDCCH or NPDCCH.

In case of a UE for which extended Discontinuous Reception (eDRX) is not configured, WUS may be associated with a single Paging Occasion (PO) (N=1). The PO means a time resource/interval (e.g., subframe, slot) in which PDCCH scrambled with P-RNTI may be transmitted for a paging. A single PO or a plurality of POs are included in a Paging Frame (PF), and the PF may be periodically configured based on UE_ID. Here, the UE_ID may be determined based on International Mobile Subscriber Identity (IMSI).

In case of a UE for which eDRX is configured, a WUS may be associated with one or more paging occasions (N≥1) in a Paging Transmission Window (PTW). If eDRX is configured, Paging Hyper-frames (PH) may be periodically configured based on UE_ID. PTW is defined in PH, and a UE monitors PO(s) on PF in the PTW.

In case of detecting a WUS, a UE may monitor N paging occasions thereafter for the paging message reception.

A paging operation of Mobility Management Entity (MME) is not aware that a BS uses a WUS.

Referring to FIG. 20, a WUS may be transmitted in 'configured maximum WUS duration' (hereinafter, a WUS window) prior to a PO. Although a UE may expect WUS repetition transmission in the WUS window, the actual WUS transmission number may be smaller than the maximum WUS transmission number in the WUS window. For example, the WUS repetition number may be small for a UE in good coverage. For clarity, a resource/occasion for transmitting a WUS in a WUS window will be referred to as a WUS resource. A WUS resource may be defined as a plurality of consecutive OFDM symbols and a plurality of consecutive subcarriers. A WUS resource may be defined as a plurality of consecutive OFDM symbols and a plurality of consecutive subcarriers in a subframe or slot. For example, a WUS resource may be defined as 14 consecutive OFDM symbols and 12 consecutive subcarriers. A gap exists between a WUS window and a PO, and a UE does not monitor a WUS in a gap. If a WUS is detected from a WUS window, a UE may monitor a paging related signal in one or more POs related to the WUS (window). In case of NB-IoT, a UE in RRC_IDLE state may receive a paging on an anchor or non-anchor carrier based on system information.

UE-Group-Per-PO

In the LTE system, a UE may determine a position to monitor a paging based on a Paging Occasion (PO) and a Paging Frame (PF) determined based on UE_ID of its own, and this principle may identically apply to the case of NB-IoT and eMTC newly introduced into the 3GPP LTE Rel-13 standard. There may exist a plurality of UEs expecting a paging in a single PO, and a size of the PO may be determined depending on a configuration made by a Base Station (BS) using an SIB. Hereinafter, in the present disclosure, a group of a plurality of UEs that may expect the paging in the same PO will be described in a manner of being defined as UE-group-per-PO.

In the Rel-15 NB-IoT and eMTC standard, a method of using a Wake Up Signal (WUS) has been introduced for the purpose of UE's power saving. In this method, prior to monitoring a search space for the paging, a WUS capable UE capable of using a WUS attempts to detect a WUS based on information configured by a BS. In the detection attempt operation, if detecting the WUS, the UE may expect that a paging will be transmitted in POs associated with the corresponding WUS detected position and monitor a search space for the paging. If failing to detect the WUS, the UE may not monitor the search space for the paging. In the Rel-15 standard, a WUS transmission position is determined as a relative position of a PO indicated by a WUS and all WUS capable UEs that monitor the same PO are defined to share the same WUS signal and the WUS transmission position. Therefore, if there exists a WUS transmitted by targeting a specific PO, all WUS capable UEs belonging to the UE-group-per-PO related to the corresponding PO should perform the paging monitoring.

A paging may be transmitted by targeting some UEs among UEs belonging to the same UE-group-per-PO according to the determination of MME or eNB. In addition, according to the current standard, since information indicating that the WUS and paging are transmitted by targeting which UE among UEs belonging to the UE-group-per-PO is delivered through NPDSCH that carries traffic of the paging, some UEs may perform unnecessary NPDCCH/NPDSCH decoding.

Considering the above problem, the present disclosure proposes UE subgrouping based WUS design methods to reduce unnecessary paging monitoring operations of WUS capable UEs. Embodiments proposed in the present disclosure handle a method that a WUS capable UE determines a WUS resource to monitor on a specific condition.

Although embodiments proposed on the basis of NB-IoT and MTCs are described in the following, it is clear that the same principle can be generally applied to any communication system. Thus, the term 'NPDCCH' or 'MPDCCH', described in the present disclosure, can be interpreted as a general term referring to a control channel on a physical layer. In addition, although a method proposed with reference to a WUS indicating a presence or non-presence of a paging transmission in idle mode (IDLE mode) is described in the present disclosure, it is obvious that the same principles can be generally applied to random channels (or signals) for indicating additional information (e.g., a presence or non-presence of transmission) of a channel (or a signal) for a random purpose. For example, a power saving operation of a UE using the 3GPP NR standard can also be used in connected mode. Hereinafter, embodiments proposed in the present disclosure may operate in an independent form respectively, but it obvious that they can be used in combination unless they contradict each other.

Meanwhile, the terms used in the following may be defined as CDM (code division multiplexing), TDM (time division multiplexing), FDM (frequency division multiplexing), NWUS (narrowband wake up signal), MWUS (MTC (machine type communication) wake up signal), ZC sequence (Zadoff-Chu sequence), FFT (fast Fourier transform), OFDM (orthogonal frequency division multiplexing), SIB (system information block), RRC (radio resource control), PO (paging occasion), NPDCCH (narrowband physical downlink control channel), MPDCCH (machine type communication physical downlink control channel), MME (Mobility Management Entity), SINR (Signal to Interference and Noise Ratio), TAU (tracking area update), Rmax (the maximum repetition number of PDCCH, NPDCCH or MPDCCH), PRB (physical resource block), DRX (discontinuous reception), eDRX (extended/enhanced discontinuous reception), etc.

Meanwhile, a time resource unit may include a subframe or slot unit, and at least one consecutive symbol may become a single time resource unit. In the following, a subframe may define a configuration corresponding to a time resource unit including 14 consecutive symbols despite being expressed as the subframe.

For clarity of the following description, a method of classifying WUS signals by TDM for WUS subgrouping may be schematically described as a TDM method, a method of classifying WUS signals by CDM for WUS subgrouping may be schematically described as a CDM method, and a method of classifying WUS signals by FDM for WUS subgrouping may be schematically described as an FDM method.

CDM Based UE Subgrouping

For UE subgrouping, a UE subgroup classification scheme using a signal of a WUS is available. In the proposed embodiment, each of different UEs expecting a WUS on the same time/frequency resource may be classified through a WUS signal configured for a UE subgroup of its own. Alternatively, when transmissions of different WUSs overlap each other in aspect of time/frequency resource, the proposed embodiment may be used to share or classify overlapped resources. Thus, the classification scheme using a signal of WUS allows different WUSs to share a time/frequency resource entirely or in part, thereby o reducing resource overhead.

The UE subgrouping through the classification of WUS may be applicable in a manner of combining one or more of first to sixth CDM schemes proposed below.

First of all, a first CDM scheme proposes methods of including UE subgroup information in a WUS signal by the determination of an initialization value of a scrambling sequence used for WUS generation. Particularly, according to the first CDM scheme, a BS may include UE subgroup information in a WUS signal using a scrambling sequence in generating a WUS signal. Since the first CDM scheme follows a predefined basic generation scheme of WUS, it is advantageous in that the increase of complexity barely occurs in aspects of UE and BS implementation and signal generation.

As a typical example of the first CDM scheme, an initialization value of a scrambling sequence used for the generation of an NWUS (or MWUS) signal defined in 36.211_Rel-15 may be substituted with such an equation as Equation 7 to include UE subgrouping information. In the equation of Equation 7, $c_g$ is a parameter used to represent UE subgrouping information and may use one of more values of {0, 1, 2, 3}. The rest of $N_{ID}^{Ncell}$ (in case of MTC, it is $N_{ID}^{Ncell}$, which is identically applied without separate description in the following), $n_{f\_start\_PO}$, and $n_{s\_start\_PO}$ follow the definition of 36.211_Rel-15. It is advantageous in that the scheme according to Equation 7 may add a sequence for UE subgrouping with almost no influence on a legacy UE by maintaining the sequence classification capability of Rel-15 WUS.

$$c_{init,WUS} = c_g \cdot 2^{29} + (N_{ID}^{Ncell} + 1) \quad \text{[Equation 7]}$$
$$\left(\left(10 n_{f\_start\_PO} + \left\lfloor \frac{n_{s\_start\_PO}}{2} \right\rfloor\right)\right) \mod 2048 + 1) 2^9 + N_{ID}^{Ncell}$$

As another typical example of the first CDM scheme, an initialization value of a scrambling sequence used for the generation of an NWUS (or MWUS) signal defined in 36.211_Rel-15 may be substituted with such an equation as Equation 8 to include UE subgrouping information. In the equation of Equation 8, $c_g$ is a parameter used to represent UE subgrouping information and may use one of more values of $\{0, 1, 2, \ldots, 2^{11-\alpha}\}$. Here, α is a parameter for determining the number of UE subgroups and may use a preset value (or a value predetermined by the standard) or include a value configured by higher layer signaling transmitted by a BS. The rest of $N_{ID}^{Ncell}$, $n_{f\_start\_PO}$, and $n_{s\_start\_PO}$ follow the definition of 36.211_Rel-15. The method of Equation 8 may add information for UE subgrouping instead of reducing a quantity of information on PO in a sequence of Rel-15 WUS. In this case, it is advantageous in that a total quantity of information represented using a scrambling sequence can be maintained identically.

$$c_{init,WUS} = (N_{ID}^{Ncell} + 1) \quad \text{[Equation 8]}$$
$$\left(\left(10 n_{f\_start\_PO} + \left\lfloor \frac{n_{s\_start\_PO}}{2} \right\rfloor + c_g \cdot 2^{29} + 1\right) \mod 2048 + 1\right)$$
$$2^9 + N_{ID}^{Ncell}$$

A group common indication method in the first CDM scheme is described as follows. In the method of the first CDM scheme, a portion of a UE subgrouping parameter may be used as a common indicator to represent information on the entire or a plurality of UE subgroups. For instance, in Equation 7 and Equation 8, $c_g=0$ may be used to provide common information to all UEs that monitor a corresponding WUS transmission position. In the equations of Equation 7 and Equation 8, if $c_g=0$, it has the same value as a scrambling sequence initialization value of Rel-15 WUS, whereby backward compatibility usable for awakening a Rel-15 UE is guaranteed. In case that $c_g$ is a different value except a constant used as a common indicator, a value of each $c_g$ is used to generate a scrambling sequence of a WUS signal configured per UE subgroup. Each UE may attempt detection of a WUS signal using $c_g$ corresponding to a UE subgroup to which the UE belongs and $c_g$ used as a common indicator. If succeeding in the detection of the WUS signal for which one of a plurality of $c_g$ values available for a UE is used at a specific WUS transmission timing, the UE performs an operation associated with WUS.

As one typical example of a second CDM scheme, an equation of generating a u value in an equation exp(−jπun (n+1)/131) corresponding to a ZC sequence used for the generation of an NWUS (or MWUS) signal defined in 36.211_Rel-15 may be substituted with such an equation as Equation 9 to include UE subgrouping information. In the equation of Equation 9, $c_g$ is a parameter used to represent UE subgrouping information and may use one or more values of $\{1, 2 \ldots \alpha\}$. In addition, a is a parameter for determining the number of UE subgroups and may use a value predetermined by the standard or include a value configured by higher layer signaling transmitted by a BS. For example, a may have a value of 2 or 3. $N_{ID}^{Ncell}$ follows the definition of 36.211_Rel-15. The method according to Equation 9 may add information for UE subgrouping instead of reducing an information quantity for Cell ID in an expression formula of a ZC sequence. In this case, information on the Cell ID may be guaranteed through a scrambling sequence of a WUS signal.

$$u = (N_{ID}^{Ncell} \mod 126) \cdot c_g/\alpha + 3 \quad \text{[Equation 9]}$$

In the second CDM scheme, a group common indication method is described as follows.

In the second CDM scheme, a portion of a UE subgrouping parameter may be used as a common indicator to represent information on the entire or a plurality of UE subgroups. For instance, in Equation 9, '$c_g=\alpha$' may be used to provide common information to all UEs that monitor a corresponding WUS transmission position. In Equation 9, if $c_g=\alpha$, it has the same expression as a ZC sequence of Rel-15 WUS. Hence, in case of $c_g=\alpha$ in Equation 9, backward compatibility usable for awakening a Rel-15 UE is guaranteed. In case that $c_g$ is a different value except a constant used (or determined) as a common indicator, a value of each $c_g$ is used to generate a ZC sequence of a WUS signal configured per UE subgroup. Each UE may attempt detection of a WUS signal using $c_g$ of a UE subgroup to which the UE belongs and $c_g$ used as a common indicator. In this case, if succeeding in the detection of the WUS signal for which one of a plurality of $c_g$ values available for the corresponding UE is used at a specific WUS transmission timing, the corresponding UE performs an operation associated with a WUS.

A third CDM scheme proposes a method of including UE subgroup information in a WUS signal using an RE level cover code. The third CDM scheme proposes a method of applying an RE level cover code to include UE subgroup information in a WUS signal. Since the proposed scheme follows the basic generation scheme of the predefined WUS, it is advantageous in that the increase of complexity barely occurs in aspects of UE and BS implementation and signal generation. In addition, the classification by a cover code may facilitate the simultaneous blind detection of two or more informations without the increase of complexity in case that a UE performs signal detection after Fourier transform (e.g., FFT) operation.

As one typical example of the third CDM scheme, it may be able to use a method of adding an RE level cover code to apply UE subgrouping to an NWUS (or MWUS) signal defined in 36.211_Rel-15. Here, the cover code may use a binary sequence $b_q(m)$ used for the generation of NSSS defined in 36.211_Rel-15. Alternatively, the principle of the formula $e^{-j2\pi\theta_f n}$ for the application of a cyclic shift used for the generation of NSSS defined in 36.211_Rel-15 may be applied to (or used by being applied to) the cover code.

In addition, a group common indication method in the third CDM scheme is described as follows. In the method of the third CDM scheme, a portion of a UE subgrouping parameter may be used as a common indicator to represent information on the entire or a plurality of UE subgroups. For instance, if a cover code uses a binary sequence $b_q(m)$ used for the generation of NSSS defined in 36.211_Rel-15, a binary sequence (e.g., all one sequence) corresponding to $q=0$ may be usable as a common indicator. For another example, when a cover code is used in a manner of applying the formula $e^{-j2\pi\theta_f n}$ of a cyclic shift used for the generation of NSSS defined in 36.211_Rel-15, if a value of the cyclic shift is $\theta_f=0$, the cover code may be used as a common indicator. As a common indicator is usable to awaken an Rel-15 UE, backward compatibility is guaranteed.

A fourth CDM scheme is a scheme of including UE subgroup information in a WUS signal using an OFDM symbol level cover code. The fourth CDM scheme proposes a method of applying an OFDM symbol level cover code to include UE subgroup information in a WUS signal. Since the fourth CDM scheme follows the basic generation scheme of the predefined WUS, it is advantageous in that the increase of complexity barely occurs in aspects of UE and BS implementation and signal generation. In addition, the symbol level cover code has an advantage that a UE can perform two or more blind detections simultaneously with low complexity even in a signal detection process that skips a Fourier Transform (FFT) operation.

As one typical example of the fourth CDM scheme, it may be able to use a method of adding an OFDM symbol level cover code to apply UE subgrouping to an NWUS (or MWUS) signal defined in 36.211_Rel-15.

A group common indication method in the fourth CDM scheme is described as follows. In a method of the fourth CDM scheme, all one sequence may be used as a cover code to represent information on the entire or a plurality of UE subgroups. In this case, according to the fourth CDM scheme, as a cover code of the all one sequence is usable to awake an Rel-15 UE, backward compatibility is guaranteed.

A fifth CDM scheme is a method of including UE subgroup information in a WUS signal using a time resource unit level cover code. Here, the time resource unit level cover code may include a subframe level cover code or a slot level cover code. The fifth CDM scheme proposes a method of applying a time resource unit level cover code (or a subframe level cover code or a slot level cover code) to include UE subgroup information in a WUS signal. Since the fifth CDM scheme follows the basic generation scheme of the predefined WUS, it is advantageous in that complexity does not increase in aspects of UE and BS implementation and signal generation. Particularly, when a time resource unit level cover code (or a subframe level cover code or a slot level cover code) is used, since a signal detection process in a single time resource unit (or a subframe or a slot) is identical irrespective of a presence or non-presence of application of a cover code, a considerable gain can be obtained in aspect of complexity.

A type of applying a cover code in the fifth CDM scheme is described as follows. When the fifth CDM scheme is used, a cover code of $N_{cover}$ length is applicable in unit of $N_{cover}$ time units (or slots or subframes) from a time resource unit (or a slot or a subframe) in which transmission of WUS starts. If an actual transmission length of WUS is $N_T$, the WUS is applied in a manner that the same cover code is repeated $N_T/N_{cover}$ times.

A method of assuming an antenna port in the fifth CDM scheme is described as follows. A UE may assume that a WUS uses the same antenna port during a time resource unit level cover code (or a subframe level cover code or a slot level cover code) to which a cover code of minimum $N_{cover}$ length is applied to recognize a cover code. On the other hand, after the application of the cover code of the $N_{cover}$ length has ended, if the repetition of the cover code starts again, the antenna port may be changed. In general case, the same antenna port assumption of a signal or channel (i.e., a time, frequency, space and/or code domain resource in which an antenna port can be assumed as the same in a signal or channel transmitted interval) may be changed between different UEs, which may be determined by a capability difference of a UE or a difference of configuration by a BS. In case of a Rel-15 WUS, a UE is unable to assume that a WUS transmitted in two consecutive subframes can be transmitted through the same antenna port. Hence, due to the property of the fifth CDM scheme that requires assumption of the same antenna port for the classification of US subgroups, an Rel-15 UE may recognize all per-UE subgroup WUSs to which the fifth CDM Scheme applied are indication to itself. Hence, in case that the fifth CDM scheme is applied, backward compatibility for a legacy WUS capable UE is satisfied.

Additionally, if a beam related operation is applied to a WUS, the WUS may have the same beam direction as other RS, SS, PDCCH, PDSCH and the like, and may be configured therefor. In particular, a WUS may have the spatially Quasi-CoLocation (QCL) relationship with other RS, SS, PDCCH, PDSCH and the like (in aspect of a specific spatial Rx parameter). In case that the large-scale property of a symbol carried channel on one antenna port is inferable from a symbol carried channel on another antenna port, the two antenna ports may be regarded as having Quasi Co-located/ Quasi Co-Location (QC/QCL) relationship. Here, the large-scale property includes one or more of delay spread, Doppler spread, frequency shift, average received power, and receiving timing.

FIG. 21 is a diagram to describe a structure to which the fifth CDM scheme is applied.

In the fifth CDM scheme, a case that a length of a cover code is 2 is described as follows. For one typical example, in case of $N_{cover}=2$, a UE may apply a cover code in unit of 2 time resource units (or subframes or slots) from a time resource unit (or a subframe or a slot) in which transmission of a WUS starts. In this case, the number of available cover codes may be equal to the number of UE subgroups that can be classified and operated by a BS. FIG. 21 diagrammatizes one example of a structure to which the method of the fifth CDM scheme is applied according to the above example.

A fifth CDM scheme-1 to a fifth CDM scheme-4 describe examples of specific cover code configuration for a case that a length of a cover code is 2 in the fifth CDM scheme.

As one example of the fifth CDM scheme-1, in case of $N_{cover}=2$, a cover code uses the form of an orthogonal cover code and 2 UE subgroups may be operated. If the two cover codes used in this case are $[S_{2n}, S_{2+1}]$ and $[S_{2n}, S^*_{2n+1}]$, respectively, a UE determines whether the relationship of a WUS signal in a pair of two time resource units (or subframes or slots) to which the cover code is applied meets the conjugate form, thereby confirming a UE subgroup index.

In the fifth CDM scheme-2, if when $N_{cover}=2$, 3 UE subgroup indicators are operable. In this case, since it is unable to represent all combinations with the conjugate relationship of a signal, a cover code of a 2-dimensional vector form may be operated in a manner of performing a multiplication operation in unit of a time resource unit (or a subframe or a slot). In doing so, the cover code may use the forms of [1, exp(j2π/3·0)] [1, exp(j2π/3·1)], and [1, exp(j2π/3·2)]. Such forms may equalize (and/or maximize) the classification of the cover codes between UE subgroup indexes.

In the fifth CDM scheme-3, 3 UE subgroup indicators are operable if $N_{cover}=2$. In this case, since it is unable to represent all combinations with the conjugate relationship of a signal, a cover code of a 2-dimensional vector form may be operated in a manner of performing a multiplication operation in unit of a time resource unit (or a subframe or a slot). In doing so, regarding the cover codes, two cover codes maintain orthogonal relationship with each other and the other one may have a d/2 deviation in its phase. For example, the cover code may use such forms as [1, 1], [1, −1], and [1, exp(jπ/2)]. The two cover codes in the orthogonal relationship maintain orthogonality to independently indicate each UE subgroup and the other one cover code may indicate 2 UE subgroups all.

In the fifth CDM scheme-4, 4 UE subgroup indicators are operable if $N_{cover}=2$. In this case, since it is unable to represent all combinations with the conjugate relationship of a signal, a cover code of a 2-dimensional vector form may be operated in a manner of performing a multiplication operation in unit of a time resource unit (or a subframe or a slot). In doing so, the cover codes may use such forms as [1, exp(j2π/4·0)], [1, exp(j2π/4·1)], [1, exp(j2π/4·2)], and [1, exp(j2π/4·3)], which may equalize (or maximize) the classification of the cover codes between UE subgroup indexes. Here, AB means the product of A and B.

A group common indication method in the fifth CDM scheme is described as follows.

In case that such a cover code as the fifth CDM scheme-2 is used, two of three cover codes may be used to classify 2 UE subgroups and the other may be used as a common indicator to give indication of information to all UEs that monitor a corresponding WUS transmission position.

In case that such a cover code as the fifth CDM scheme-3 is used, two cover codes (e.g., [1, 1] and [1, −1]) in orthogonal relationship may be used to classify 2 UE subgroups and the other may be used as a common indicator to give indication of information (or information related to a WUS signal) to all UEs that monitor a corresponding WUS transmission position.

In case that such a cover code as the fifth CDM scheme-4 is used, two cover code pairs in orthogonal relationship may be used to classify 2 UE subgroups, one cover code may be used as a common indicator to give indication of information to all UEs that monitor a corresponding WUS transmission position, and the other may be used for an Rel-15 WUS capable UE only. In case of a UE having capability of UE subgrouping WUS, using a cover code corresponding to a UE subgroup of the UE and a cover code of a common indicator to give indication of information to all UEs, the UE may determine whether information is indicated to the UE itself.

A sixth CDM scheme is a method of including UE subgroup information in a WUS signal by differentiating initialization values of a ZC sequence used for generation of a WUS and/or a scrambling sequence at a time resource unit level (or a subframe level or a slot level).

The sixth CDM scheme proposes a method of performing re-initialization of a ZC sequence or a scrambling sequence at a time resource unit level (or a subframe level or a slot level) to include UE subgroup information in a WUS signal. Since the sixth CDM scheme follows the basic generation scheme of the predefined WUS, it is advantageous in that the increase of complexity barely occurs in aspects of UE and BS implementation and signal generation. In addition, it is advantageous in that the proposed method may easily increase the number of expressible UE subgroups in a manner of applying to a case that the number of the expressible UE subgroups is limited due to the shortage of the number of ZC sequences and the scrambling initialization value.

The sixth CDM scheme may consider a method of changing a ZC sequence periodically as a specific method of UE subgrouping. In the sixth CDM scheme, a value 'u' necessary for a formula $$e^{-\frac{j\pi un(n+1)}{131}}$$

corresponding to a ZC sequence used for the generation of an NWUS (or MWUS) signal defined in 36.211_Rel-15. Here, a period for changing the u value may be a value predetermined by the standard document or a value configured by a BS. The period may be determined as $N_{S-SF1}$ time resource units (or subframes or slots). In this case, a ZC sequence of a WUS signal may be maintained identically during $N_{S-SF1}$ consecutive time resource units (or subframes or slots) of every period. For example, the $N_{S-SF1}$ value may be determined as 2. In addition, a reference for a start of the period may be determined as a starting time resource unit (or a starting subframe or a starting slot) in which the transmission of a WUS starts, and the calculation of $N_{S-SF1}$ may be determined as an absolute time resource unit (i.e., a time resource unit index calculated with reference to the time that has progressed, whether or not it is used for actual transmission). This may intend to determine that the same ZC sequence is used between time resource units (or subframes or slots) that use the same antenna port in consideration of the antennae port assumption of the WUS transmission defined in the current Rel-15 NB-IoT/MTC standard, which may facilitate coherent combining between time resource units (or subframes or slots) for which the same antenna port assumption is possible.

In the current Rel-15 NB-IoT/MTC standard, the u value for determining the ZC sequence is set to be determined by a cell ID only. In case that the sixth CDM scheme is applied, the u value may be set to reflect information of an absolute time resource unit (or an absolute subframe or an absolute slot) together with information of cell ID. For example, the information of the absolute time resource unit (or the absolute subframe or the absolute slot) may be set to a value resulting from taking a modulo (or modular) operation on an absolute time resource unit (or subframe or slot) interval, which is spaced apart from a starting time resource unit (or a starting subframe or a starting slot) of a WUS, with $N_{S-SF1}$.

As a specific method of UE subgrouping in the sixth CDM scheme, initialization of a scrambling sequence may be performed periodically. As one embodiment of the sixth CDM scheme, it is able to consider a method of periodically reconfiguring an initialization value (e.g., $c_{init\_WUS}$) of an NWUS (or MWUS) signal defined in 36.211_Rel-15. Here, a period may be a value predetermined by the standard or a value configured by a BS. The period may be determined as $N_{S-SF1}$ time resource units (or subframes or slots). Here, the scrambling sequence of the WUS signal may be set to have a continuous value during $N_{S-SF2}$ consecutive time resource units (or subframes or slots) of every period. In addition, a reference for a start of the period may be determined as a starting time resource unit (or a starting subframe or a starting slot) in which transmission of the WUS starts.

TDM Based UE Subgrouping

A UE subgroup classification scheme using a time resource for transmitting a signal of WUS for UE subgrouping (or using TDM) is applicable. In the proposed method, different UEs expecting a WUS on the same frequency resource may classify a WUS signal failing to correspond to themselves by a WUS transmission interval determined based on a UE subgroup. If a TDM based scheme is used, since a WUS signal is maintained identical to a legacy WUS to which UE subgrouping is not applied, the present disclosure has an advantage that the increase of complexity can be reduced in aspects of UE and BS implementation and signal generation. In addition, since the number of WUS signals transmitted at the same timing is not increased, the present disclosure has an advantage that a size of power consumed for the transmission of a WUS can be maintained. TDM schemes mentioned in the following are applicable to a WUS signal classified by being TDMed or a TDMed WUS resource.

UE subgrouping through a transmission interval of a WUS signal is applicable in a manner of combining one or more schemes including first to seventh TDM schemes proposed below.

A first TDM scheme proposes a method of independently indicating information on a gap between WUS and PO (i.e., a WUS-to-PO gap) to each UE subgroup. The first TDM scheme proposes methods of indicating information on a gap for configuring a WUS transmitted position independently per UE subgroup. According to the first TDM scheme, the configuration scheme of a Rel-15 WUS defined in the existing standard, since a size of an applied gap is changed only in aspect of a UE, complexity may be reduced in aspect of implementation.

The first TDM scheme may include a method of delivering gap indication information independent per UE subgroup using System Information Block (SIB) or higher layer signaling corresponding to RRC signaling. A UE may acquire information of a gap size fitting a UE subgroup of its own through higher layer signaling. The UE may determine a WUS transmission interval for which the UE will monitor a WUS in a manner of reflecting the acquired gap size. For example, when a size of a gap configurable by a BS includes (40 ms, 80 ms, 160 ms, 240 ms), each UE subgroup may be configured to use a value of one of the 4 kinds of gaps. In this case, sizes of gaps allocated to the UE subgroups respectively may overlap each other.

A second TDM method proposes methods of determining a WUS-to-PO gap b as a combination of a common gap value and a UE subgroup specific offset. In the second TDM method, information on a gap for configuring a WUS transmitted position is indicated as common information for all UE subgroups and a size of an actual gap applied per UE subgroup may be applied by combining a UE subgroup with a UE subgroup specific offset. According to the second TDM scheme, since a size of an applied gap is changed only in aspect of a UE while the configuration scheme of Rel-15 defined in the existing standard is reused, complexity may be reduced in aspect of implementation.

The second TDM Scheme may include a method of indicating, using SIB or higher layer signaling corresponding to RRC signaling, such that a gap between an ending of a time resource unit (or an ending of a slot or an ending of a subframe) of a maximum duration of a WUS and a PO to be cell-common (e.g., common per carrier, or common per narrow band, etc., indication based on a criterion that is independent from a UE subgroup).

In this case, a size of a specific offset for a UE subgroup, which is designated per UE subgroup, may be configured independently per UE subgroup using SIB or higher layer signaling corresponding to RRC signaling. A UE may acquire information of an offset for its own UE subgroup through higher layer signaling. The UE may determine a WUS transmission interval during which the UE will monitor a WUS based on the acquired information. For example, the relationship between a position $g_0$ of an ending of a time resource unit (or an ending of a slot or an ending of a subframe) of a maximum WUS duration, which is calculated based on a gap calculated using the second TDM scheme, and $n_{PO}$ that is a position (PO) at which the transmission of the paging NPDCCH starts may be expressed as an equation corresponding to Equation 10. In Equation 10, $L_{common}$ means a size of a gap configured in common to all UE subgroups and $L_{group,i}$ means a size of an offset configured by targeting an $i^{th}$ UE subgroup. As an example of Equation 10 of the second TDM scheme, if a size of a gap configured in common to all UE subgroups corresponds to a size of a gap configured for a Rel-15 WUS capable UE and $L_{group,i}=0$, $g_0$ may correspond to an ending of a time resource unit (or an ending of a slot or an ending of a subframe) of a Rel-15 WUS maximum duration.

$$g_0 = n_{PO} - (L_{common} + L_{group,i} \cdot c_g + 1) \qquad \text{[Equation 10]}$$

A third TDM scheme may include a scheme related to the generation of a scrambling sequence of a WUS signal in consideration of a TDM structure. Particularly, proposed is a method of if there exist a plurality of transmission positions of a WUS corresponding to one PO, determining that a scrambling sequence generation rule of a WUS signal at a different WUS signal transmission position uses the same reference timing point. According to the third TDM scheme, if transmission intervals of WUSs having different transmission start points overlap each other, collisions between all transmissions of the overlapped WUSs can be prevented. The third TDM scheme proposed method is applicable to a WUS transmission interval overlapping problem in a UE subgrouping structure using TDM, and is generally applied (or deduced to apply) to solve an overlapping problem between WUSs having different transmission positions while indicating information on the same PO.

A specific method of scrambling sequence generation in the third TDM scheme is described as follows. According to the third TDM scheme, the generation rule of a scrambling sequence is applicable to a plurality of WUS signals having different transmission intervals while indicating information on the same PO with reference to the same timing point. For example, when a time resource unit (or a slot or a subframe) in which the transmission of UE subgroup-1 starts and a time resource unit (or a slot or a subframe) in which the transmission of UE subgroup-2 starts are spaced apart from each other by $n_{diff}$ WUS transmittable time resource units (or subframes or slots), the generation rule of the scrambling sequence may be configured to apply to both of the UE subgroup-1 and the UE subgroup-2 with reference to the time resource unit (or slot or subframe) in which the transmission of the UE subgroup-1 starts.

Regarding the proposed scrambling sequence generation rule with reference to an NWUS (or MWUS) signal defined in 36.211_Rel-15, the scrambling sequence generation rule of the UE subgroup-1 may be set to follow the generation rule defined in 36.211_Rel-15 exactly, and the scrambling sequence generation rule of the UE subgroup-2 may be set to start after counting an index of a scrambling sequence corresponding to $n_{diff}$ WUS transmittable time resource units (or subframes or slots).

Equation 11 in the following is an equation representing an embodiment related to the third TDM scheme as a formula form. In Equation 11, $c_{init\_WUS,i}$ means an initialization value of a scrambling sequence of an $i^{th}$ UE subgroup and $c_{init\_WUS,0}$ means an initialization value of a scrambling sequence of a reference timing point. $N_{WUS\_RE}$ means the number of REs to which a WUS sequence is mapped with reference to a time resource unit (or a slot or a subframe), and $n_{diff,i}$ means the number of time resource units (or subframes or slots) usable for WUS transmission until a point at which WUS transmission of an $i^{th}$ UE subgroup starts after a reference timing point. In this case, if the WUS transmission of the $i^{th}$ UE subgroup precedes the reference timing point, $n_{diff,i}$ may be represented as a negative value.

$$c_{init\_WUS,i}=c_{init\_WUS,0}+N_{WUS\_RE}\cdot n_{diff,i} \quad \text{[Equation 11]}$$

A fourth TDM scheme is related to a method of reinitializing a scrambling sequence if a transmission of another WUS signal starts within a transmission interval of a specific WUS signal. According to the fourth TDM scheme, in case that a plurality of transmission positions of a WUS corresponding to one PO exist, a scrambling sequence may be reinitialized at a position of a time resource unit (or a slot or a subframe) of a WUS transmission in which a WUS transmission interval of a relatively advanced timing point is relatively late. Namely, if transmission intervals of a WUS having different transmission starting points overlap each other, such a scheme may guarantee the prevention of all collisions between the overlapped WUS transmissions. The fourth TDM scheme is applicable to solve a WUS transmission interval overlapping problem in a UE subgrouping structure using TDM, and may be generally applied (or deduced to apply to solve an overlapping problem between WUSs having different transmission positions while indicating information on the same PO.

A specific method of scrambling sequence generation in the fourth TDM scheme is described as follows. According to the fourth TDM scheme, a BS or (network) may transmit information on transmission starting positions of a plurality of WUS signals having different transmission intervals through SIB or higher layer signaling corresponding to RRC signaling while indicating information on the same PO. In this case, a UE may perform (re)initialization of a scrambling sequence used for transmission of a WUS signal based on at least one of information on the same PO and information on transmission stating positions of a plurality of WUS signals having different transmission intervals at every transmission starting timing point existing in the transmission interval of the WUS signal. Alternatively, the UE may not perform the (re)initialization of a scrambling sequence at a transmission starting timing point for another PO.

Regarding the scrambling sequence generation rule according to the fourth TDM scheme with reference to an NWUS (or MWUS) signal defined in 36.211_Rel-15, a UE may initialize a scrambling sequence of a WUS to monitor with reference to a transmission starting timing point of a UE subgroup to which the UE belongs and then count scrambling sequence indexes by accumulating them while repetition of a time resource unit level (or a subframe level or a slot level) is in progress. Thereafter, the UE may initialize a scrambling sequence index at a WUS transmission starting time resource unit (or slot or subframe) position of another UE subgroup that shares the same PO and then restart the scrambling sequence generation using the first initialization value.

FIG. 22 is a diagram to describe a method of configuring a maximum WUS duration different per UE subgroup.

A fifth TDM scheme proposes methods of configuring a maximum WUS duration different per UE subgroup. According to the fifth TDM Scheme, a maximum WUS duration applied per UE subgroup may be configured different per UE subgroup. When transmission of WUS for UEs in different coverages is classified by TDM according to the fifth TDM scheme, a maximum WUS duration applied per UE subgroup may be configured different per UE subgroup without the increase of a time domain resource necessary for the transmission of the WUS. Particularly, the fifth TDM Scheme may give indication to UEs of several UE groups simultaneously using the same WUS through the combination with the third TDM scheme and/or the fourth TDM scheme.

In case of applying the fifth TDM scheme, as one example of a reference for classifying a UE group, it may be able to consider a presence or non-presence of capability (e.g., enhanced coverage restricted UE) of determining whether a UE camps on a cell in an enhanced coverage state. The capability is the information that can be delivered to a BS from an MME and does not change according to time, whereby it is profitable in that the capability can be equally understood (or shared) by the BS and the UE.

As an embodiment of the fifth TDM scheme, it is able to consider a method of configuring a maximum WUS duration different for each UE subgroup using SIB or higher layer signaling such as RRC signaling. A method that a maximum duration of WUS is configured different for each UE subgroup may support a coverage different for each UE subgroup.

A size of a WUS-to-PO gap used in the fifth TDM scheme may be acquired by all UE subgroups from the common information using the same higher layer signaling. Referring to FIG. 22, each UE subgroup may have a different WUS starting time resource unit (or starting slot or starting subframe) due to a common gap and a different maximum WUS duration. In FIG. 22, a UE subgroup generally corresponding to (or matching) WUS2 may include UEs having a low coverage level (i.e., UEs capable of detection of WUS with short repetition owing to a high SINR of a channel) in comparison to a UE subgroup corresponding to (or matching) WUS1. According to the fifth TDM scheme, the UEs corresponding to (or matching) the WUS2 less wake up unnecessarily due to the transmission of the WUS1.

A specific method of indicating a maximum WUS duration per UE subgrouping in the fifth TDM Scheme is described as follows. As an embodiment of the fifth TDM scheme, it is able to consider a method of separately configuring a scaling factor to determine a maximum duration of WUS using SIB or higher layer signaling corresponding to RRC signaling. A maximum WUS duration of WUS may be expressed as a multiplication of an Rmax, which is a parameter to determine a repetition level of a paging NPDCCH, and a scaling factor. In this case, a BS may configure independent scaling factors for UEs that use maximum WUS durations in different sizes and then inform the UEs of the configured factors. In this case, the UE may select a scaling factor corresponding to its UE group from the scaling factors received from the BS and then perform a monitoring operation of WUS. According to the fifth TDM scheme, since additional UE grouping for the WUS is performed while the definition and operation for the existing paging are maintained, influence on a legacy UE can be minimized.

As another embodiment of the fifth TDM scheme, typical example of Method-TDM-5, it is able to separately configure an Rmax value to determine a repetition level of a paging NPDCCH used by a UE using SIB or higher layer signaling corresponding to RRC signaling. For example, a maximum duration of WUS may be determined as a multiplication of an Rmax, which is a parameter to determine a repetition level of a paging NPDCCH, and a scaling factor. In this case, a BS may configure an independent Rmax value for UEs that use maximum WUS durations in different sizes and then inform the UEs of the configured value. The UE may select a scaling factor corresponding to its UE group from the scaling factors received from the BS and then perform a monitoring operation of WUS. According to the fifth TDM scheme, UEs expecting a WUS of a short length may be made to expect a paging of a short length only likewise.

Alternatively, an actual transmission length of a paging NPDCCH may be short in comparison to Rmax, and a DCI format transmitted through the paging NPDCCH may include information indicating an actually and repeatedly transmitted length of the paging NPDCCH. A UE may estimate a timing point of an actual ending of the transmission of the paging NPDCCH with reference to the information included in the DCI with reference to the Rmax value, and also estimate a starting timing point of a transmission of NPDSCH based on the estimated timing point of the actual ending of the transmission of NPDCCH.

Yet, like the example of the fifth TDM scheme, in case that UEs of different UE groups expect Rmax values in different sizes, a transmission ending point of NPDCCH and an NPDSCH transmission starting point, which are estimated (or understood) per UE, may be different from each other. In case that UEs sharing the same PO use different Rmax values, simultaneous scheduling of two groups may be restricted. To solve such a problem, even if different Rmax values are used for the different UE groups expecting the paging for the same PO, an Rmax value may be used in a manner that a process for calculating an ending timing point of the transmission of NPDCCH can be used in common by all UE groups. For example, with reference to an Rmax value for supporting a legacy UE incapable of classification for UE grouping (or based on the Rmax value), the ending timing point of the transmission of the NPDCCH may be calculated. The above calculation of the ending timing point of the NPDCCH may be used for a legacy UE to maintain the probability of receiving a paging.

Alternatively, by taking a biggest Rmax among different Rmax values as a reference all the time, the calculation of the ending timing point of the NPDCCH may be performed. Thus, if the ending timing point of the NPDCCH is calculated by taking a biggest Rmax among different Rmax values as a reference all the time, it is intended to support the very last timing point at which NPDCCH may be ended in case of using different Rmax values. So to speak, the calculation of the ending timing point of the NPDCCH may minimize the occurrence of restriction on simultaneously scheduling two UE groups in consideration of the very last timing point, at which the NPDCCH may end, in case of using different Rmax values.

FIG. 23 is a diagram to describe UE subgrouping according to the sixth TDM scheme.

A sixth TDM scheme proposes methods of configuring a skipping WUS duration different for each UE subgroup. In the sixth TDM Scheme, a skipping WUS duration applied for each UE subgroup may be configured differently for each UE subgroup. The skipping WUS duration is defined as an interval in which a UE skips the monitoring of WUS and may be applied with reference to a starting time resource unit (or slot or subframe) of WUS transmission. In the sixth TDM scheme, when the transmission of the WUS for UEs in different coverages is classified by TDM, a WUS signal may configured (per UE subgroup) without the increase of a time domain resource necessary for the transmission of WUS. Namely, WUS signals may be configured per UE subgroup without the increase of the time domain resource necessary for the WUS transmission. Particularly, according to the six TDM scheme, a BS may dive indication to UEs of several UE groups simultaneously using the same WUS in a manner of combining at least one of the third TDM scheme and the fourth TDM scheme with the sixth TDM scheme.

As an embodiment of the sixth TDM Scheme, a skipping WUS duration may be configured differently for each UE subgroup using SIB or higher layer signaling corresponding to RRC signaling. The embodiment of the sixth TDM scheme may be used to support a coverage different for each UE subgroup.

Alternatively, as embodiment of the sixth TDM scheme, it may be able to use (or consider) a method of using an enhanced coverage restricted parameter defined in Rel-14. For example, a UE may report a restriction of an enhanced coverage in an Attach/TAU Request step and correspondingly receive configuration in an enhanced coverage restricted state through a higher layer of an Attach/TAU Accept step (i.e., a case that a value of an enhanced coverage restricted parameter RestricEC is configured as 1). In this case, only if the UE generally stays in normal coverage, both of the BS and UE may identically expect (or estimate) that the UE will attempt transmission and reception in a corresponding cell. Therefore, the BS and UE may assume the information on the coverage of the corresponding UE similarly (or, the BS and UE may similarly assume the coverage of the corresponding UE similarly). Particularly, an enhanced coverage restricted parameter may classify a UE having RestrictEC (or an enhanced coverage restricted parameter RestrictEC) configured as 1 and a UE having RestrictEC not configured as 1 and support (or be used to support) an operation of a separate coverage based grouping for UEs in the enhanced coverage restricted state. The embodiment of the sixth TDM scheme may be used identically to perform the UE classification based on the coverage in the method of the fifth TDM scheme.

In doing so, a size of a WUS-to-PO gap to be used and a size of a maximum WUS duration may be designed to enable all UE subgroups to acquire common information using the corresponding (or same) higher layer signaling. Alternatively, a size of a WUS-to-PO gap to be used and a size of a maximum WUS duration may be used (or become a basis) to enable all UE subgroups to obtain common information using the corresponding (or same) higher layer signaling. For example, sizes of a gap and maximum WUS duration configured for a legacy WUS capable UE failing to have UE subgrouping capability may be usable as common information shared by all UE subgroups.

Here, in case of a legacy WUS capable UE failing to have UE subgrouping capability or a UE failing to have a skipping WUS duration configured therefor, a starting time resource unit (or a starting slot or a starting subframe) of a WUS may be calculated as a combination of a gap and a maximum WUS duration. A UE, which is UE subgrouping capable and has a skipping WUS duration configured therefor, may determine a time resource unit (or a slot or a subframe) located behind the skipping WUS duration from a time resource unit (or a slot or a subframe) calculated by the combination of a gap and a maximum WUS duration as a starting time resource unit (or a starting slot or a starting subframe) of a WUS. As shown in FIG. 23, if the embodiment of the sixth TDM scheme is applied, an operation that UEs expecting WUS2 wake up unnecessarily due to the transmission of WUS1 may be reduced considerably.

FIG. 24 is a diagram to describe a method of performing UE subgrouping according to a seventh TDM scheme and the like.

A seventh TDM scheme proposes methods of determining an end position and/or a start position of a time resource unit of a WUS of a specific UE subgroup in a manner of associating with a start position and/or an end position of a time resource unit of a WUS of another UE subgroup. Here, an end of a time resource unit may include an ending point of a WUS at which a WUS ends in a time domain or a last time resource unit among time resource units included in a WUS. Likewise, the start of the time resource unit or the time resource unit may include a starting point of a WUS at which a WUS starts in a time domain or a foremost time resource unit among time resource units included in a WUS. In addition, the time resource unit is defined as a set of at least one or more consecutive symbols and has a configuration corresponding to a slot or subframe including consecutive symbols. In addition, a start or end of a time resource unit of a WUS corresponds to a maximum duration of a WUS or a start or end of a WUS resource.

According to the seventh TDM scheme, a position of an end of a time resource unit (or slot or subframe), at which a transmission of a WUS of a specific UE subgroup may end, may be relatively determined based on a start (i.e., a starting time resource unit) of a time resource unit at which a transmission of a WUS of another UE subgroup starts. Or, a position of a start (i.e., a starting time resource unit) of a time resource unit at which a transmission of a WUS of a specific UE subgroup starts may be relatively determined based on an end of a time resource unit (or slot or subframe) at which a transmission of a WUS of another UE subgroup may end. Namely, according to the seventh TDM Scheme, a starting point of a WUS of one UE subgroup may be determined in a manner of depending on a starting or ending point of a WUS of another UE subgroup. In this case, since it is unnecessary to signal information on a starting or ending point for every WUS signal, the seventh TDM scheme prevents the overlapping between TDMed WUSs advantageously as well as reduces overhead necessary for signaling.

According to an embodiment of the seventh TDM scheme, as shown in FIG. 24 (a), an end of a time resource unit (or slot or subframe) of a WSU maximum duration of a specific UE subgroup may be matched to a start of a time resource unit (or slot or subframe) of a WUS of another UE subgroup. Alternatively, an end of a time resource unit (or slot or subframe) of a WSU maximum duration of a specific UE subgroup may be matched to a start of a time resource unit (or slot or subframe) of a WUS resource (e.g., a common WUS resource) for a legacy UE. A UE may specify an end of a time resource unit (or slot or subframe) of a WUS maximum duration of a specific UE subgroup based on a start of a resource unit (or slot or subframe) of another WUS resource and detect (or monitor) whether a WUS signal for itself is received within the specified WUS resource.

In this case, as shown in FIG. 24 (a), a position of a start of a time resource unit (or slot or subframe) of WUS1 may be determined based on a gap 1 and a maximum duration of the WUS1. In this case, a position of a start of a time resource unit (or slot or subframe) of WUS2 may be determined based on the position of the start of the time resource unit (or slot or subframe) of the WUS1 and a maximum duration of the WUS2. As shown in FIG. 24 (a), in case of following the seventh TDM scheme, a separate overhead for designating a start subframe of a WUS for each UE subgroup does not occur. Moreover, unnecessary resource waste can be prevented as a gap is unnecessary between the WUS1 and the WUS2.

Alternatively, according to the seventh TDM scheme, as shown in FIG. 24 (b), an end of a time resource unit (or slot or subframe) of a WUS maximum duration of a specific UE subgroup may be determined as a position spaced apart from a start (or a starting point) of a time resource unit of another UE subgroup by a gap in predetermined size. Particularly, if a start of a time resource unit of WUS1 is determined through a gap 1 and a maximum duration of the WUS1, a starting position of a time resource unit of WUS2 may be determined based on the starting position of the time resource unit of the WUS1, a maximum duration of the WUS2, and a gap 2. The gap 2 may be configured to minimize inter-signal interference that may occur if transmission positions of different WUSs are adjacent to each other. For example, if a UE has a mismatch of timing synchronization in a Discontinuous Reception (DRX) interval, the present disclosure may prevent unnecessary power consumption by detecting (or receiving) a transmission of a WUS for another UE subgroup of an adjacent time resource unit (or slot or subframe). In addition, a size of the gap 2 may be configured in advance, and particularly, include a value predefined in the standard document or a value signaled through SIB or higher layer signaling such as RRC signaling.

Alternatively, as shown in FIG. 24 (c), a starting point of a time resource unit of a WUS maximum duration of a specific UE subgroup (or a starting point of a time resource unit of a WUS) may be determined as a position spaced apart from a starting point of a time resource unit of a WUS of another UE subgroup by an offset over a predetermined size. As shown in FIG. 24 (c), if a start (or a starting point) of a time resource unit of WUS1 may be determined based on a gap 1 and a maximum duration of WUS1, a start (or a starting point) of a time resource unit of WUS2 may be determined based on (or using) the start (or starting point) of the time resource unit of the WUS1 and an offset value related to the WUS2. If a size of the offset is smaller than a maximum duration of the WUS2, the determined interval of the maximum duration of the WUS2 may overlap an interval of the maximum duration of the WUS1 in part. The seventh TDM scheme has an effect of reducing a size of a time domain resource consumed in performing subgrouping of WUS by TDM. In addition, as a size of the offset is determined as a preset value (e.g., a value determined by the standard document or a higher-layer-signaled value), a size of a time domain resource consumed due to WUS subgrouping by TDM may be fixed (or, separate signal overhead generation is prevented).

Alternatively, the size of the offset may be determined based on a maximum duration of WUS or a maximum repetition number Rmax of the paging NPDCCH. Alternatively, the size of the offset may be expressed as a function for a maximum duration of WUS or Rmax. Here, the size of the offset may be determined as a value corresponding to a value resulting from multiplying the maximum duration of the WUS (or Rmax) by a preset rate. In this case, WUSs in various lengths can be configured while a rate of the overlapping sections between WUSs of different TDMed UE subgroups is maintained at a predetermined level, based on the offset value determined based on the preset rate. Here, the preset rate may include a value indicated by higher layer signaling corresponding to RRC signaling or a value determined according to a predetermined equation (e.g., a value calculated according to the standard document).

FDM Based UE Subgrouping

A UE subgroup classification scheme using a frequency resource for transmitting a signal of WUS for UE subgrouping is applicable. In the proposed method, different UEs expecting a WUS on the same time resource can be classified by a WUS transmission position determined based on a UE subgroup. If an FDM based method is used, a WUS signal can be maintained identical to a legacy WUS to which UE subgrouping is not applied. In this case, the increase of complexity can be minimized in aspects of UE and BS implementation and signal generation. In addition, in case that PRBs exist in Narrow Band (NB) not used at a transmission timing point of an MWUS like MTC, the present disclosure may increase use efficiency of a frequency resource by reutilizing the PRB and the like (e.g., utilizing the PRB for FDM based UE subgrouping).

Embodiments described in the proposed scheme (or method) in the following are applicable to an FDM scheme that considers both a legacy WUS for UEs to which UE subgrouping is not applied and UE subgroup WUSs for UEs to which UE subgrouping is applied. Alternatively, even if such a scheme as TDM and the like is applied between a legacy WUS and a UE subgroup WUS, the FDM based subgrouping scheme is usable for the selection of a frequency domain resource of a UE subgroup WUS. UE subgrouping through a transmission position of a WUS signal may be applicable in a manner of combining one or more (or two or more) of first to third FDM schemes proposed below.

FIG. 25 and FIG. 26 are diagrams to describe a UE subgrouping method using a position of a frequency resource used for mapping of a WUS.

A first FDM scheme may include a UE subgrouping method using a position of a frequency resource used for mapping of a WUS. The first FDM scheme proposes a method of classifying UE subgroup information using a position of a frequency resource used for mapping of a WUS. Since the proposed method reuses a signal of a legacy (particularly, MWUS), implementation complexity of a UE for signal detection can be maintained.

According to the first FDM scheme, a BS may configure a frequency resource position per UE subgroup. The BS may determine a frequency resource position per UE group by dividing a narrowband configured for UE subgroups by the number corresponding to the number of the UE subgroups. For example, as shown in FIG. 25, a BS may determine a PRB position within a narrowband (or a narrowband to which an MWUS defined in 36.211_Rel-15 is mapped) so that each UE subgroup matches each of 3 zones resulting from dividing a narrowband in unit of 2 PRBs. In this case, the present disclosure may obtain a UE subgrouping effect by transmitting an additional MWUS while maintaining (or reusing) the frequency resource allocation scheme of a Rel-15 MWUS as it is. More specifically, an index of a starting PRB to which an MWUS per UE subgroup is mapped may be determined as one value selected from {0, 2, 4}.

Alternatively, as an embodiment of the first FDM scheme, as shown in FIG. 26, regarding a PRB position within a narrowband to which an MWUS defined in 36.211_Rel-15 is mapped, as shown in FIG. 34, a narrowband can be divided per UE subgroup in a manner of indicating a starting PRB in unit of 1 PRB. In this case, the embodiment of the first FDM scheme may further increase the number of UE subgroups. For example, in case of classifying a WUS by an interval of 2 PRBs like Rel-15, the maximum number of operable UE subgroups is 3. Yet, since the embodiment of the first FDM scheme can operate maximum 5 starting PRBs, the maximum number of the operable UE subgroups may be maximum 5. Alternatively, in case of configuring a PRB region shared between WUSs, a size of a full PRB bandwidth on which a WUS is transmitted is decreased, whereby an effect of power boosting can be easily obtained. For example, in case of operating 3 WUSs, as shown in FIG. 26, total 4 PRBs are used. This can save 2 PRBs in comparison to the configuration scheme of a Rel-15 MWUS.

Alternatively, as an embodiment of the first FDM scheme, a PRB position within a narrowband to which an MWUS defined in 36.211_Rel-15 is mapped may be explicitly configured per UE subgroup through an SIB or higher layer signal corresponding to RRC signaling. In this case, a PRB position information delivered through a higher layer signal may include information of a starting PRB to which a WUS is mapped.

As an embodiment of the first FDM scheme, a PRB position within a narrowband to which an MWUS defined in 36.211_Rel-15 is mapped may be determined indirectly (or implicitly) by a UE subgrouping index. A WUS per UE subgroup is mapped with reference to a predetermined starting PRB index. A UE may obtain (or determine) PRB information of a WUS, which is to be transmitted to the UE, based on a corresponding UE subgrouping index. In this case, a BS may determine the number of UE subgroups to operate and inform UEs of the information related to the determined number of the UE subgroups through SIB or higher layer signaling corresponding to RRC signaling. If such information related to the number of the UE subgroups is provided, the UE may be aware of starting PRB information of a WUS, which is to be monitored by the UE, using a UE subgrouping starting PRB determining method predetermined by the standard and the number of UE subgroups in a narrowband. If a transmission PRB of a WUS is determined implicitly, UE subgrouping capable UEs may be configured not to use a WUS PRB used by a legacy WUS capable UE having no UE subgrouping capability. In this case, a UE subgrouping capable UE may check WUS starting PRB allocation information configured for a legacy UE through SIB or RRC signaling, and then exclude the checked position from an available list of its WUS starting PRB. Through this method, UE-subgrouping incapable UEs (i.e., UEs having no UE subgrouping capability) can be prevented from obtaining incorrect information due to a WUS for a subgrouping capable UE. If whether to apply the excluding operation is configured by a BS, the BS may transmit WUS configuration information in which the signaling indicating whether a legacy WUS resource is sharable is included. In this case, UE subgrouping applied UEs may determine whether the legacy WUS resource is available based on the WUS configuration information.

Alternatively, as an embodiment of the first FDM scheme, a PRB position within a narrowband to which an MWUS defined in 36.211_Rel-15 is mapped may be determined based on a position of a common starting PRB and information on a relative offset per UE subgroup. In this case, a UE may determine a starting PRB position of a WUS, on which the UE will perform monitoring, by combining information of an offset for a corresponding UE subgroup and information of a common starting PRB. The information on the offset may be explicitly configured by a BS using SIB or higher layer signaling corresponding to RRC signaling. Alternatively, the information on the offset may be indirectly (or implicitly)known to a UE through a UE subgroup index and/or the number of UE subgroups operated in a narrowband. In this case, regarding a position of a starting PRB, a PRB having a WUS transmitted thereon should be included in the narrowband entirely. For example, when a position of a WUS PRB is as shown in FIG. 26 (or FIG. 25), a position of a starting PRB may be determined by Equation 12 below. Here, $f_i$ means a starting PRB of an $i^{th}$ UE subgroup, $f_0$ means a starting PRB of a legacy UE (e.g., a Rel-15 MWUS capable UE), and $f_{offset,i}$ means an offset value of an $i^{th}$ UE subgroup.

$$f\_i = (f\_0 + f\_(\text{offset},i)) \bmod 6 \quad \text{[Equation 12]}$$

If a size of the offset is implicitly determined and the maximum number of UE subgroups that can be FDMed is 2, the size $f_{offset,i}$ of the offset may be determined within the set of {0, 2} or {0, −2}. Such a size restriction of the offset is to prevent the simultaneous WUS transmission that exceeds 4 PRBs within a single narrowband despite applying a UE subgrouping WUS of the FDM scheme.

Alternatively, if there is a single FDM resource of a UE subgroup (or, if an FDM scheme is used to classify a legacy WUS and a UE subgroup WUS only and the same PRB pair is used between UE subgroup WUSs), a size $f_{offset,i}$ of the offset may be determined as 2 or −2. When the number of small-size UE subgroups is configured, a legacy WUS and a UE subgroup WUS are FDMed to each other, whereby such an offset size determination intends to minimize each other's effects.

Alternatively, if there is a single FDM resource of a UE subgroup (or, if FDM is used for the purpose of classifying a legacy WUS and a UE subgroup WUS only and the same PRB pair is used between UE subgroup WUSs), a size $f_{offset,i}$ of the offset may be determined as 0 to raise Energy Per Resource Element (EPRE) of a WUS by minimizing the number of PRBs necessary for transmission of the WUS.

Alternatively, a UE in DRX state may have an offset size set configured different from an offset size set configured for a UE in eDRX state. For example, if an offset size $f_{offset,i}$ is allocated to a UE in DRX state within a set of {0, 2}, an offset size $f_{offset,i}$ may be allocated to a UE in eDRX state within a set of {0, −2}. Namely, when a WUS-to-PO gap of a DRX UE and a WUS-to-PO gap of an eDRX UE are equal to or adjacent to each other, it may be intended to transmit WUSs for the two UEs respectively or simultaneously. Such an embodiment is applicable to another situation that WUS-to-PO gaps in different sizes corresponding to the same PO can be configured (i.e., a case that both an eDRX long gap and an eDRX short gap are supported).

FIG. 27 is a diagram to describe a method of performing a UE subgrouping method according to a second FDM scheme.

A second FDM scheme proposes methods of dividing a frequency resource used for mapping of legacy WUS and using it for UE subgrouping. In the second FDM scheme, a partial frequency resource of a legacy WUS (or a UE subgrouping incapable WUS) may be used as a frequency resource used for mapping of a WUS for UE subgroup information. In this case, since a PRB resource of a legacy Rel-15 MWUS is reusable identically, the present disclosure can maintain a transmission power level of MWUS to be greater than or equal to the existing one. A specific method of UE subgrouping in a second FDM scheme is described as follows.

As an embodiment of the second FDM scheme, 2 consecutive PRBs to which an MWUS for Rel-15 defined in 36.211_Rel-15 may be divided into two 1-PRB regions, as shown in FIG. 27, and then allocated to UE subgroups, respectively. In this case, a UE may estimate a position of a PRB corresponding to its own UE subgroup using a formula of Equation 13. Here, $f_{subgroup1}$ and $f_{subgroup2}$ mean PRB indexes in a narrow band used by the subgroups, respectively, and $f_0$ means a starting PRB of a legacy UE (e.g., a Rel-15 MWUS capable UE).

$$\begin{cases} f_{subgroup1} = f_0 \\ f_{subgroup2} = f_0 + 1 \end{cases} \quad \text{[Equation 13]}$$

A BS may explicitly configure PRB allocation information of a WUS that a UE will monitor using SIB or higher layer signaling corresponding to RRC signaling. Alternatively, PRB allocation information of a WUS that a UE will monitor may include a value that the UE may be implicitly aware of using a UE subgroup index.

According to the second FDM scheme, the number of PRBs used due to a WUS can be identically maintained in comparison with a legacy WUS. In addition, a BS may use only the same PRB as a legacy WUS for the transmission of a common WUS for both of a legacy UE and a UE subgroup capable UE.

FIG. 28 is a diagram to describe a method of performing UE subgrouping according to a third FDM scheme.

A third FDM scheme proposes methods of using a different hopping pattern for each UE subgroup. In the third FDM scheme, a frequency hopping pattern in PRB unit of a WUS may be generated per UE subgroup using UE subgroup information. In this case, since a different hopping pattern is used per UE subgroup, frequency hopping is used to classify different UE subgroups and may secure frequency diversity. Alternatively, the present disclosure according to the third FDM scheme may obtain a diversity gain through frequency hopping and reduce interference occurring between different cells.

As an embodiment of the third FDM scheme, as shown in FIG. 28, hopping in PRB unit may be applied to a PRB to which an MWUS for Rel-15 defined in 36.211_Rel-15 is mapped. Referring to FIG. 28, a WUS transmission starts per UE subgroup from a different PRB and hopping in PRB unit is performed according to time within a WUS transmission duration. Particularly, a position of a PRB used at the starting timing point of a transmission of a WUS (i.e., a reference PRB from which PRB hopping starts) may be determined by a UE subgroup index. In this case, different UE subgroups may be classified in frequency domain. Alternatively, a PRB hopping pattern of WUS a may be determined based on a function by a UE subgroup index, and different PRB hopping patterns may be configured between different UE subgroups.

Alternatively, a hopping pattern in narrowband unit operated in a full cell bandwidth may be applied to a PRB to which an MWUS related to Rel-15 defined in 36.211_Rel-15 is mapped.

CDM+TDM Based UE Subgrouping

A UE subgroup classification scheme using a signal of WUS for UE subgrouping and a UE subgroup classification scheme using a time resource for transmitting a signal of WUS may be combined together. In the proposed method, each of different UEs expecting the same WUS may be classified through a WUS signal configured for its own UE subgroup and a time domain resource on which a WUS signal is transmitted.

FIG. 29 is a diagram to describe a method of performing UE subgrouping according to a first C/TDM scheme.

A first C/TDM scheme proposes methods of performing UE subgrouping through addition of a section of an additional actual transmission duration. Particularly, according to the first C/TDM scheme, for a UE subgroup capable UE, a section of an additional actual transmission duration can be added. Namely, according to the first C/TDM scheme, the present disclosure may perform UE subgrouping in a manner of adding a section of an additional actual transmission duration. According to the first C/TDM scheme, a BS may schedule multiple UEs simultaneously as well as reutilizes a resource of a legacy Rel-15 WUS.

As an embodiment of the first C/TDM scheme, a generation scheme of a WUS signal may be used in a manner of applying (or combining and applying) one or more of the TDM-related and CDM-related schemes.

Alternatively, as an embodiment of the first C/TDM scheme, an actual transmission duration in which a WUS signal can be transmitted may correspond to the structure shown in FIG. 29. Referring to FIG. 29, each numeral means an index of a WUS signal a UE intends to detect, '0' means a legacy WUS, and '1' and '2' mean WUSs corresponding to UE subgroup indexes, respectively. In case of a UE having no UE subgrouping capability (e.g., a legacy WUS capable UE expecting a Rel-15 NWUS (or MWUS)), an actual transmission duration may be always aligned with a position at which a maximum duration starts. On the other hand, in case of a UE subgrouping capable UE, a plurality of start positions of an actual transmission duration may exist (or be configured) within a maximum duration. For example, as shown in FIG. 29, in case of a UE subgrouping capable UE, a random starting point (e.g., a point corresponding to ½ of a maximum duration) within a maximum duration may be configured as an additional starting point of an actual transmission duration. In this case, the UE subgrouping capable UE may consider at least one of a starting point of the maximum duration and an additional starting point of an added actual transmission as a starting point of an actual transmission duration.

Alternatively, a scrambling re-initialization method may be considered in the first C/TDM scheme. In this case, as an embodiment of the first C/TDM scheme, initialization of a scrambling sequence used for the generation of an NWUS (or MWUS) signal defined in 36.211_Rel-15 may be performed with reference to a maximum duration starting position (i.e., a starting position of a first actual transmission duration within a maximum duration section), in order to reduce complexity of a UE by maintaining backward compatibility according to a WUS transmission scheme of a UE subgrouping incapable UE (i.e., a UE having no subgrouping capability) (e.g., a UE supportive of a legacy WUS for a Rel-15 NWUS or MWUS).

As an embodiment of the first C/TDM scheme, initialization of a scrambling sequence used for the generation of an NWUS (or MWUS) signal defined in 36.211_Rel-15 may be performed with reference to a starting position of an actual transmission duration. Here, a WUS transmission for which initialization has been performed already at a specific position may not be reinitialized even if arriving at a position of a subsequent actual transmission duration existing in the same maximum duration. Namely, in case that a BS transmits a WUS signal using a starting point of an actual transmission duration except a starting point of a maximum duration in order to provide information for a UE subgroup capable UE only, it may be intended to prevent UEs having no UE subgrouping capability from recognizing the transmission of WUS.

A second C/TDM scheme proposes methods applying CDM and TDM sequentially according to the number of UE subgroups in case of using both CDM and TDM schemes. In case that both CDM and TDM schemes are usable to classify UE subgroup information, in a second C/TDM scheme, a code-domain resource and/or a time-domain resource applied to each UE subgroup can be determined based on the number of UE subgroups operated by a BS. In the second C/TDM scheme, when the number of UE subgroups can be determined by a BS, the determined number of the UE subgroups may be shared by the UE and the BS (or used to enable the UE and the BS to recognize it identically). Alternatively, at least one of a second C/TDM scheme-1 and a second C/TDM scheme-2 is applicable as follows.

A second C/TDM scheme-1 proposes methods of classifying a UE subgroup according to a CDM first subgroup allocation method. For example, when the number of UE subgroups that can be classified through CDM on the same time/frequency domain resource is Nc and the number of UE subgroups configured by a BS is M, it is able to use a TDM scheme using n time domain resources, where an integer n meets the condition of $(n-1) \cdot N_c < M \le n \cdot N_c$. In this case, UE subgroups can be dispersed and classified as equally as possible using the CDM scheme. Particularly, when a size of n is defined based on the above condition and an index of a UE subgroup to which a UE belongs is Mi, the UE may select a time domain resource of $(M_i \bmod n)^{th}$ index. Alternatively, in case of the condition of $N_c \ge M$, UE subgrouping using a method of CDM only may be performed. In this case, all UE subgroups may share the same time domain resource. In case of the condition of Nc<M≤2Nc, two time domain resources are used for UE subgrouping and M/2 UE subgroups may be classified on each time domain resource by the CDM scheme. According to the second C/TDM scheme-1, a use of a time domain resource within classification capability of a code domain resource can be minimized and the overhead due to WUS can be reduced.

A second C/TDM scheme-2 proposes methods related to TDM first subgroup allocation. When the number of UE subgroups that can be classified through TDM is Nt and an index of a UE subgroup is Mi, a UE may be set to use a (Mi mod Nt)$^{th}$ time domain resource to minimize the number of code domain resources configurable on each time domain resource simultaneously. It is obvious that the same principle of the second C/TDM scheme-2 is applicable to a case of using FDM instead of TDM. In this case, a time domain resource in the above description may be replaced by a frequency domain resource.

A third C/FDM scheme [propose methods of generating a WUS signal by considering a presence or non-presence of a group common WUS if an overlap occurs between WUSs of different UE subgroups in a TDM structure Particularly, as a TDM scheme is used to classify a UE subgroup of a WUS, if maximum durations of the TDMed WUSs overlap each other in part, a WUS for group common indication and a WUS for UE subgroup indication may be generated by different schemes, respectively. For example, if TDM is used to classify a UE subgroup, a partial WUS overlapping between different UE subgroups may be allowed by the third C/TDM scheme to solve the shortage problem of a time domain resource or limit a WUS-to-PO gap size.

Specifically, in case of using a WUS classification scheme is used between UE subgroups using TDM based on an eighth TDM scheme, a WUS for group common indication and a WUS for UE subgroup specification can be generated by different WUS signal generation schemes, respectively. Such a scheme is generally applicable to a case that a plurality of UE subgroups are additionally classified by CDM in a single TDMed WUS transmission interval. In this case, a UE subgroup specific WUS may be classified in a code domain from another WUS overlapped in a time domain. In this case, a generation scheme of a scrambling sequence of WUS may be independently determined for each UE subgroup, whereby different WUS signals can be expected between different UE subgroups in a WUS overlapped time resource unit (or slot or subframe). For example, a scrambling sequence of a UE subgroup specific WUS may be generated by applying the method of the first CDM scheme. On the other hand, a WUS for group common indication determines a reference WUS signal that becomes a reference, and all UE subgroups in the overlapped interval may expect the reception of the reference WUS signal identically. Thus, an operation of expecting a reception of a reference WUS signal may be an operation of preventing a WUS of a specific UE subgroup from interfering with a transmission by a WUS of another UE subgroup in case of intending to give indication to all UE groups. For example, a WUS for group common indication may use the proposed third or fourth TDM scheme. In this case, the reference WUS signal may be determined as a legacy WUS to which UE subgrouping is not applied so that a group common indication operation of a UE subgrouping incapable UE can avoid being interrupted by a UE subgrouping capable UE.

CDM+FDM Based UE Subgrouping

A UE subgroup classification scheme using a signal of WUS for UE subgrouping and a UE subgroup classification scheme using a frequency resource for transmitting a signal of WUS may be used in a manner of being combined. In the proposed method, each of different UEs expecting the same WUS may classify a WUS signal configured for its own UE subgroup and a WUS signal for another UE subgroup based on a frequency domain resource. A first C/TDM scheme proposed below is applicable to UE subgrouping through WUS signal classification.

A first C/FDM scheme proposes methods of including UE subgrouping information using a WUS signal when a frequency resource used for mapping of a legacy WUS is used for UE subgrouping in a manner of being divided.

Particularly, when a WUS signal is generated in the first C/FDM scheme, UE subgroup information is included in the WUS signal and a partial region of a legacy WUS (or a UE subgrouping incapable WUS (i.e., a not UE subgrouping capable WUS)) may be used as a frequency resource for a WUS of a UE subgroup capable UE. According to the first C/FDM scheme, in case that restriction on an available resource exists in aspect of CDM or FDM, a BS may configure WUS signals for more UE subgroups (or support more UE groups) by combination of the UE subgroup classification scheme according to CDM and the UE subgroup classification scheme according to FDM.

As an embodiment of the first C/FDM scheme, a generation scheme of a WUS signal may use (or combine) at least one of the UE subgroup classification scheme according to CDM and the UE subgroup classification scheme according to FDM. In this case, the above-used WUS signal may include a WUS signal for a UE-subgroup and a WUS signal used as a common indicator. The WUS signal used as the common indicator may provide information to all WUS capable UEs, and may be generated by the generation scheme of a legacy WUS (e.g., a Rel-15 WUS that uses 2 PRBs in 36.211_Rel-15. The WUS signal for the UE subgroup may be generated to be distinguished from the legacy WUS, and the same WUS signal may be used between UE subgroups that use different PRBs. On the contrary, UE subgroup classification by a WUS signal is possible between different UE subgroups that use the same PRB.

Alternatively, as an embodiment of the first C/FDM scheme, the second FDM scheme is applicable to a position of a PRB used for transmission of a WUS signal. Alternatively, in the first C/FDM scheme, a UE may monitor both a UE subgroup specific WUS signal and a WUS signal for the common indication at a position of a PRB corresponding to a UE subgroup.

Selecting WUS Multiplexing Resource Based on WUS Parameters

The inter-UE subgroup WUS multiplexing methods proposed above may have different advantages and disadvantages depending on situations. Hence, it is able to select a WUS resource by determining at least one of the above-described various WUS multiplexing methods based on such situations as a channel state, variation of the number of UE subgroups, etc.

For such a WUS resource selection, a BS may explicitly inform a UE of a WUS resource determined to be used actually among predetermined available WUS resources (or a WUS resource according to a WUS multiplexing method determined to use actually among the above-mentioned various WUS multiplexing methods) through SIB or a higher layer signal corresponding to RRC signaling. In this case, the BS may select a multiplexing (or operating) scheme of a WUS resource appropriate e for a situation, whereby scheduling flexibility can be guaranteed.

Alternatively, a BS or UE may implicitly provide information on WUS resource configuration through parameters for another purpose, thereby and decrease signaling overhead. Particularly, WUS related parameters may become major factors for determining advantages and disadvantages of the WUS resource operation scheme and the respective WUS multiplexing schemes. The present disclosure proposes methods of determining a WUS resource for UE subgrouping based on parameters related to a WUS using such characteristics.

Meanwhile, for clarity of the following description, a scheme of classifying WUS signals for WUS subgrouping by TDM may be schematically described as a TDM scheme, a scheme of classifying WUS signals for WUS subgrouping by CDM may be schematically described as a CDM scheme, and a scheme of classifying WUS signals for WUS subgrouping by FDM may be schematically described as an FDM scheme, An inter-UE subgroup WUS multiplexing scheme may be determined based on the determination of WUS resources according to WUS related parameters (or determined differently according to the determination). At least one of first to fifth RSEL schemes may be applied (or combined and applied) to the related embodiments.

A first RSEL method proposes methods of determining a WUS resource to be used according to a maximum repetition value (or Rmax) of a paging NPDCCH or a maximum duration of a WUS. In this case, the first RSEL scheme may determine a WUS multiplexing scheme based on at least one of a first RSEL scheme-1 and a first RSEL scheme-2.

A first RSEL scheme-1 proposes methods of determining a TDM scheme (or whether to apply a TDM scheme) based on Rmax or a maximum duration of WUS. The present disclosure may include a method of determining the number of time domain resources available for UE subgrouping according to Rmax or a maximum duration (hereinafter WUSmax) of WUS like the first RSEL scheme-1. In case of a WUS defined in the current Rel-IS NB-IoT/MTC, repetition for coverage extension (or repetitive transmission) is applied, and repetition of bigger size may be requested to support a wider coverage. So to speak, the wider the coverage gets, the bigger the number of repetitive transmissions becomes. In addition, if a value of WUSmax is greater than a preset threshold, a relatively wide coverage is supported but a quantity of a time domain resource necessary for UE subgrouping may be greatly increased. Namely, if the WUSmax value is greater than the preset threshold, a quantity of a necessary time domain resource is increased as much as the increased coverage. In addition, as the use of a time domain resource for TDM increases more, heavier network overhead may be induced. Considering this, an additional use of a time domain resource needs to be restricted for a large WUSmax value. In case of Rmax that determines a maximum repetition of a paging, if the Rmax gets larger in general, the bigger overhead for the paging is necessary (or, if Rmax increases, overhead for paging increases as well). In this case, as a time domain resource for WUS multiplexing of a TDM scheme increases more, probability of collision between a transmission position of a paging and a transmission position of a WUS increases higher. In addition, considering that since a value of Rmax is used as a parameter directly used to determine WUSmax, if a value of Rmax increases, a value of WUSmax may increase as well.

As an embodiment of the first RSEL scheme-1, it is able to consider a method of dividing values of WUSmax (or Rmax) into at least one or more sections and then determining the number of time domain resources used according to each of the sections. If a value of WUSmax (or Rmax) is equal to or greater than (or exceeds) a preset value, the number of the time domain resource used without application of TDM may be limited to 1. If the value of WUSmax (or Rmax) is smaller than (or equal to or smaller than) the preset value, two or more time domain resources to be used may be determined and a TDM scheme for WUS grouping may be applied thereto.

A first RSEL scheme-2 proposes methods of determining a CDM scheme (or whether to apply a CDM scheme) based on Rmax or a maximum duration of WUS. In the first RSEL scheme-2, the number of available code domain resources may be determined based on Rmax or a maximum duration (hereinafter WUSmax) of WUS in a manner similar to the first RSEL scheme-1. A power saving gain using a WUS may be more important to UEs that need repetition (or repetitive transmission) over a predetermined size. If the number of UE subgroups is increased, the first RSEL scheme-2 can increase an effect of a power saving gain by preventing an unnecessary wakeup operation of a UE.

In addition, if a time domain resource is reduced due to the increase of WUSmax or Rmax according to the first RSEL scheme-1, a method for supplementing the number of insufficient UE subgroups may be necessary. In this case, since a time domain resource is limited according to a predetermined rule, a relatively available code domain resource may be additionally applicable according to the first RSEL scheme-2. As an embodiment to which the first RSEL scheme-2 is applied, it is able to consider a method of dividing values of WUSmax (or Rmax) into several sections and determining the number of code domain resources to use according to each section. According to the first RSEL scheme-12, as a value of WUSmax (or Rmax) increases, the number of the applied code domain resources may increase.

A second RSEL scheme proposes methods of determining whether to use a specific time domain resource for WUS according to a WUS-to-PO gap size. In the second RSEL scheme, a WUS resource in a time domain may be determined according to a WUS-to-PO gap size. According to the second RSEL scheme, the present disclosure determines a WUS resource in a time domain according to a WUS-to-PO gap size, thereby controlling the performance degradation, which occurs as a partial time domain resource has an increased gap with a PO in applying a TDM scheme, without separate signaling.

As an embodiment of the second RSEL scheme, in a system having a plurality of predetermined configurable time domain resources, a time domain resource of WUS, in which a WUS-to-PO gap size determined by WUS configuration parameters is equal to or greater than a specific value, may be restricted from being used. In this case, a gap between WUS and PO (i.e., a WUS-to-PO gap) may be calculated with reference to either a start of a time resource unit (or slot or subframe) of a WUS or an end of the time resource unit (or slot or subframe). For example, in a system defined to configure 2 time domain resources of a WUS therein, one time domain WUS resource (hereinafter, a WUS2 resource) may be determined based on a relative position of a start of a time resource unit (or slot or subframe) of the other time domain WUS resource (hereinafter, a WUS1 resource). Here, if a gap between a WUS2 resource and a PO is equal to or smaller than (or smaller than) a preset size, the second RSEL scheme (or a BS according to the second RSEL scheme) may determine or configure that both of the WUS1 resource and the WUS2 resource are usable. Alternatively, if the gap is greater than (or equal to or greater than) the preset size, the second RSEL scheme may determine or configure that the WUS1 resource is usable only.

For example, if the WUS-to-Po gap is increased over the preset size, as a time for a UE to stand by until receiving a paging after acquiring a WUS is increased, unnecessary power consumption may occur. In addition, when paging information is delivered to an eNB from an MME, if a WUS-to-PO gap is increased over the preset size, an expected latency may be increased considerably. From this perspective, a gap is limited to a size equal to or smaller than a predetermined size and the occurrence of separate signaling overhead can be minimized. So to speak, the present disclosure according to the second RSEL scheme may control the number of WUS signals classified by a TDM scheme based on a size of a gap.

A third RSEL scheme proposes methods of determining a multiplexing method between UE subgroups according to s WUS capability of a UE. Namely, according to the third RSEL scheme, a method of determining a multiplexing scheme between UE subgroups according to WUS capability of a UE can be determined. Here, the WUS capability may relate to a WUS-to-PO gap size for a UE (or necessary for a UE). When WUS capability is a difference in implementation related to WUS detection and subsequent operations of a UE, the present disclosure according to the third RSEL scheme may select a suitable (or appropriate) multiplexing method in consideration of UE's implementation features (as well).

In an embodiment of the third RSEL scheme, it is able to consider a situation that capability for a long gap having a relatively large value like gap capability for eDRX defined in Rel-15 NB-IoT/MTC and capability for a short gap having a relatively small value coexist. In this case, the long gap capability may target a receiver (or a UE) requiring relatively low complexity and low power consumption, but the short gap capability may target receivers requiring relatively high complexity and high power consumption in comparison with the long gap capability. Here, in case of a CDM applied multiplexing scheme not for classification of gap capability but for UE subgrouping, a UE may need to simultaneously perform Blind Decoding (BD) on a WUS for group common indication and a WUS for UE subgroup specific indication. On the other hand, in case that only TDM (or FDM) is applied not for classification of gap capability but for UE subgrouping, there is a single monitoring WUS resource of a UE, whereby the target of the BD may not increase. Considering such property, only the multiplexing between UE subgroups using TDM (or FDM) may be possible at a position of a gap for a UE of long gap capability. In this case, classification of a UE subgroup of a CDM scheme may be determined as not supported. On the contrary, at a position of a gap for a UE of short gap capability, a UE subgrouping operation using CDM may be allowed.

A fourth RSEL scheme proposes methods of determining how to operate a WUS resource based on an extent that UE_ID is dispersed per PO. Here, the dispersed extent of UE_ID may include a value estimated based on configuration information a BS signals for a paging related operation, and may be different from the number of UEs expecting a paging by being connected to a corresponding cell actually. In this case, the configuration information for the paging related operation may include the number of paging carriers used in NB-IoT, information of weight given per paging carrier, DRX cycle of PO, the number of POs for different UE_ID groups existing in DRX cycle, etc. The above parameters may be used to estimate the maximum number of UE_ID estimated to expect a paging for one PO. Alternatively, when some of the above-described configuration informations are used as parameters of a function of estimating a dispersed extent of UE_ID, the number of WUS resources may be determined based on a result value of the function. According to the fourth RSEL scheme, as the dispersed extent of UE_ID is used as prior information, the present disclosure may predict and reflect the number of actually necessary WUS resources, thereby preventing unnecessary waste of WUS resources.

A fifth RSEL scheme proposes methods of determining how to operate a WUS resource based on an operation mode. According to the fifth RSEL scheme, an operation scheme of a WUS resource can be determined based on an operation mode used in a system in which a plurality of operation modes exist like NB-IoT. The WUS resource operation scheme in the fifth RSEL scheme may be determined in consideration of a performance difference according to a difference of the number of OFDM symbols used per time resource unit (or slot or subframe) depending on an operation mode of NB-IoT. For example, in case of an in-band operation mode, the number of OFDM symbols available in a single subframe is 11 and the OFDM symbol may include RE puncturing to secure CRS transmission. On the other hand, in case of a guard-band and standard operation mode, 14 OFDM symbols in one subframe are available all and it is not affected by RE puncturing caused by CRS. In this regard, assuming that a UE in a guard-band and standalone operation mode uses the same power as the in-band operation mode, detection performance of WUS may be relatively good. By considering such property, the number of code domain resources to be used may be determined differently depending on an operation mode. For example, the number of code domain resources used for inter-UE subgroup multiplexing of a CDM scheme may be fixed by the standard. Alternatively, the number of the code domain resources in the guard-band/standalone operation mode may be determined as a value greater than that in the in-band operation mode.

According to a sixth RSEL scheme, a WUS resource selection scheme, which considers a case that a WUS parameter for a UE in eDRX state is optionally configurable, may be included. The sixth RSEL scheme proposes methods that a WUS parameter determines whether to apply configuration optionally depending on a presence or non-presence of DRX/eDRX of a UE and a gap size. According to the sixth RSEK scheme, if UE subgrouping for a WUS is applied, at least one WUS parameter configuration for UE subgrouping applied UEs should be configured, and a structure capable of establishing an additional WUS parameter configuration in optional form depending on a selection made by a BS may be considered. In the following description, for clarity, one WUS parameter configuration that should be guaranteed at least is defined as WUS-Con-A and an additionally configurable WUS parameter configuration is defined as WUS-Con-B. If two additionally configurable WUS parameter configurations exist, they are classified and represented as WUS-Con-B1 and WUS-Con-B2, respectively and combined together to be referred to as WUS-Con-B representatively.

Regarding the sixth RSEL scheme, at least one (or combined one) of a sixth RSEL scheme-0 to a sixth RSEL scheme-4 is additionally applicable. If there are one or more supportable schemes among the sixth RSEL scheme-0 to the sixth RSEL scheme-4 in a BS, the BS may select one or more methods from the sixth RSEL scheme-0 to the sixth RSEL scheme-4 and then inform a UE of the selected method(s).

A sixth RSEL scheme-0 proposes methods of determining a WUS parameter, to which the sixth RSEL scheme is applied, based on a time-frequency resource of a WUS and/or the number of UE subgroups. Here, the time-frequency resource of the WUS may relate to whether TDM or FDM is applied. For example, a time-frequency resource of a WUS and/or the number of UE subgroups may correspond to a value of a WUS parameter to which the sixth RSEL scheme is applied.

A sixth RSEL scheme-1 proposes methods of applying WUS-Con-B to a UE in eDRX state only. In this case, WUS-Con-A may be applied to a UE in DRX state. If WUS-Con-A exists only but WUS-Con-B is not configured, all UEs to which UE subgrouping is applied may operate with reference to the WUS-Con-A. In the sixth RSEL scheme-1, if a WUS-to-PO gap size for DRX and a WUS-to-PO gap size for an eDRX short gap are configured equal to each other, WUS-Con-A may be applied to UEs to which the UE subgrouping that uses the eDRX short gap is applied irrespective of a presence or non-presence of WUS-Con-B. In this case, if WUS-Con-B exists, the WUS-Con-B may be applied to the UEs using the eDRX long gap.

Alternatively, according to the sixth RSEL scheme-1, UEs using the same WUS-to-PO gap may be configured to expect the same WUS irrespective of a presence or non-presence of DRX/eDRX. In this case, it is able to prevent a WUS overlapping problem that different WUSs are transmitted on the same WUS resource.

A sixth RSEL scheme-2 proposes methods of applying WUS-Con-B to a UE in eDRX state only and applying WUS-Con-A to a UE in DRX state. If WUS-Con-A is configured only but WUS-Con-B is not configured, all UEs to which UE subgrouping is applied may operate with reference to the WUS-Con-A. Alternatively, if WUS-Con-B is configured, an eDRX UE may operate with reference to the WUS-Con-B all the time. In this case, although a WUS-to-PO gap size for DRX and a WUS-to-PO gap size for an eDRX short gap are configured equal to each other, a UE that uses the eDRX short gap may operate with reference to the WUS-Con-B. If a BS intends to handle a UE in DRX state and a UE in eDRX short gap state equally, it may not configure WUS-Con-B. In this case, according to the sixth RSEL scheme-2, the BS may support additional optimization for a UE for an eDRX short gap.

A sixth RSEL scheme-3 proposes methods of applying WUS-Con-B to a UE in eDRX state only. Here, regarding the WUS-Con-B, WUS-Con-B1 for an eDRX short gap and WUS-Con-B2 for an eDRX long gap may be configured independently.

In the sixth RSEL scheme-3, if WUS-Con-A is configured only but WUS-Con-B1 and WUS-Con-B2 are not configured, all UEs performing UE subgrouping may operate (or be configured to operate) with reference to the WUS-Con-A. If WUS-Con-A and WUS-Con-B1 are configured but WUS-Con-B2 is not configured, a UE in DRX state may operate with reference to the WUS-Con-A and UEs in eDRX state may operate (or be configured to operate) with reference to WUS-Con-BL. If WUS-Con-A and WUS-Con-B2 are configured but WUS-Con-B1 is not configured, a UE in DRX state and a UE in eDRX short gap state may operate with reference to the WUS-Con-A and a UE in eDRX long state may operate with reference to the WUS-Con-B. If WUS-Con-A, WUS-Con-B1 and WUS-Con-B2 are configured all, a UE in DRX state, a UE in eDRX short gap state and a UE in DRX long gap state may operate (or be configured to operate) with reference to the WUS-Con-A, the WUS-Con-B1 and the WUS-Con-B2, respectively.

Alternatively, according to the sixth RSEL scheme-3, network flexibility can be enhanced in aspect that WUS parameters for an eDRX shot gap and an eDRX long gap can be configured independently. In addition, according to the sixth RSEL scheme-3, a UE may determine a WUS parameter that becomes a reference of UE subgrouping even if some WUS parameters are configured only.

A sixth RSEL scheme-4 proposes methods of applying WUS-Con-B2 to a UE in eDRX long gap state only and determining a WUS parameter of the WUS-Con-B2 by configuration of another WUS parameter (e.g., WUS-Con-A or WUS-Con-B1). Here, if an eDRX long gap is not configured in a corresponding cell, WUS-Con-B2 may not be configured.

According to the sixth RSEL scheme-4, only if an eDRX long gap configurable optionally by a US is supported, WUS-Con-B2 is configured and a UE in eDRX long gap state may operate (or be configured to operate) with reference to the WUS-Con-B2. In this case, the WUS-Con-B2 may not be applied to a UE in DRX state and UEs in eDRX short gap state. If WUS-Con-B1 exists, the UEs in eDRX short gap state may follow the WUS-Con-B1. If WUS-Con-B1 fails to exist, the UEs in the eDRX short gap state may follow (or be configured to follow) WUS-Con-A.

Alternatively, in the sixth RSEL scheme-4, WUS-Con-B2 may be (or be configured as) a subset of a WUS parameter configured in WUS-Con-A. For one example, if WUS-Con-B1 fails to exist and two TDMed WUS resources are configured in WUS-Con-A, WUS-Con-B2 may be configured to correspond to (or be equal to) the rest of WUS parameters in the WUS-Con-A except TDM (i.e., in case of selecting a single time domain WUS resource only). Alternatively, if WUS-Con-B1 is configured to have two TDMed WUS resources, WUS-Con-B2 may be configured to correspond to (or be equal to) the rest of WUS parameters in the WUS-Con-A except TDM (i.e., in case of selecting a single time domain WUS resource only) identically. In the above-described embodiments, if a single time domain WUS resource is configured in WUS-Con-A or WUS-Con-B1 only (i.e., a WUS resource of a TDM scheme is not configured), information on WUS-Con-B2 may be configured identical to that of the WUS-Con-A or the WUS-Con-B1. If such a method is applied, since the information of the WUS-Con-B can be represented in a manner of sharing signaling information of the WUS-Con-A, singling overhead can be reduced. In addition, in case of an eDRX long gap, since a size of a WUS-to-PO gap is relatively large, additional application of TDM may be inappropriate. Therefore, according to the sixth RSEL scheme-4, it is able to prevent the increase of paging delay due to addition of a time domain WUS resource.

FIG. 30 is a flowchart to describe a method of monitoring a WUS signal by a UE according to one embodiment of the present disclosure.

Referring to FIG. 30, a UE may receive WUS configuration information from a BS [S901]. The WUS configuration information may include allocation or configuration information on at least one WUS resource (or at least one WUS resource interval) related to a PO. Or, the WUS configuration information may include information on a classification scheme of classifying a WUS signal (or a group WUS signal or a WUS group signal) corresponding per group including at least one UE or configuration information on a WUS resource from which each WUS signal classified per group is detected. Here, the WUS resource (or signal) may be classified by the CDM scheme, the TDM scheme, the FDM scheme, or combination of at least two of the CDM, TDM and FDM schemes described above. In addition, the WUS configuration information may include at least one information selected from a maximum duration, time offset and PO of a WUS for specifying a position at which the WUS resource is allocated.

As described above, the WUS configuration information may be received from a BS through system information (or System Information Block (SIB)) or a higher layer signal (e.g., an RRC layer signal). Here, the system information includes SIB1, SIB2, SIB-BR, SIB-NB, etc.

The WUS configuration information may include information for specifying a plurality of WUS resources. A plurality of the WUS resources may be classified from each other by the aforementioned schemes of CDM, TDM, FDM and the like. Here, a plurality of the WUS resources are classified by the above-mentioned scheme to classify WUS signals for each of a plurality of UE groups, and a WUS resource or a WUS signal corresponding per WUS group may be defined as a group WUS resource or a group WUS signal. In addition, the WUS configuration information may further include configuration information on a legacy WUS resource (or a common WUS resource) for a legacy WUS signal (i.e., a legacy WUS signal that is not UE-grouped or a common WUS signal). A plurality of the WUS resources may include WUS resources corresponding to at least one or more WUS signals (or group WUS signals) classified per UE group. In addition, a plurality of the WUS resources may include a group WUS resource and/or a common WUS resource. So to speak, a plurality of WUS signals related to a specific PO may include a group WUS signal and/or a common WUS signal.

Alternatively, the WUS configuration information may include configuration information on a first WUS resource and/or a second WUS resource for a WUS signal classified by a TDM scheme. The WUS configuration information may include information related to a PO (i.e., information on a time resource, a frequency resource and the like of a PO) and an offset value and maximum duration information for each of the first WUS resource and the second WUS resource. Here, the offset value is a value for a time gap between the WUS resource and the PO, and the maximum duration information corresponds to a length of a time resource unit of the first WUS resource and a length of a time resource unit of the second WUS resource.

Alternatively, the WUS configuration information may include a first offset value for the first WUS resource and a second offset value for the second WUS resource. In this case, the first and second offset values may be set to different values, respectively, whereby the first and second WUS resources are prevented from overlapping each other in a time domain.

Alternatively, the WUS configuration information may include configuration information on a skipping duration that is an interval of a time domain resource in which detection of a WUS signal is not performed within the first or second WUS resource. Namely, in case that a UE detects (or monitors) a WUS signal from the first WUS resource, the UE may detect a first WUS signal in the rest interval except an interval corresponding to the skipping duration included in the WUS configuration information within the first WUS resource (or the first WUS resource interval).

Here, the first WUS resource may include resources allocated to detect (or monitor) a WUS signal for the UE or a specific group in which the UE is included. In addition, the first WUS resource may have configuration corresponding to a maximum duration for detecting (monitoring) a corresponding WUS signal.

Subsequently, the UE may specify time and frequency resources (or time domain resource, frequency domain resource and code domain resource) allocated for the first WUS resource based on the WUS configuration information [S903]. If the first WUS resource is a WUS resource for detection of a group WUS signal, the UE may specify the first WUS resource using the feature that a second WUS resource, which is another WUS resource specified by the WUS configuration information, and the first WUS resource are continuous with each other in a time domain. Namely, the UE may specify the first WUS resource by additionally considering the relationship with the second WUS resource specified by the WUS configuration information. Namely, the first WUS resource may be specified based on the second WUS resource specified based on the WUS configuration information. In this case, a position of a time or frequency resource of the first WUS resource may be specified in a manner of depending on a position of a time or frequency resource to which the second WUS resource is specified. Namely, the first WUS resource may be specified based on maximum duration information corresponding to the second WUS resource and the first WUS resource. Alternatively, the first WUS resource may be specified based on maximum duration information included in the WUS configuration information, information on a time resource unit to which a PO is allocated, and offset information related to a temporal gap with a PO. Meanwhile, the maximum duration information corresponding to each of the first and second WUS resources or the offset information related to the temporal gap with the PO may be included in the WUS configuration information or pre-acquired through separate higher layer signaling.

Alternatively, as described above, the first WUS resource may include a WUS resource for detection (or monitoring) of a group WUS signal. If the first WUS signal is a group WUS signal, the first WUS resource may be specified as a time resource unit continuous with the first WUS resource in a time domain based on the WUS configuration information. So to speak, an end or start of the time resource unit of the first WUS resource may match an end or start of a time resource unit of the second WUS resource. Namely, the end or start of the time resource unit of the first WUS resource may be specified in a manner of depending on the end or start of the time resource unit of the second WUS resource. In this case, the first WUS resource may have a time gap with the PO, which amounts to the same size resulting from adding a time gap between the second WUS resource and the PO and a maximum duration of the second WUS resource.

In addition, the second WUS resource may include a WUS resource for detecting (or monitoring) a common WUS signal. In this case, maximum duration information and offset information for specifying the second WUS resource may be directly provided by the WUS configuration information. The second WUS resource may be directly specified by the information included in the WUS configuration information without considering the relationship with the first WUS resource.

In addition, the second WUS resource may include a group WUS resource for another specific UE group like the first WUS resource. In this case, the second WUS resource may be continuous with the first WUS resource in a time domain or sequentially continuous with a UE-common WUS resource and the first WUS resource in a time domain. In the latter case, the second WUS resource may be continuous in the time domain right before the UE-common WUS resource and then continuous in the time domain right after the first WUS resource.

Alternatively, the first WUS resource may indirectly estimate an offset value related to itself, which is not provided from the WUS configuration information, based on an offset value for the second WUS resource and a maximum duration for the second WUS resource. Namely, the WUS configuration information includes the offset value for the second WUS resource only with respect to the first WUS resource and the second WUS resource but does not include an offset value for the first WUS resource. For example, the offset value for the first WUS resource may be calculated through the sum of the offset value for the second WUS resource and the maximum duration for the second WUS resource.

Alternatively, the WUS configuration information may provide maximum duration information for the second WUS resource only with respect to the first WUS resource and the second WUS resource. Here, the WUS configuration information may further include a scaling factor related to the first WUS resource. In this case, the UE may calculate maximum duration information for the first WUS resource by multiplying the maximum duration information for the second WUS resource by the scaling factor. Meanwhile, even in this case, the first WUS resource and the second WUS resource may be continuous with each other in a time domain.

Subsequently, the UE may detect a WUS signal from the specified first WUS resource [S905]. Here, the specified first WUS resource has an interval of a time domain resource corresponding to a maximum duration, and the WUS signal detected interval may be a partial interval of the maximum duration. Here, the WUS signal detected or transmitted interval may be defined as an actual transmission duration. The UE may determine whether a WUS signal detected in a monitoring interval corresponding to the first WUS resource exists. If the WUS signal is detected, the UE may monitor whether a paging signal related to the UE exists in a corresponding PO. On the contrary, if the WUS signal for the first WUS resource is not detected, the UE switches to an idle state and may not monitor whether the paging signal related to the UE exists in the corresponding PO.

FIG. 31 is a flowchart to describe a method for a Base Station (BS) to transmit a WUS signal according to one embodiment of the present disclosure.

Referring to FIG. 31, a BS may configure a WUS resource per WUS signal [S911]. The BS may broadcast or multicast WUS configuration information that is information on the WUS resources configured per WUS signal. Each of UEs connected to the BS may specify a time domain resource (or a time domain resource, a frequency domain resource and a code domain resource) of each of WUS resources for detecting (or monitoring) a WUS signal corresponding to the UE itself based on the broadcasted or multicasted WUS configuration information and information related to PO.

The BS may configure a WUS resource in a manner of classifying the WUS resource by a CDM scheme, a TDM scheme, an FDM scheme, or combination of at least two of the CDM, TDM and FDM schemes. So to speak, as described above, the BS may perform subgrouping on the WUS resources or signals to correspond per UE subgroup. Namely, the classification of the WUS resource is to transmit a WUS signal per UE group (or subgroup). The BS may classify a WUS resource by the above-described scheme to define a WUS signal per group for a specific PO. In addition, the WUS resource or signal classified per WUS group may be defined as a group WUS resource or signal. In addition, the WUS configuration information may further include configuration information on a legacy WUS resource (or a common WUS resource) for a legacy WUS signal (i.e., a legacy WUS signal that is not UE-grouped or a common WUS signal). A plurality of the WUS resources may include WUS resources corresponding to at least one or more WUS signals (or group WUS signals) classified per UE group. In addition, a plurality of the WUS resources may include a group WUS resource and/or a common WUS resource. So to speak, a plurality of WUS signals related to a specific PO may include a group WUS signal and/or a common WUS signal.

Information indicating how the WUS resources are classified may be further included in the WUS configuration information by the BS. Alternatively, the BS may signal information indicating how the WUS resources are classified through a separate higher layer signal. In addition, the WUS configuration information may include at least one information selected from a maximum duration, time offset and PO of a WUS for specifying a position to which the WUS is allocated, which is the information for specifying a legacy resource.

Alternatively, the BS may include WUS configuration information on a first WUS resource and/or a second WUS resource for a WUS signal classified by a TDM scheme. The WUS configuration information may include information related to a PO (i.e., information on a time resource, a frequency resource and the like of a PO) and an offset value and maximum duration information for each of the first WUS resource and the second WUS resource. Here, the offset value is a value for a time gap between the WUS resource and the PO, and the maximum duration information corresponds to a length of a time resource unit of the first WUS resource and a length of a time resource unit of the second WUS resource.

Alternatively, a first offset value for the first WUS resource and a second offset value for the second WUS resource may be included in the WUS configuration information by the BS. In this case, the first and second offset values may be set to different values, respectively, whereby the first and second WUS resources are prevented from overlapping each other in a time domain.

Alternatively, the BS may configure that the first WUS resource (or a group WUS resource corresponding to a group WUS signal) is continuous with the second WUS resource in a time domain. Namely, the BS may configure the first WUS resource so that the first WUS resource is specified right before the second WUS resource in the time domain. In this case, a starting or ending point of the first WUS resource may be specified in a manner of depending on an ending or starting point of a time resource unit of the second WUS resource, and, as described with reference to FIG. 30, the BS may not include the information on the offset value, the maximum duration and the like for the first WUS resource in the WUS configuration information, whereby signaling overhead can be reduced considerably. In case of the second WUS resource, the BS directly provides maximum duration information and offset information, which are the informations to specific the second WUS resource, through the WUS configuration information. The second WUS resource may be directly specified by the information included in the WUS configuration information without considering the relationship with the first WUS resource.

Alternatively, the BS may include configuration information on a skipping duration, which is an interval of a time domain resource on which detection of a WUS signal is not performed within the first or second WUS resource, in the WUS configuration information.

Subsequently, the BS may transmit the configured WUS configuration information to at least one or more UEs [S913]. In this case, the WUS configuration information may be signaled as a physical or higher layer signal.

Subsequently, the BS may transmit a WUS signal corresponding within each WUS resource based on the configured WUS configuration information [S915]. In this case, a WUS signal transmitted interval may be defined as an actual transmission duration and include a partial interval of the WUS resource.

First of all, a BS operation and a UE operation to which the present disclosure is applicable are described. A BS may transmit at least one configuration information for a WUS [SZ102]. For example, configuration information for a WUS may be transmitted to a UE through system information (or System Information Block (SIB)) or a higher layer signal (e.g., RRC layer signal). Here, the system information may include SIB1, SIB2, SIB-BR, SIB-NB, etc.

FIG. 38 illustrates a communication system 1 applied to the present disclosure.

Referring to FIG. 38, the communication system 1 applied to the present disclosure includes wireless devices, BSs, and a network. The wireless devices refer to devices performing communication by radio access technology (RAT) (e.g., 5G New RAT (NR) or LTE), which may also be called communication/radio/5G devices. The wireless devices may include, but no limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle equipped with a wireless communication function, an autonomous driving vehicle, and a vehicle capable of performing vehicle-to-vehicle (V2V) communication. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, and a washing machine. The IoT device may include a sensor and a smart meter. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured by using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and the BSs 200, or between the BSs 200. Herein, the wireless communication/connections may be established through various RATs (e.g., 5G NR) such as UL/DL communication 150a, sidelink communication 150b (or, D2D communication), or inter-BS communication 150c (e.g. relay, integrated access backhaul (IAB)). A wireless device and a BS/a wireless devices, and BSs may transmit/receive radio signals to/from each other through the wireless communication/connections 150a, 150b, and 150c. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

As described above, the BS 200 may classify WUS signals per UE group or subgroup. The BS may classify the WUS signals per UE group or subgroup using at least one of CDM, TDM and FDM schemes according to the aforementioned embodiments. The BS may configure a WUS resource to be classified per WUS signal like the aforementioned embodiments. The BS may deliver WUS configuration information on the WUS resource to UEs through a higher layer signal and the like. Thereafter, the BS may transmit a corresponding WUS signal within a WUS resource corresponding to the WUS configuration information.

Example of Wireless Device to which Present Disclosure is Applied

FIG. 33 illustrates a wireless device applicable to the present invention.

Referring to FIG. 33, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 22.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present invention, the wireless device may represent a communication modem/circuit/chip.

The processor 102 may perform an operation of monitoring a WUS signal according to a program stored in the memory 104. Particularly, the processor 102 may control the transceiver 106 to receive WUS configuration information according to the program stored in the memory 104. The processor 102 may specify a first WUS resource to monitor a WUS signal based on the received WUS configuration information. The processor 102 may perform a monitoring operation of detecting a WUS signal from the specified first WUS resource. If the first WUS resource is a WUS resource for detection of a group WUS signal, the processor 102 may specify the first WUS resource using the feature that the first WUS resource is continuous with a second WUS resource that is another WUS resource specified by the WUS configuration information. Namely, the processor 102 may specify the first WUS resource by additionally considering the relationship with the second WUS resource specified by the WUS configuration information. If the WUS signal is detected from the first WUS resource, the processor 102 may monitor whether a paging signal related to the processor 102 itself exists in a PO associated with the WUS signal.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

An Example of a Signal Processing Circuit to which the Present Invention is Applied FIG. 34 illustrates a signal process circuit for a transmission signal.

Referring to FIG. 34, a signal processing circuit 1000 may include scramblers 1010, modulators 1020, a layer mapper 1030, a precoder 1040, resource mappers 1050, and signal generators 1060. An operation/function of FIG. 34 may be performed, without being limited to, the processors 102 and 202 and/or the transceivers 106 and 206 of FIG. 33. Hardware elements of FIG. 34 may be implemented by the processors 102 and 202 and/or the transceivers 106 and 206 of FIG. 33. For example, blocks 1010 to 1060 may be implemented by the processors 102 and 202 of FIG. 33. Alternatively, the blocks 1010 to 1050 may be implemented by the processors 102 and 202 of FIG. 33 and the block 1060 may be implemented by the transceivers 106 and 206 of FIG. 33.

Codewords may be converted into radio signals via the signal processing circuit 1000 of FIG. 34. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 34. For example, the wireless devices (e.g., 100 and 200 of FIG. 33) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Utilization Examples of Wireless Devices to which Present Disclosure is Applied

FIG. 35 illustrates another example of a wireless device applied to the present invention. The wireless device may be implemented in various forms according to a use-case/service (refer to FIG. 22).

Referring to FIG. 35, wireless devices 100 and 200 may correspond to the wireless devices 100 and 200 of FIG. 33 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 33. For example, the transceiver(s) 114 may include the one or more transceivers 106 and 206 and/or the one or more antennas 108 and 208 of FIG. 33. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 22), the vehicles (100*b*-1 and 100*b*-2 of FIG. W1), the XR device (100*c* of FIG. 22), the hand-held device (100*d* of FIG. 22), the home appliance (100*e* of FIG. 22), the IoT device (100*f* of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 35, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 35 will be described in detail with reference to the drawings Examples of Mobile Devices to which Present Disclosure is Applied FIG. 36 illustrates a hand-held device applied to the present invention. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 36, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Examples of Vehicles or Autonomous Vehicles to which Present Disclosure is Applied FIG. 37 illustrates a vehicle or an autonomous driving vehicle applied to the present invention. The vehicle or autonomous driving vehicle may be implemented by a mobile robot, a car, a train, a manned/unmanned Aerial Vehicle (AV), a ship, etc.

Referring to FIG. 37, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 35, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present invention are combined in a predetermined form. Each component or feature should be considered optional unless explicitly stated otherwise. Each component or feature may be implemented in a form that is not combined with other components or features. In addition, it is also possible to constitute an embodiment of the present invention by combining some components and/or features. The order of operations described in the embodiments of the present invention may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present invention have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

What is claimed is:

1. A method for detecting a Wake Up Signal (WUS) signal by a user equipment in a wireless communication system, the method comprising:
   receiving, from a base station, WUS configuration information related to a first WUS resource and a second WUS resource, the WUS configuration information including information regarding a maximum duration of the second WUS resource; and
   detecting the WUS signal based on the WUS configuration information,
   wherein the WUS signal is a group WUS signal, and the first WUS resource is continuous with the second WUS resource in a time domain,
   wherein the WUS configuration information includes an offset value for the second WUS resource only from among the first WUS resource and the second WUS resource, and
   wherein the offset value of the WUS configuration information is information regarding a time gap between a Paging Occasion (PO) and the second WUS resource.

2. The method of claim 1, wherein, for the first WUS resource, a size of the time gap between the PO and the first WUS resource is determined based on the maximum duration of the second WUS resource and the offset value of the second WUS.

3. The method of claim 1, wherein the first WUS resource is specified to have an ending point of a time resource unit related to a starting point of a time resource unit of the second WUS resource.

4. The method of claim 1, wherein the second WUS resource is a WUS resource for reception of the WUS signal common for user equipments or another group WUS resource for detecting the group WUS signal.

5. The method of claim 1, wherein the WUS configuration information includes information on a skipping WUS duration in which monitoring of the WUS signal is not performed within the first WUS resource.

6. The method of claim 1,
wherein the WUS configuration information includes information on a scaling factor and
wherein a maximum duration for the first WUS resource is determined as a multiplication of the maximum duration for the second WUS resource and the scaling vector.

7. The method of claim 1,
wherein the WUS configuration information includes a scaling factor for each of the first WUS signal and the second WUS signal and an Rmax value to determine a repetition level of a paging and
wherein a maximum duration of the first WUS signal is determined based on a multiplication of the scaling factor related to the first WUS resource and the Rmax.

8. A method of transmitting a Wake Up Signal (WUS) by a base station in a wireless communication system, the method comprising:
generating WUS configuration information related to a first WUS resource and a second WUS resource, the WUS configuration information including information regarding a maximum duration of the second WUS resource;
transmitting the WUS configuration information; and
transmitting the WUS signal based on the WUS configuration information,
wherein the WUS signal comprises a group WUS signal, and the first WUS resource is continuous with the second WUS resource in a time domain,
wherein the WUS configuration information includes an offset value for the second WUS resource only from among the first WUS resource and the second WUS resource and
wherein the offset value of the WUS configuration information is information regarding a time gap between a Paging Occasion (PO) and the second WUS resource.

9. An apparatus for monitoring a Wake Up Signal (WUS) signal in a wireless communication system, the apparatus comprising:
a memory storing a program; and
a processor operating based on the program stored in the memory,
wherein the processor is configured to:
receive, from a base station, WUS configuration information related to a first WUS resource and a second WUS resource, the WUS configuration information including information regarding a maximum duration of the second WUS resource; and
detect the WUS signal based on the WUS configuration information,
wherein the WUS signal is a group WUS signal, and the first WUS resource is continuous with the second WUS resource in a time domain,
wherein the WUS configuration information includes an offset value for the second WUS resource only from among the first WUS resource and the second WUS resource and
wherein the offset value of the WUS configuration information is information regarding a time gap between a Paging Occasion (PO) and the second WUS resource.

10. The apparatus of claim 9, wherein the processor receives an input of a user and then switches a drive mode of a vehicle related to the apparatus to a manual drive mode from an autonomous drive mode, and vice versa.

11. An apparatus for transmitting a Wake Up Signal (WUS) signal in a wireless communication system, the apparatus comprising:
a memory storing a program; and
a processor operating based on the program stored in the memory,
wherein the processor is configured to:
generate WUS configuration information related to a first WUS resource and a second WUS resource, the WUS configuration information including information regarding a maximum duration of the second WUS resource;
transmit the WUS configuration information; and
transmit the WUS signal based on the WUS configuration information,
wherein the WUS signal comprises a group WUS signal, and the first WUS resource is continuous with the second WUS resource in a time domain,
wherein the WUS configuration information includes an offset value for the second WUS resource only from among the first WUS resource and the second WUS resource, and
wherein the offset value of the WUS configuration information is information regarding a time gap between a Paging Occasion (PO) and the second WUS resource.

* * * * *